United States Patent [19]

Uram

[11] 4,201,924

[45] May 6, 1980

[54] COMBINED CYCLE ELECTRIC POWER PLANT WITH A STEAM TURBINE HAVING A SLIDING PRESSURE MAIN BYPASS AND CONTROL VALVE SYSTEM

[75] Inventor: Robert Uram, East Pittsburgh, Pa.

[73] Assignee: Westinghouse Electric Corp., Pittsburgh, Pa.

[21] Appl. No.: 497,503

[22] Filed: Aug. 13, 1974

[51] Int. Cl.² .............................................. H02P 9/04
[52] U.S. Cl. ................................. 290/40 R; 364/494; 60/660; 60/39.18 B
[58] Field of Search ................... 290/2, 4, 40; 60/660, 60/667, 39, 18 B; 415/15, 17; 364/492, 494, 495

[56] References Cited

U.S. PATENT DOCUMENTS

| 3,391,539 | 7/1968 | Dimitroff et al. | 60/662 |
| 3,741,246 | 6/1973 | Braytenbatt | 415/17 |
| 3,762,162 | 10/1973 | Miura et al. | 60/39.1 B |

FOREIGN PATENT DOCUMENTS 0718179  9/1965  Canada .................................... 60/660

Primary Examiner—Gene Z. Rubinson
Assistant Examiner—John W. Redman
Attorney, Agent, or Firm—H. W. Patterson

[57] ABSTRACT

A combined cycle electric power plant includes two gas turbines, a steam turbine, and a digital control system with an operator analog or manual backup. Each of the gas turbines has an exhaust heat recovery steam generator connected to a common header from which the steam is supplied by one or both of the steam generators for operating the steam turbine. The control system is of the sliding pressure type and maintains a predetermined steam pressure as a function of steam flow according to a predetermined characterization depending on the number of steam generators in service to limit the maximum steam velocity through the steam generators, and reduce the probability of water carryover into the steam turbine. Such control is always maintained by the bypass valve. The turbine control valve responds to the speed/load demand only, except when the bypass valve is closed and the rate of steam generation is insufficient to maintain a predetermined pressure flow relationship.

16 Claims, 55 Drawing Figures

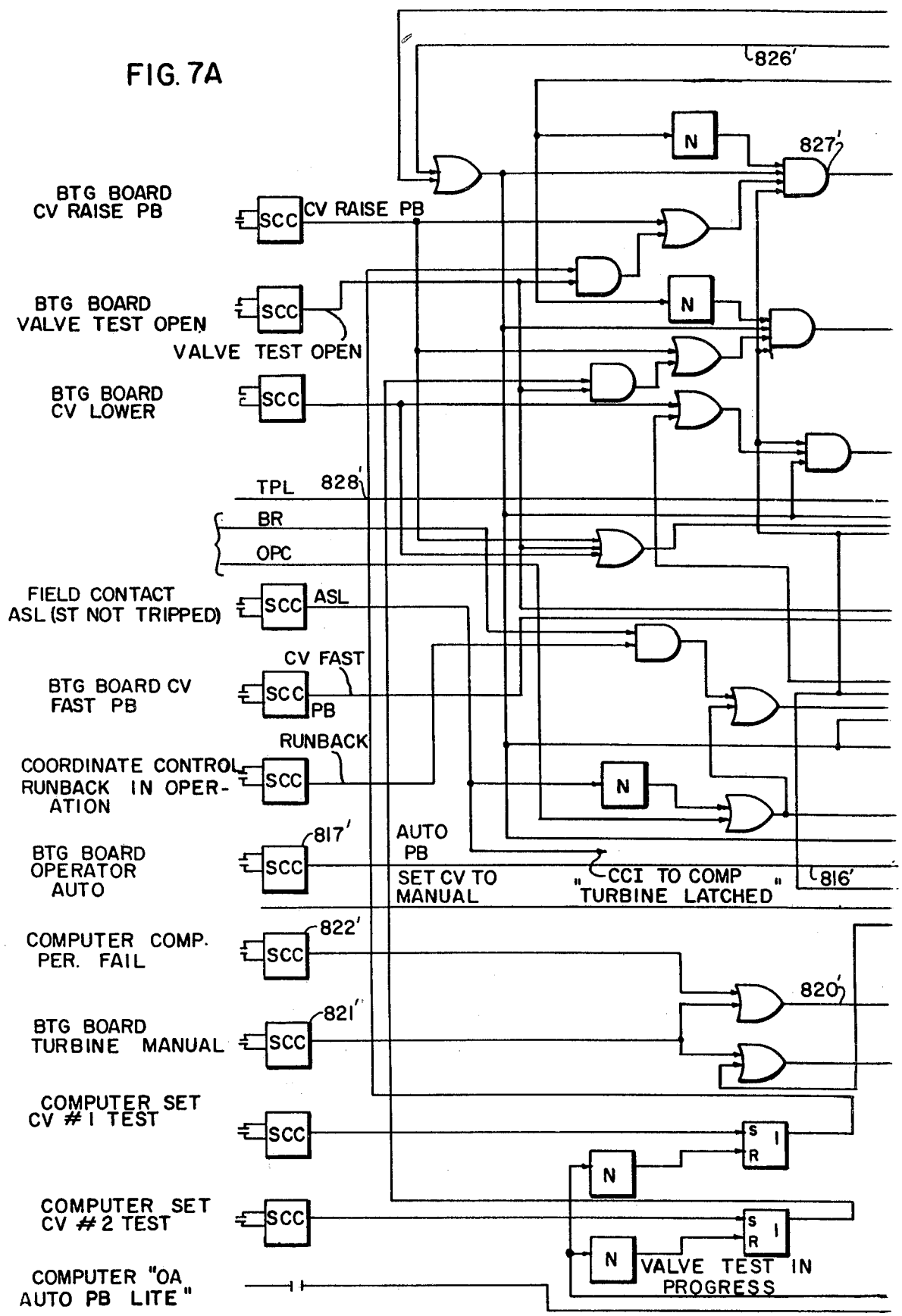

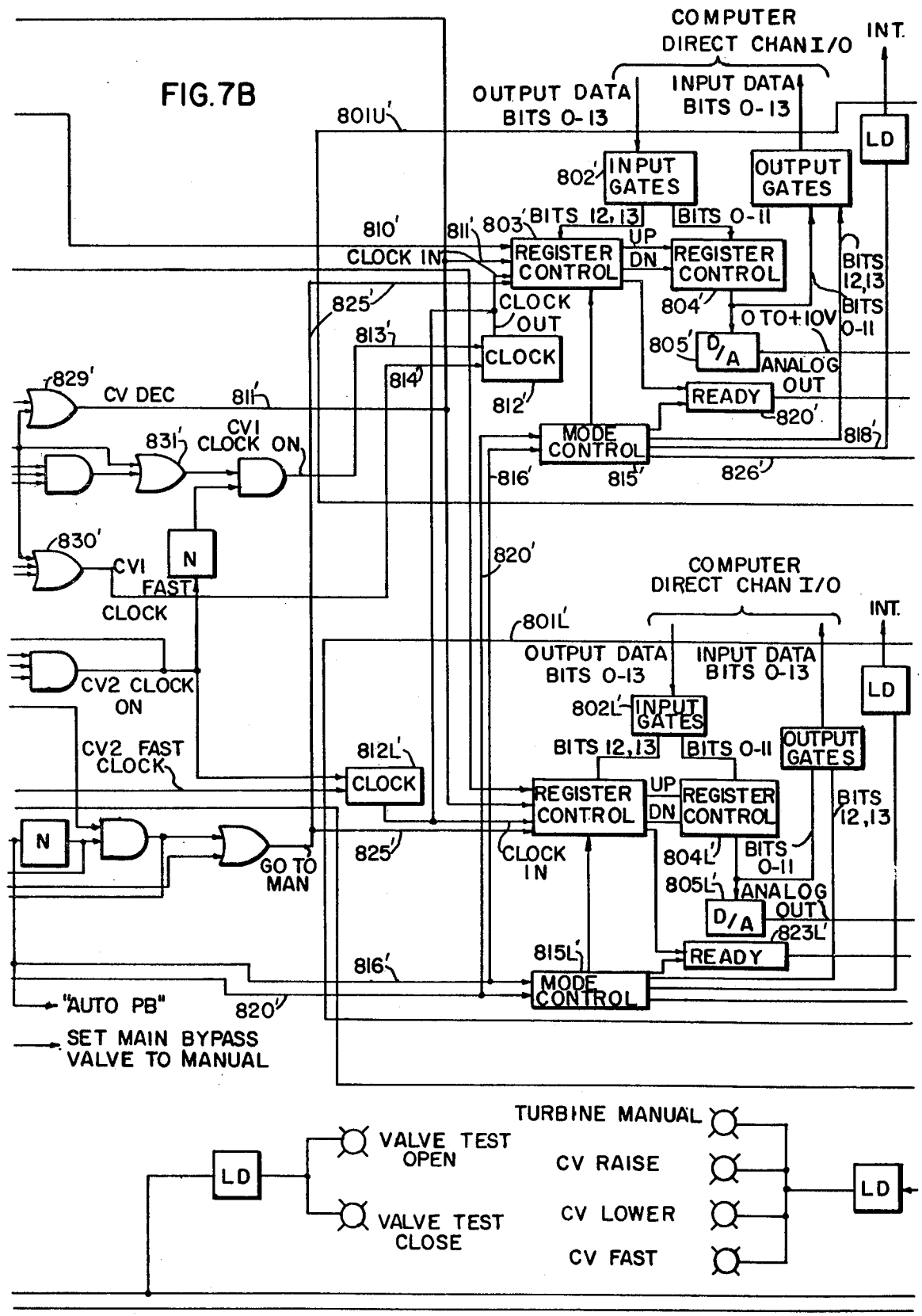

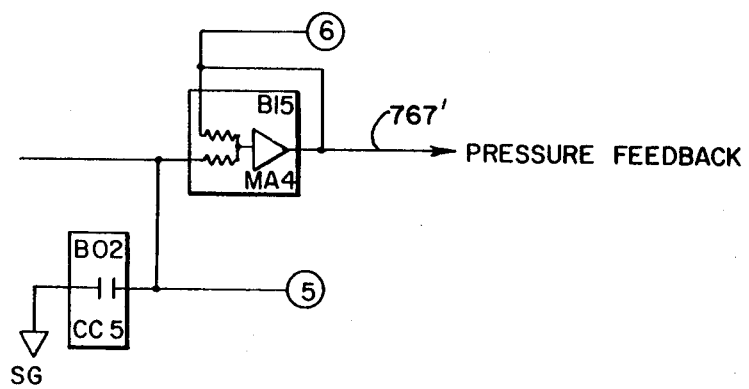
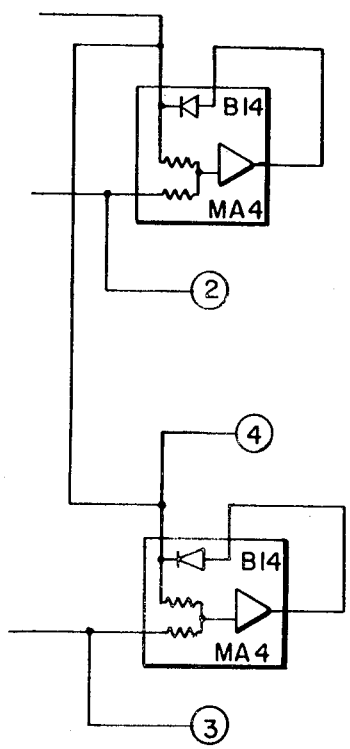
FIG. 10C

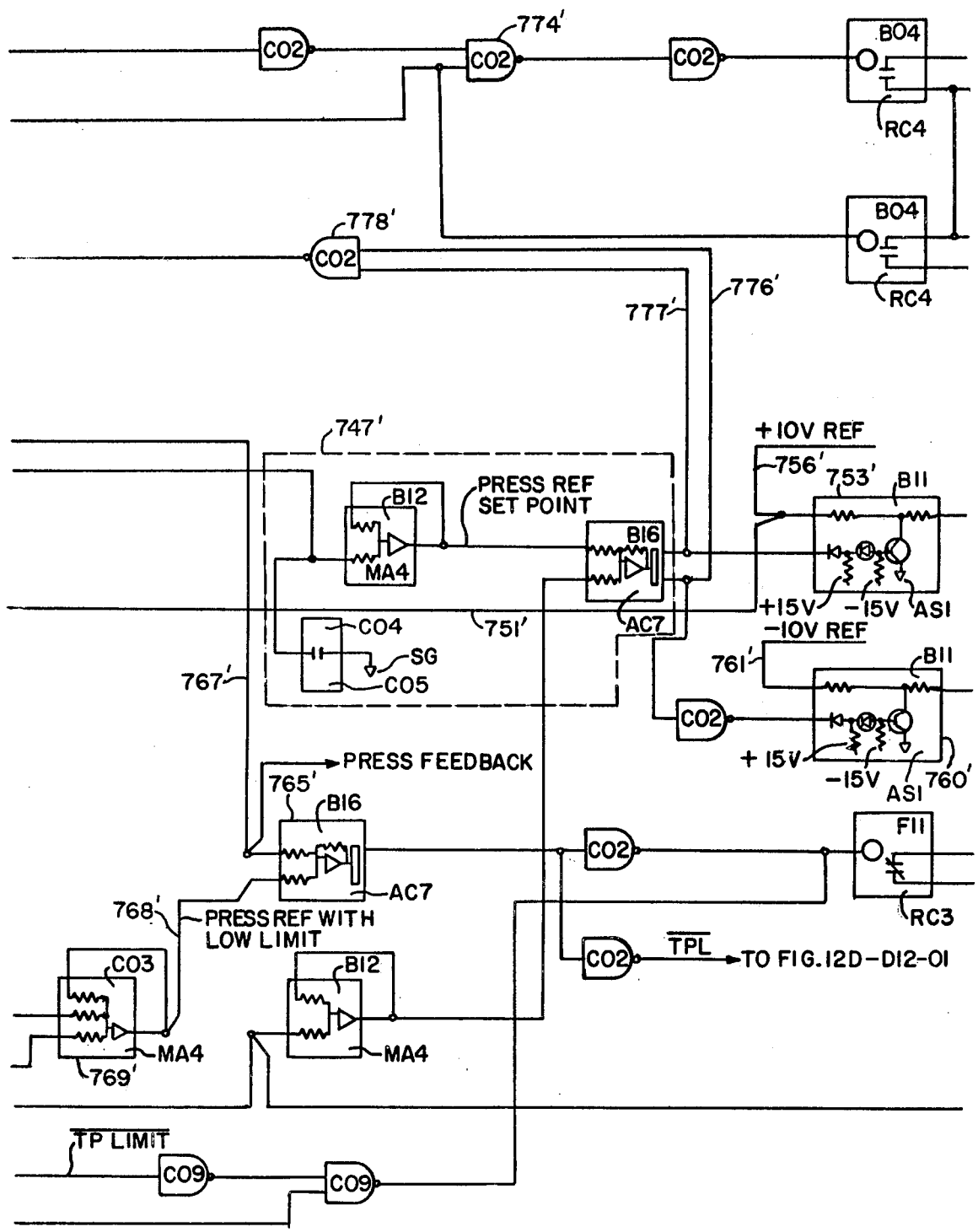
FIG. IOE

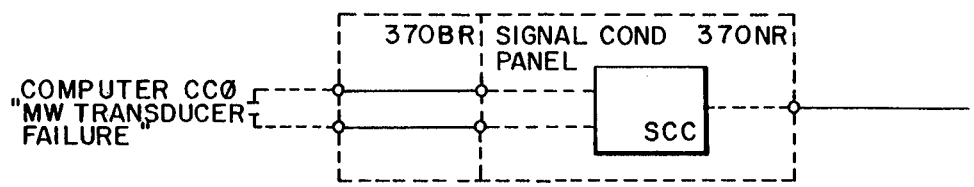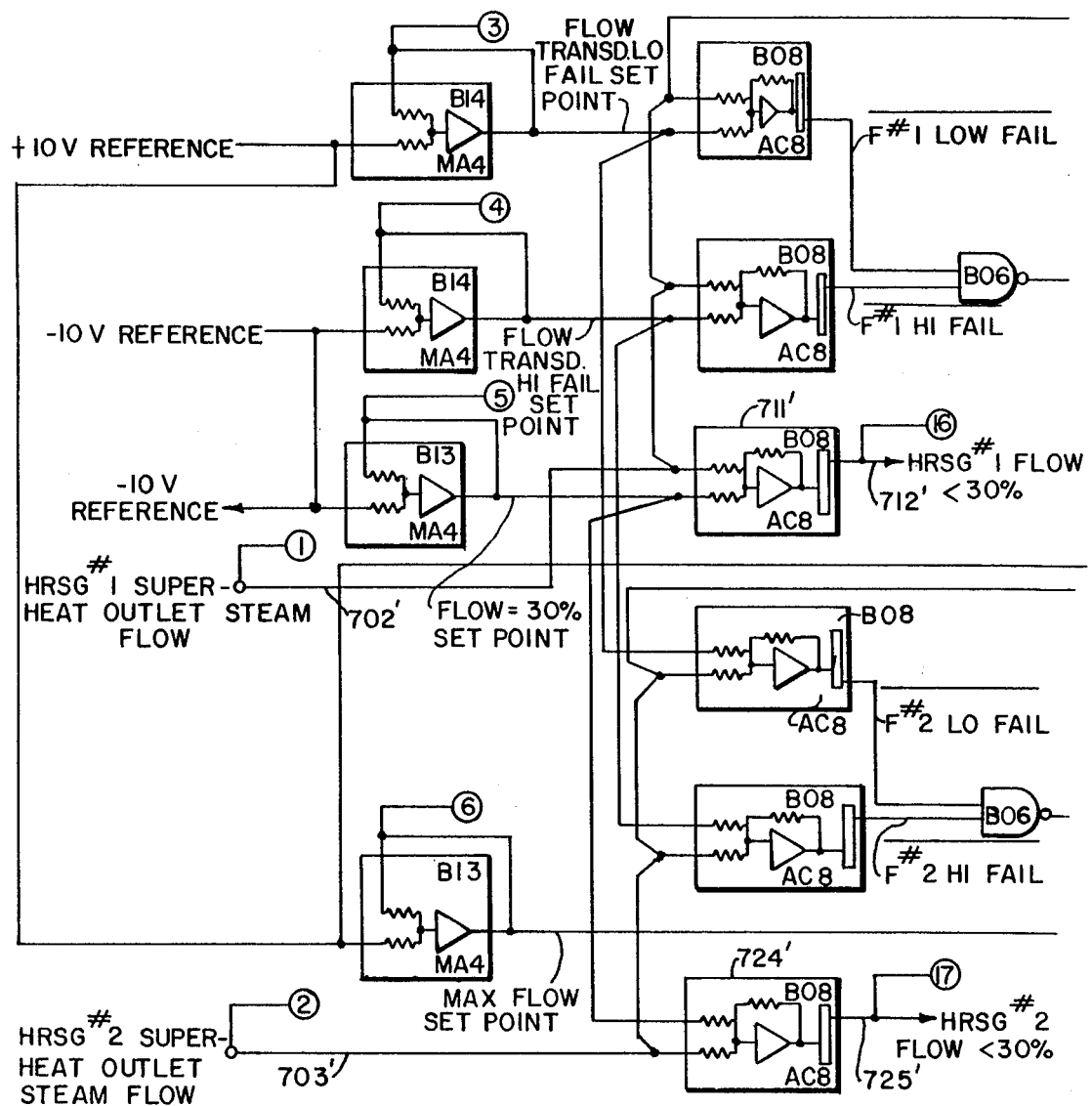
FIG. 10G

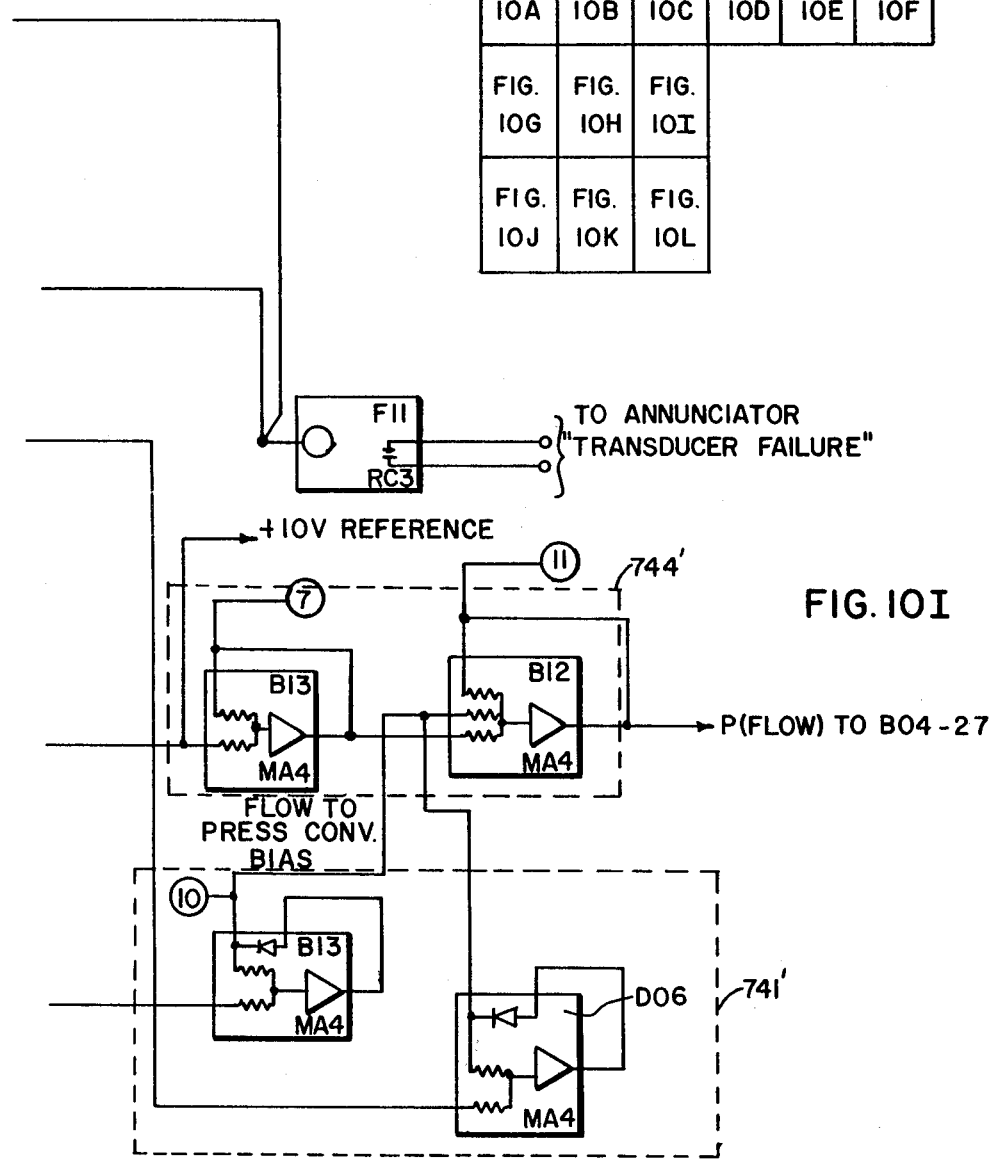

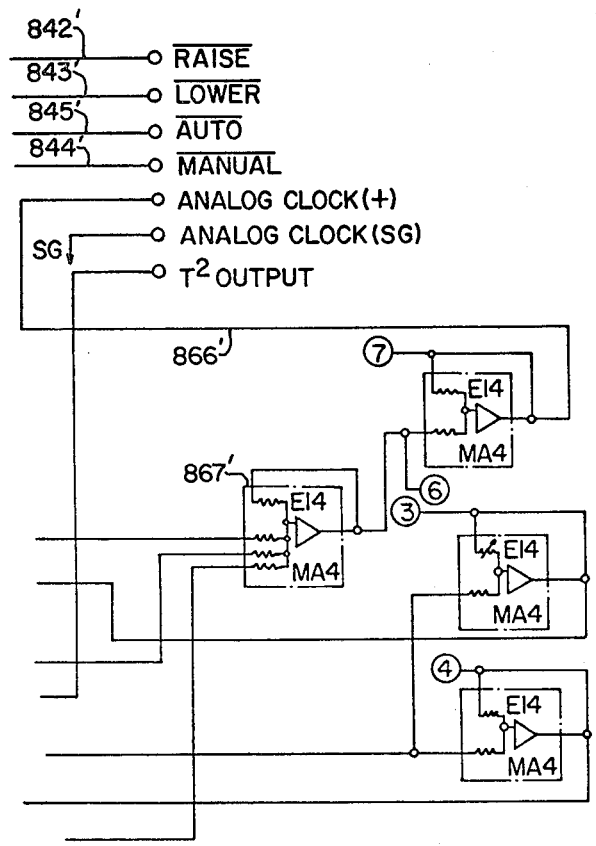
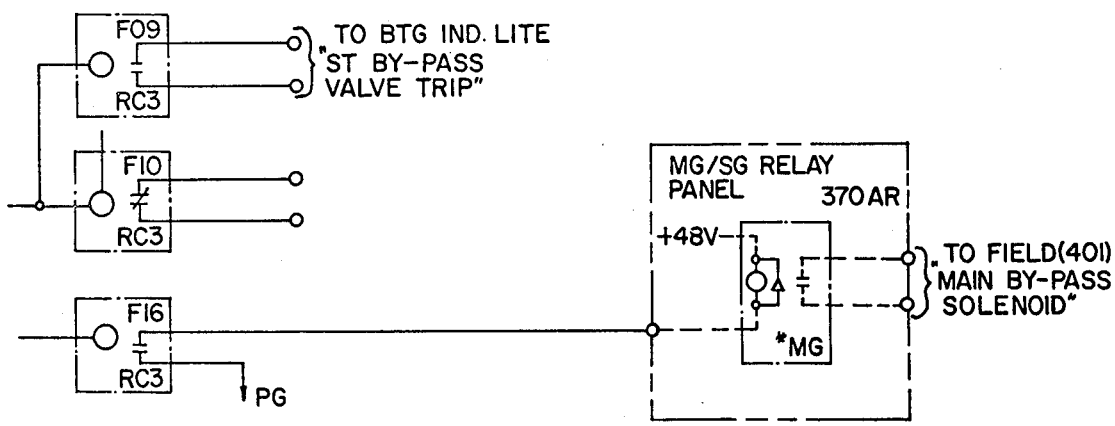
FIG. 13C.

FIG. 13D
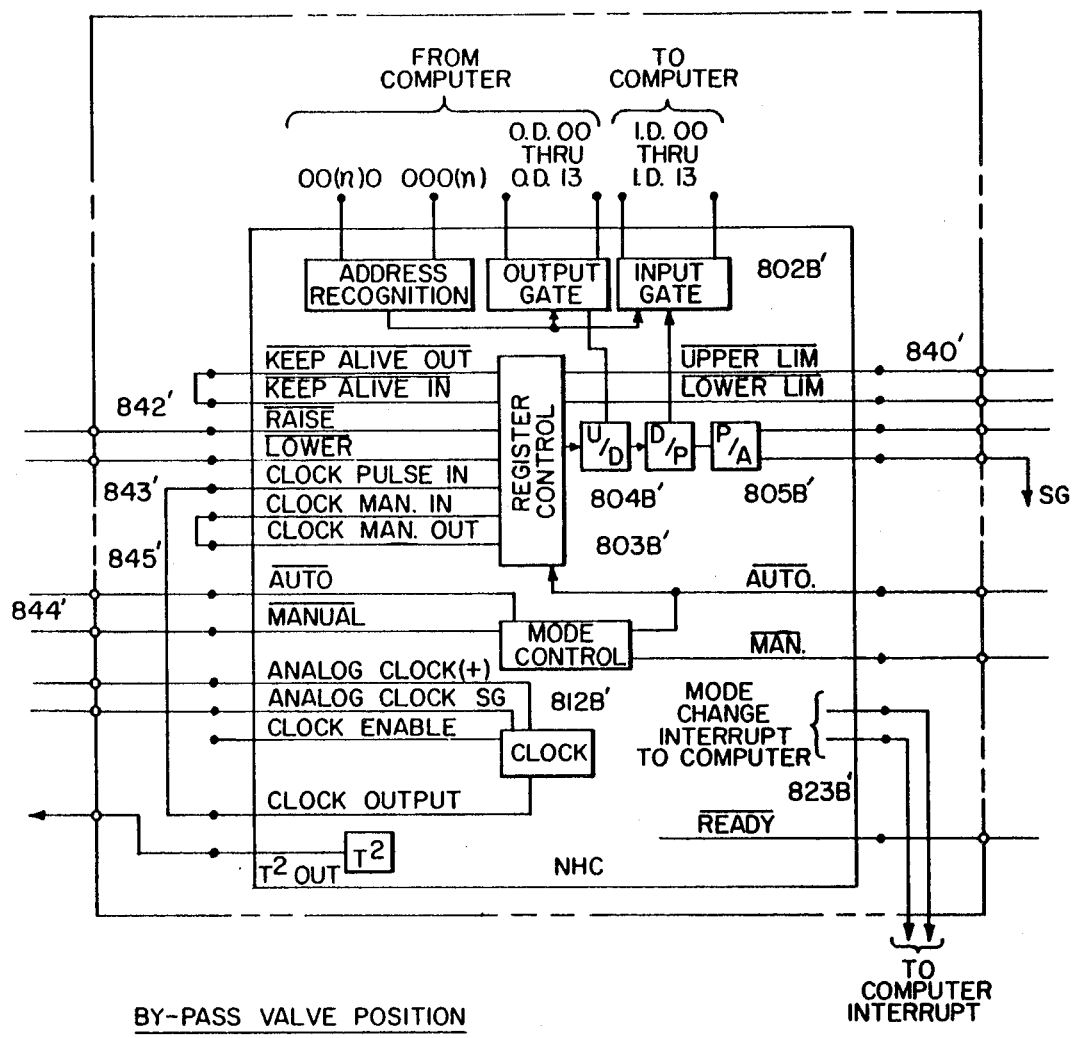
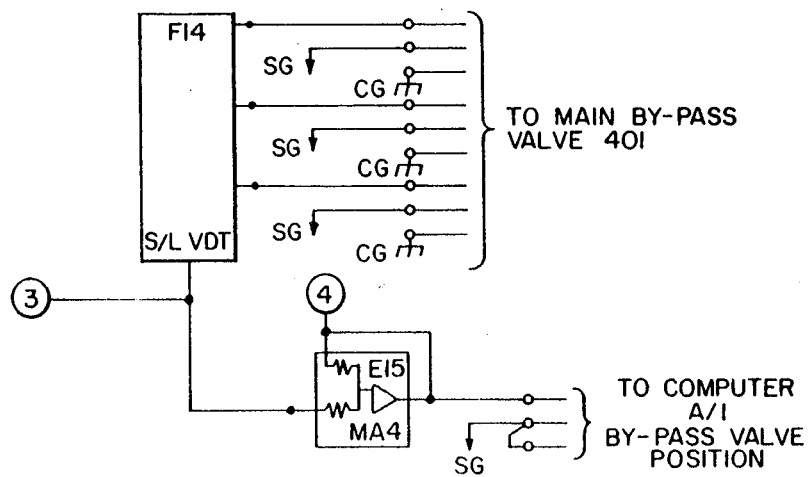

| FIG. 13A | FIG. 13B | FIG. 13C | FIG. 13D | FIG. 13E | FIG. 13F |

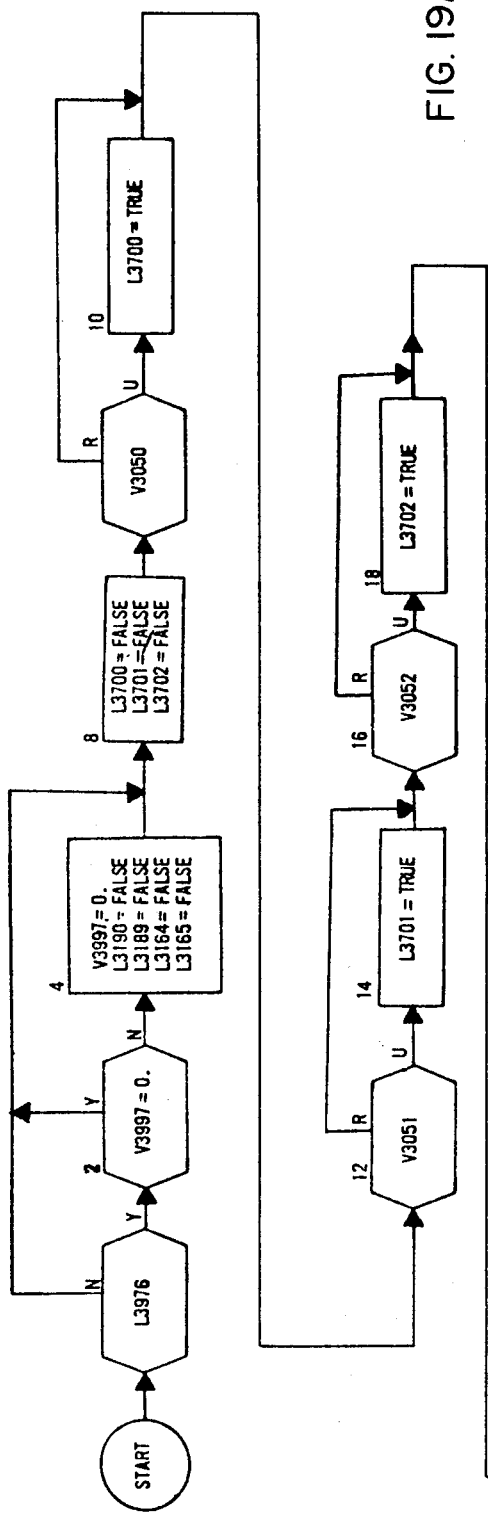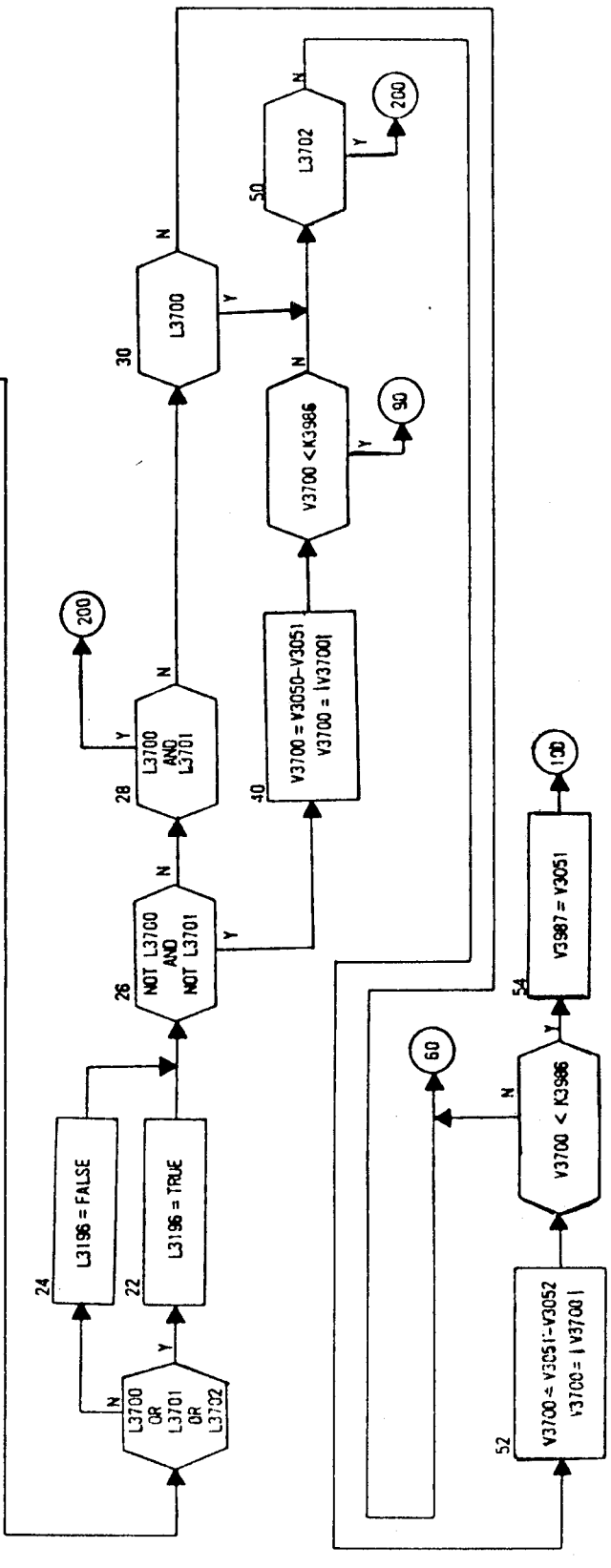
FIG. 19A.

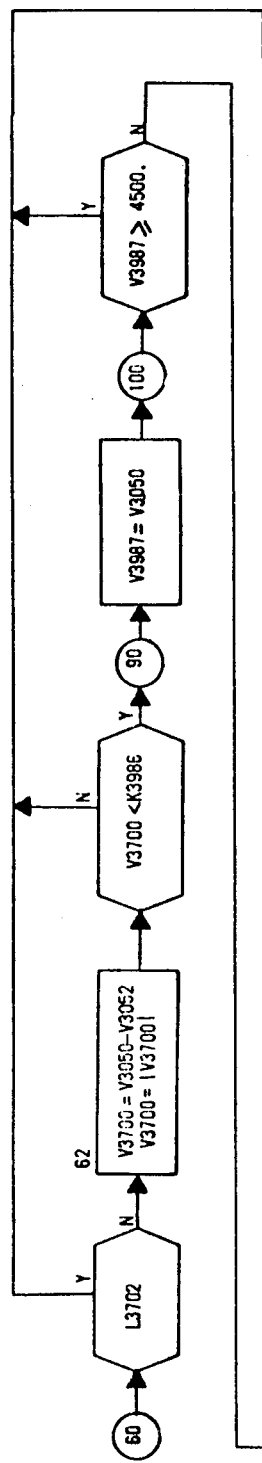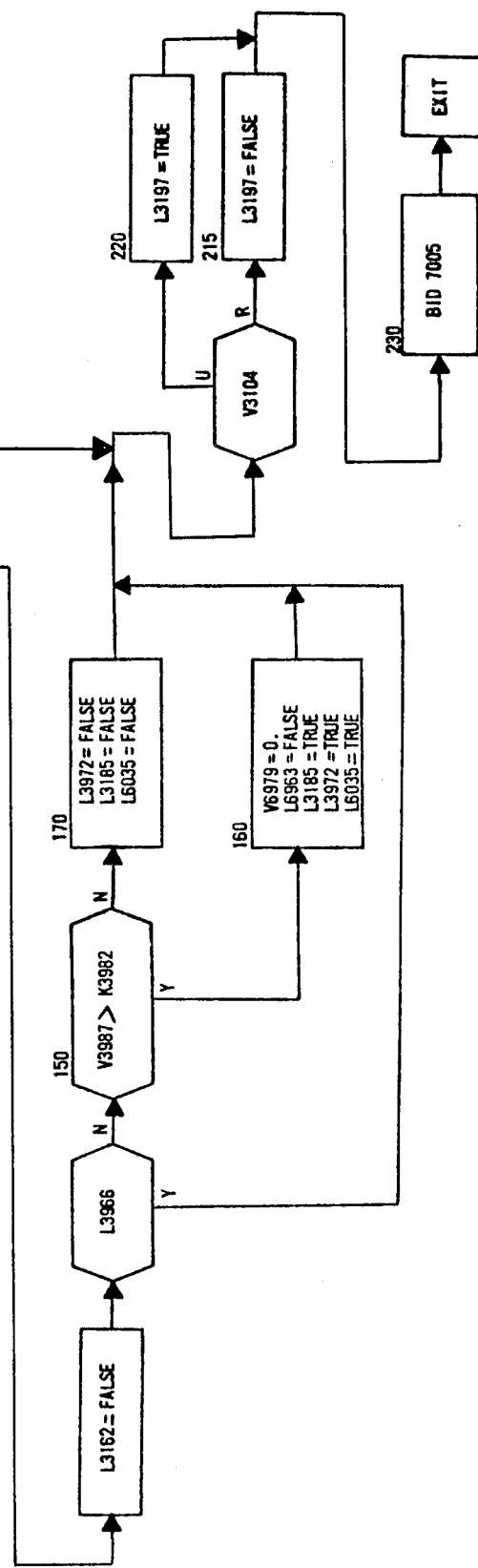
FIG. 19B.

COMBINED CYCLE ELECTRIC POWER PLANT WITH A STEAM TURBINE HAVING A SLIDING PRESSURE MAIN BYPASS AND CONTROL VALVE SYSTEM

CROSS-REFERENCE TO RELATED APPLICATIONS

Reference is made to the following patent applications:

1. Ser. No. 399,790, filed on Sept. 21, 1973 by L. F. Martz, R. W. Kiscaden and R. Uram, entitled "An Improved Gas Turbine And Steam Turbine Combined Cycle Electric Power Generating Plant Having A Coordinated And Hybridized Control System And An Improved Factory Based Method For Making And Testing Combined Cycle And Other Power Plants And Control Systems Therefor", assigned to the present assignee and hereby incorporated by reference.

2. Ser. No. 408,972, which is a continuation of Ser. No. 247,877, now abandoned, which is a continuation-in-part of Ser. No. 247,440, now abandoned, which is a continuation-in-part of Ser. No. 246,900, filed Apr. 24, 1972, entitled "General System And Method For Starting, Synchronizing And Operating A Steam Turbine With Digital Computer Control", all filed by T. C. Giras and R. Uram and assigned to the present assignee, and hereby incorporated by reference.

3. W.E. 44,522, filed concurrently herewith by Lyle F. Martz and Richard J. Plotnick, entitled "Combined Cycle Electric Power Plant Having A Control System Which Enables Dry Steam Generator Operation During Gas Turbine Operation", assigned to the present assignee and hereby incorporated by reference.

BACKGROUND OF THE INVENTION

The present invention relates to combined cycle electric power plants, and more particularly to improved bypass valve/control valve interaction for a steam turbine, particularly useful in the operation of a steam turbine powered by steam from one or both of two gas turbine heat recovery steam generators.

In the generation of electric power by a combined cycle plant of the type described, both gas turbines and the steam turbine may be in service, one gas turbine and the steam turbine may be in service, or only one or both gas turbines may be in service.

In such a plant, the turbine operates normally with its steam inlet control valves wide open without throttling, and with the load being governed by the rate of steam generation. The steam pressure is permitted to slide within certain limits depending on the loading of the turbine, and accepts whatever steam is generated.

The operation of a plant of this type is limited to a minimum steam pressure and flow because of the requirements of the heat recovery steam generators, and is further limited to a maximum velocity of steam to minimize erosion of the steam generator tubes and reduce the probability of water carryover into the turbine which could damage the turbine blades. At the same time, it is desirable to minimize throttling of the steam turbine control valves to maintain optimum plant efficiency and stability. This presents certain problems in that the maximum steam velocity which can be permitted depends on the steam pressure and the rate of steam generation. For example, in one embodiment, with both exhaust heat recovery steam generators in service, the rate of steam generation required no throttling of the steam turbine control valves except in maintaining the minimum required pressure for a load range of up to approximately 25%. However, with only one exhaust heat recovery steam generator in service, the rate of steam generation required throttling in the load range of up to approximately the 48% load range to maintain the minimum required pressure, and from above 70% to 100% of the load range to limit the maximum steam velocity. The amount of throttling, of course, is also variable. For example, with one generator in service, the system can operate as low as in the neighborhood of 500 pounds pressure for a steam flow or load of approximately 70% maximum, but must operate at 600 pounds pressure for a steam flow or load of approximately 80% maximum in order to maintain the steam velocity below a predetermined maximum.

In a plant of the type described the rate of steam generation can change rapidly and substantially in the event one of the steam generators is either put in or taken out of service; and in this event the rate of steam generation either increases or decreases rapidly and it is desirable that the pressure/flow relationship is changed in response to such event, without creating excessive pressure for a particular loading or increasing the probability of water carryover to the turbine. In starting up a plant of the type described, it is desirable to be able to control the steam inlet or control valves of the steam turbine independent of the pressure/flow relationship. This can be accomplished by bypassing the generated steam to the condenser and then as the control valve is opened to either accelerate the turbine or increase the load, the bypass valve can be modulated in order to maintain the proper pressure flow relationship to the turbine. Any minimum pressure flow relationship control after the bypass valve is closed can be maintained by the steam turbine control valves. Thus, the maximum velocity of the steam can be limited while still maintaining optimum efficiency. During a decrease in loading or speed, it is desirable that none of the steam is bypassed to the condenser unless the pressure/flow relationship becomes excessive. Therefore, it is desirable for the control valves to maintain control of the pressure/flow relationship with the bypass valve closed.

A sudden decrease or increase in pressure, depending on the type of contingency can trip the steam generator or turbine, unless such condition is remedied quickly by either preventing or causing a bypassing of the steam to the turbine. Therefore the bypass valve should be able to respond quickly to such change regardless of the particular pressure/flow condition prior to such change. In a system of the type where a transfer of control of the pressure/flow relationship occurs at a particular transition point would not necessarily react quickly enough for certain contingencies.

When the bypass valve is closed, any further valve restriction to maintain a proper minimum pressure/flow relationship must of necessity be controlled by the control valve or the rate of steam generation; but, even under these conditions the bypass valve should respond quickly to contingencies requiring responses.

Also, in stand alone steam turbine electric power plants of the sliding pressure type with a low and a high steam generation rate, which are often unattended a similar type of steam pressure/flow control can be desirable.

SUMMARY OF THE INVENTION

A combined cycle electric power plant includes an automatic control system of the sliding pressure type having a steam bypass and control valve control for maintaining a desired pressure/flow relationship. Such pressure/flow relationship is controlled by the bypass valve. The turbine control valves are operated independently of the pressure/flow relationship, except when the bypass valve is at the limit of its travel and the rate of steam generation is insufficient to maintain the minimum pressure flow relationship.

BRIEF DESCRIPTION OF THE DRAWINGS

FIGS. 7A, 7B and 7C when placed side-by-side show a functional block diagram of a system for operating the steam turbine control valves in accordance with the present invention;

FIGS. 10A through 10L show when arranged according to FIG. 11 show circuitry which can be employed to embody various functional blocks of FIGS. 6A through 6C;

FIG. 11 shows the arrangement of FIGS. 10A through 10L;

FIGS. 13A through 13F when arranged according to FIG. 14 show circuitry which can be employed to embody various functional blocks of FIGS. 9A through 9C;

FIGS. 19A and 19B are flow charts of the steam turbine speed monitor shown in block form in FIG. 15;

DESCRIPTION OF THE PREFERRED EMBODIMENT

A. General Plant Description

Figure 1:
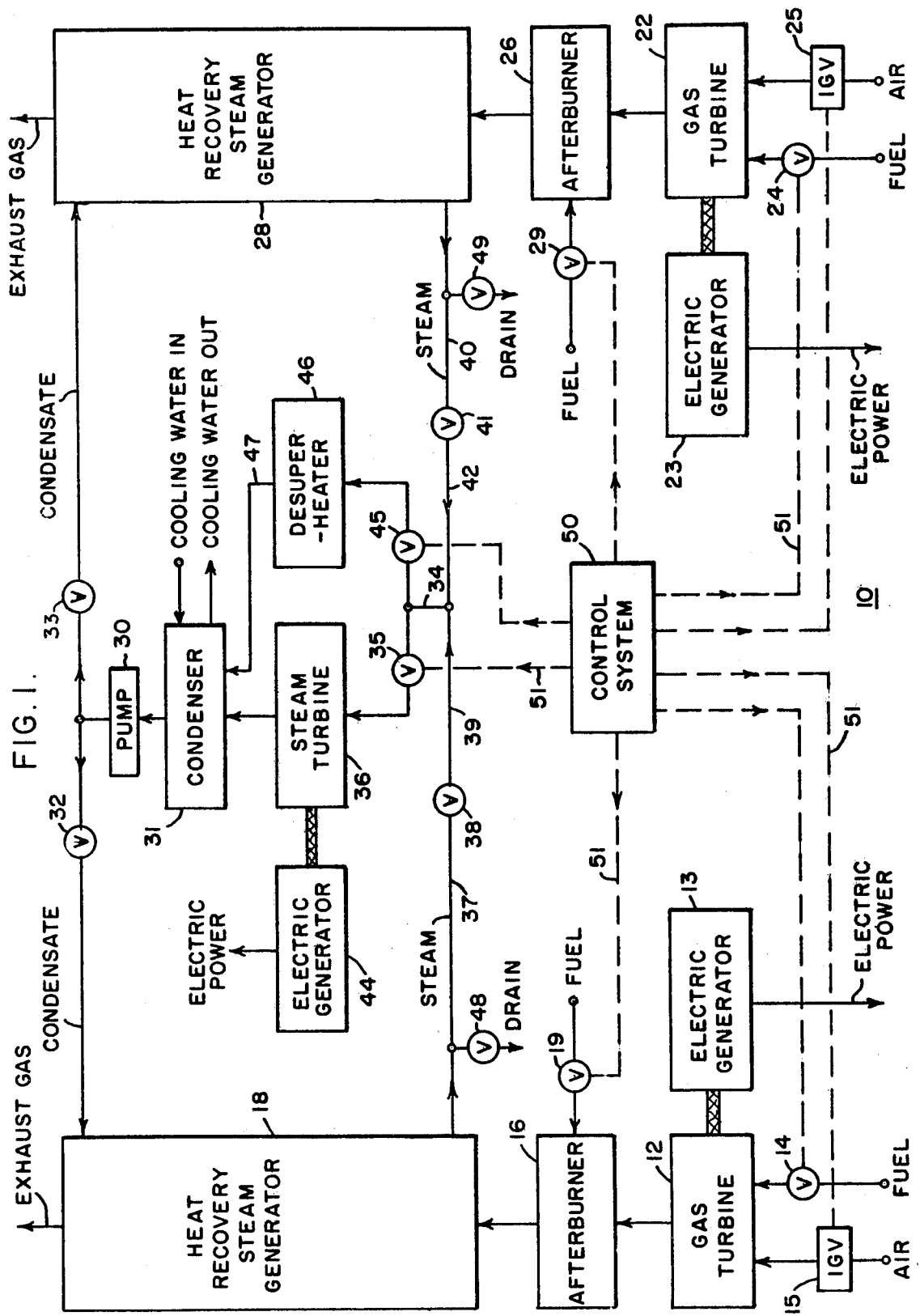
FIG. 1 shows a schematic diagram of a combined cycle electric power plant in which there is employed a steam turbine in accordance with the principles of the invention.

Referring to FIG. 1 of the drawings, there is shown a functional block diagram of a representative embodiment of a combined cycle electric power generating plant constructed in accordance with the present invention. Reference numeral 10 is used to identify the combined cycle plant as a whole. As such, the plant 10 includes a first gas turbine 12 (sometimes referred to as "gas turbine No. 1") which drives a first electric generator 13. Fuel is supplied to the gas turbine 12 by way of a fuel control valve or throttle valve 14. Air enters the gas turbine 12 by way of a variable inlet guide vane mechanism 15 which controls the degree of opening of the turbine air intake and which is used to adjust air flow during the startup phase and to increase part load efficiency. The fuel supplied by the throttle valve 14 is burned in the gas turbine 12 and the resulting high temperature exhaust gas is passed through an afterburner 16 and a heat recovery steam generator 18 and is thereafter exhausted into the atmosphere.

Heat recovery steam generator 18 (sometimes referred to as "heat recovery steam generator No. 1") includes therein various sets of boiler tubes which are heated to a relatively high temperature by the gas turbine exhaust gas passing through the steam generator 18. Afterburner 16 includes a burner mechanism for further increasing the temperature of the gas turbine exhaust gas before it enters the steam generator 18. Fuel is supplied to the burner mechanism in the afterburner 16 by way of a fuel control valve or throttle valve 19. The primary heat source for the steam generator 18 is the gas turbine 12, the afterburner 16 being in the nature of a supplemental heat source for providing supplemental heat when needed. In terms of typical fuel usage, approximately 80% of the fuel is used in the gas turbine 12 and 20% is used in the afterburner 16.

The combined cycle plant 10 further includes a second gas turbine 22 (sometimes referred to as "gas turbine No. 2") which drives a second electric generator 23. Fuel is supplied to the gas turbine 22 by way of a fuel control valve or throttle valve 24. Air enters the gas turbine 22 by way of a variable inlet guide vane mechanism 25 which is used to adjust air flow during turbine startup and to increase part load efficiency. The fuel supplied by throttle valve 24 is burned in the gas turbine 22 and the resulting high temperature exhaust gas is passed through an afterburner 26 and a heat recovery steam generator 28 and is thereafter exhausted into the atmosphere.

Heat recovery steam generator 28 (sometimes referred to as "heat recovery steam generator No. 2") includes various sets of boiler tubes which are heated to a relatively high temperature by the gas turbine exhaust gas passing through the steam generator 28. Afterburner 26 includes a burner mechanism for further increasing the temperature of the gas turbine exhaust gas before it enters the steam generator 28. Fuel is supplied to the burner mechanism in the afterburner 26 by way of a fuel control valve or throttle valve 29. The primary heat source for the steam generator 28 is the gas turbine 22, the afterburner 26 being in the nature of a supplemental heat source for providing supplemental heating when needed. In terms of typical total fuel consumption, approximately 80% of the fuel is used in the gas turbine 22 and 20% is used in the afterburner 26.

A condensate pump 30 pumps water or condensate from a steam condenser 31 to both of the steam generators 18 and 28, the condensate flowing to the first steam generator 18 by way of a condensate flow control valve 32 and to the second steam generator 28 by way of a condensate flow control valve 33. Such condensate flows through the boiler tubes in each of the steam generators 18 and 28 and is converted into superheated steam. The superheated steam from both of the steam generators 18 and 28 is supplied by way of a common header or steam pipe 34 and a steam throttle valve or control valve 35 to a steam turbine 36 for purposes of driving such steam turbine 36. The steam from the first steam generator 18 flows to the header 34 by way of a steam pipe 37, an isolation valve 38 and a steam pipe 39, while steam from the second steam generator 28 flows to the header 34 by way of a steam pipe 40, an isolation valve 41 and a steam pipe 42.

The spent steam leaving steam turbine 36 is passed to the condenser 31 wherein it is condensed or converted back into condensate. Such condensate is thereafter pumped back into the steam generators 18 and 28 to make more steam. Steam turbine 36 drives a third electric generator 44.

A steam bypass path is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken line manner. As will be seen, the control system 50 offers a choice of four different control operating levels providing four different degrees of automation. From highest to lowest in terms of the degree of automation, these control operating levels are: (1) plant coordinated control; (2) operator automatic control; (3) operator analog control; and (4) manual control. The control system 50 includes an analog control system which is constructed to provide complete and safe operation of the total plant 10 or any part thereof. The control system 50 also includes a digital computer that provides a real-time digital control system that works in conjunction with the analog control system at the higher two levels of control to coordinate and direct the operation of the analog control system. Failure of the digital control computer results in no loss of power generation because the analog control system provides for complete operation of the plant 10.

When operating at the highest level of control, namely, at the plant coordinated control level, the control system 50, among other things, automatically coordinates the settings of the fuel valves 14, 19, 24 and 29, the inlet guide vanes 15 and 25 and the steam turbine throttle and bypass valves 35 and 45 to provide maximum plant efficiency under static load conditions and optimum performance during dynamic or changing load conditions.

The control system 50 also enables a coordinated automatic startup or shutdown of the plant 10 such that the plant 10 can be brought from a hot standby condition to a power generating condition or vice versa in a quick, efficient and completely automatic manner. For example, the entire plant 10 can be started and brought to full load from a hot standby condition in approximately 60 minutes time by having the plant operator simply dial in the desired load setting and push a master plant start button.

As an indication of the flexibility and reliability of the power generating plant 10, it is noted that the plant 10 can be operated in any one of the following configurations: (1) using one steam turbine and two gas turbines; (2) using one steam turbine and one gas turbine; (3) using two gas turbines only; and (4) using one gas turbine only. The steam turbine 36 will, of course, not operate by itself, it being necessary to use at least one of the gas turbines 12 and 22 in order to use the steam turbine 36. In order to obtain the benefits of combined cycle operation, it is, of course, necessary to use the steam turbine 36 and at least one of the gas turbines 12 and 22. When one of the gas turbines, for example the gas turbine 12, is not being used or is shut down for maintenance purposes, then its associated steam generator 18 can be removed from the system by closing its condensate flow valve 32 and its steam isolation valve 38. When, on the other hand, the steam turbine 36 is not being used or is shut down for maintenance purposes, the steam generated by the steam generators 18 and 28 can be bypassed to the condenser 31 by way of steam bypass valve 45 and the desuperheater 46. As an alternative, when the steam turbine 36 is not being used, either one or both of the steam generators 18 and 28 can be drained and vented by the appropriate setting of condensate valves 32 and 33, steam isolation valves 38 and 41 and drain valves 48 and 49. In other words, each of the steam generators 18 and 28 is constructed so that its respective gas turbine can be operated with the steam generator in a dry condition.

The combined cycle plant 10 affords a high degree of reliability in that failure of any one of the major apparatus components will not reduce total plant power generation capacity by more than 50%. In this regard and by way of example only, a combined cycle plant 10 has been developed having a nominal maximum power generating capacity of 260 megawatts. In such plant, each of the gas turbines 12 and 32 is capable of producing a maximum of approximately 80 megawatts of electrical power under ISO conditions (59° Fahrenheit at sea level) and the steam turbine 36 is capable of producing a maximum of approximately 100 megawatts of electrical power. Thus, loss of any one of the turbines 12, 22 and 36, for example, would not reduce total plant capacity by as much as 50%.

It is noted in passing that the functional block diagram of FIG. 1 has been simplified in some respects relative to the actual plant apparatus to be described hereinafter, this simplification being made to facilitate an initial overall understanding of the combined cycle plant 10. A major simplification in FIG. 1 concerns the fuel valves 14, 19, 24, and 29. As will be seen in the actual embodiment of the combined cycle plant described herein, provision is made for operating the gas turbines 12 and 22 and the afterburners 16 and 26 on either of two different kinds of fuel, namely, either natural gas or distillate type fuel oil. As a consequence, each of the gas turbines 12 and 22 and each of the afterburners 16 and 26 is actually provided with two fuel throttle valves, one for natural gas and the other for fuel oil. Also, various other valves and devices employed in the actual fuel supply systems have been omitted from FIG. 1 for the sake of simplicity. Other simplifications employed in FIG. 1 are of a similar character.

DETAILED PLANT DESCRIPTION

Figure 2A:
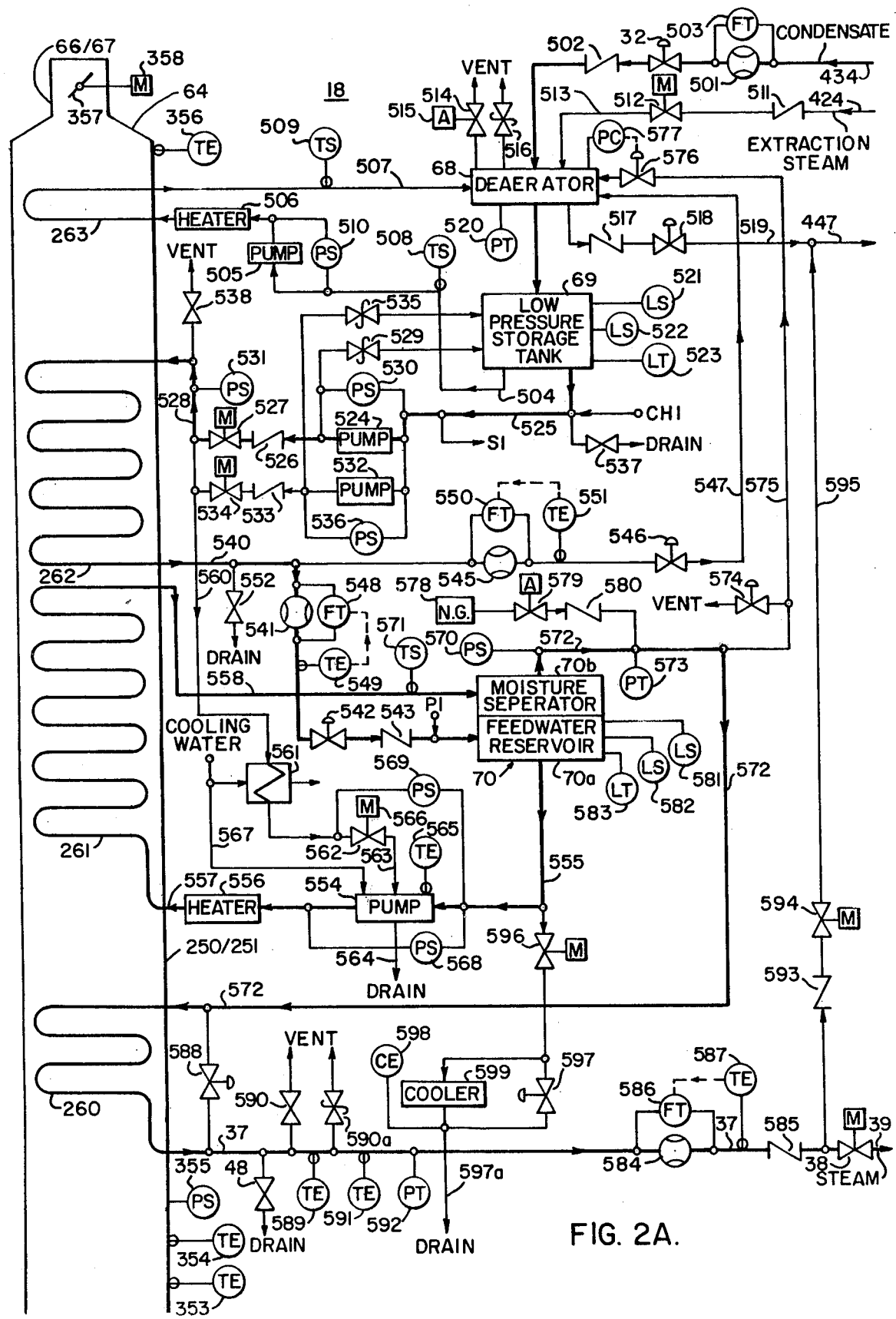
FIGS. 2A, 2B and 2C when placed side-by-side show a detailed schematic diagram of one embodiment of a combined cycle electric power plant in which the principles of the present invention are utilized.
Figure 2B:
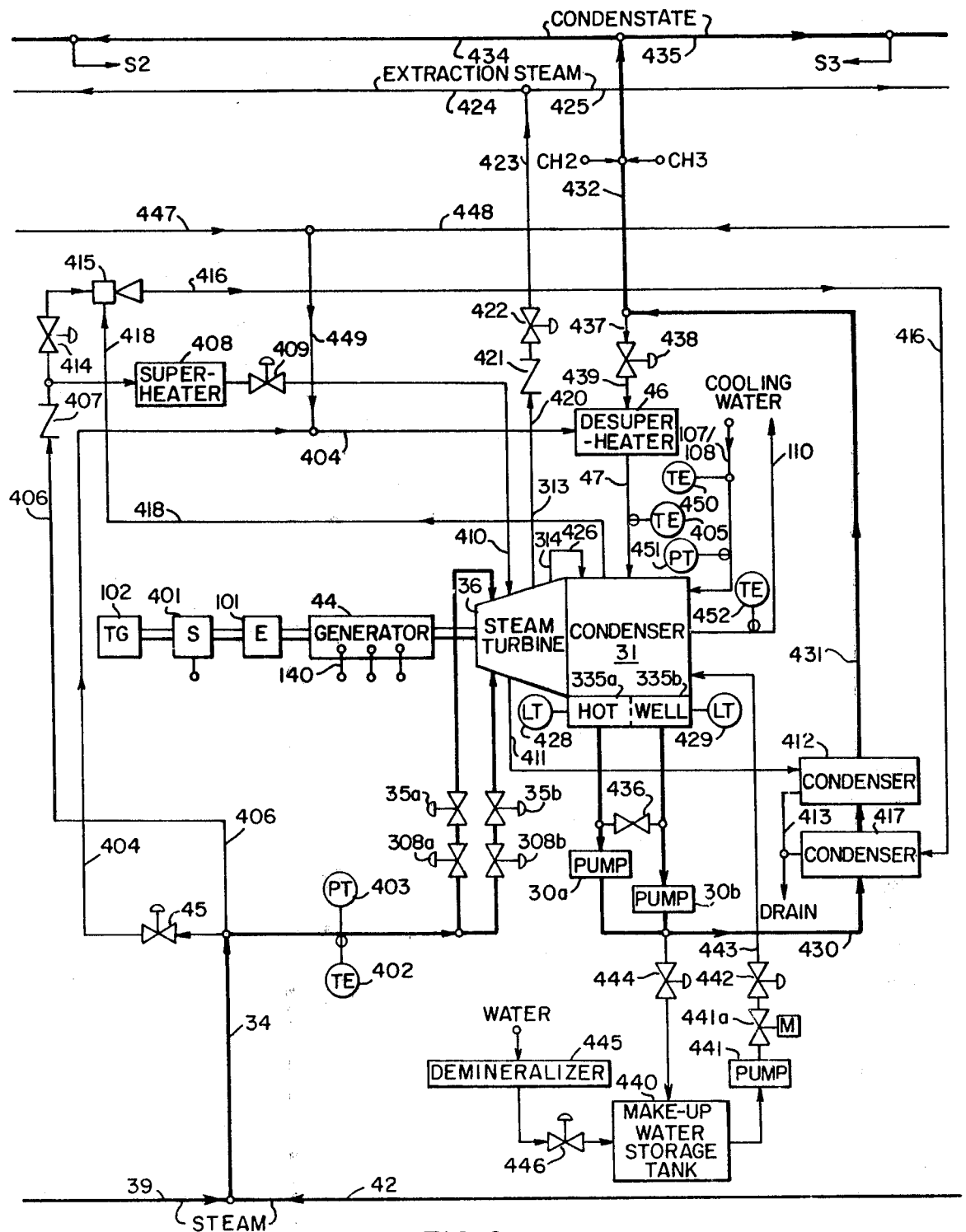
Figure 2C:
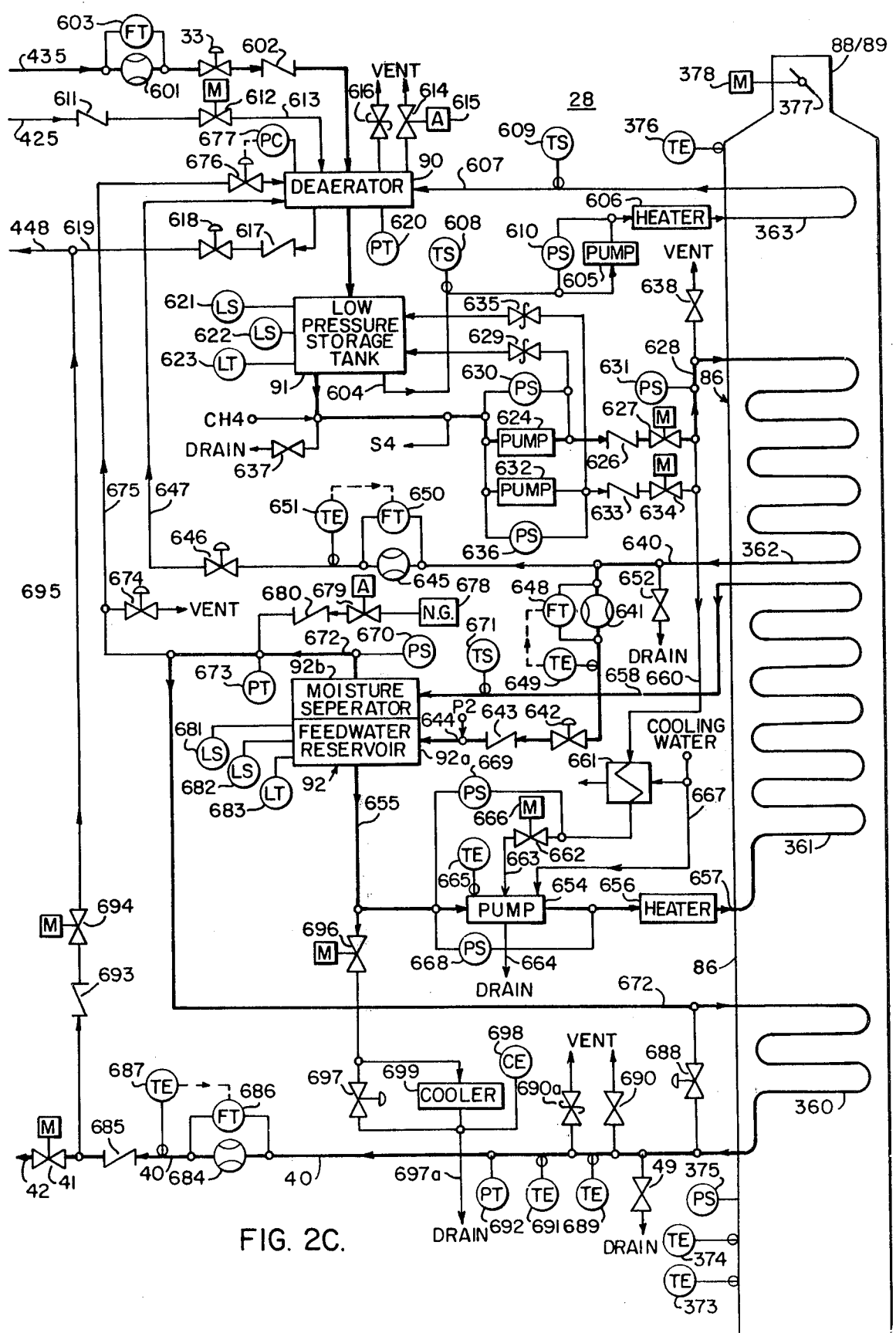

FIGS. 2A, 2B and 2C when placed side-by-side show in greater detail the various valves, pumps, measurement devices and other items associated with the operation of the steam turbine 36.

The same reference numerals used in FIG. 1 is used in FIGS. 2A, 2B and 2C for elements previously described therein. In some cases, an item previously described as a single element will be described in FIGS. 2A, 2B and 2C as two or more identical elements performing the same function, usually in parallel with one another. In such cases, the same reference numeral will be used but with suffix letters a, b, c, etc. added thereto to distinguish the different ones of the identical multiple elements.

Located at the lower end of the stack structure 64 of the first steam generator 18 a plurality of temperature elements, including temperature elements 353 and 354, which provide indications of the steam generator inlet gas temperature. Under typical peak load conditions, this temperature will be one the order of approximately 1200° Fahrenheit as a result of added afterburner heat. A pressure switch 355 monitors the steam generator inlet gas pressure and produces a warning signal if such pressure exceeds a desired limit. Located at the top of the stack structure 64 is a further temperature element 356 which produces a signal indicative of the gas top temperature at the top of the stack. Under typical peak load conditions, this temperature will be approximately 340° Fahrenheit. Thus, under typical peak load conditions, the gas temperature varies from about 1200° Fahrenheit at the bottom of the stack 64 (temperature element 353) to about 340° Fahrenheit at the top of the stack 64 (temperature element 356). The gas temperature intermediate the superheater tubes 260 and the high pressure evaporator tubes 261 is about 1000° Fahrenheit. The gas temperature intermediate the high pressure evaporator tubes 261 and the economizer tubes 262 is about 600° Fahrenheit. The gas temperature intermediate the economizer tubes 262 and the low pressure evaporator tubes 263 is about 360° Fahrenheit.

Located at the top of the stack structure 64 is a stack cover louver structure 357 which can be closed when the gas turbine 12 is not in service. This stack cover mechanism 357 is operated by a motor 358. In passing, it is noted that there are actually two of these stack cover mechanisms 357, one being located at the top of each of the two parallel stack structures 250 and 251 (FIG. 9).

Considering now the second heat recovery steam generator 28 (FIG. 2C), there is located within the stack structure 86 thereof superheater tubes 360, high pressure evaporator tubes 361, economizer tubes 362 and low pressure evaporator tubes 363. These tubes 360–363 correspond in purpose and function to the tubes 260–263, respectively, located in the stack structure 64 of the first means generator 18. Located at the lower end of the second stack structure 86 are turning vanes (not shown) which turn the turbine exhaust gas upwardly through the tube sections 360–363.

Considering now the steam turbine 36, electric generator 44 and condenser 31 (FIG. 2B) in greater instrumentation detail, a speed transducer 401 is coupled to the rotary shaft structure of the generator 44 and produces an electrical signal indicating the rotary speed or rpm of the rotor structures of the steam turbine 36 and generator 44. Under normal load conditions, the steam turbine speed will be the synchronous value of 3,600 rpm and, during startup, the steam turbine speed will normally be a controlled value as the turbine accelerates to synchronous speed. A temperature element 402 and a pressure transmitter 403 generate electrical signals which indicate the throttle temperature and the throttle pressure of the steam entering the inlet of the steam turbine 36. Under typical peak load conditions, the turbine inlet steam temperature will be approximately 952° Fahrenheit and the turbine inlet steam pressure will be approximately 1,277 pounds per square inch (absolute). The outlet side of the steam turbine bypass valve 45 is connected to the desuperheater 46 by way of a steam pipe 404. A temperature element 405 generates an electrical signal which indicates the temperature of any steam flow from the desuperheater 46 to the condenser 31 by way of steam pipe 47. Under typical load conditions with both of the gas turbines 12 and 22 in operation, the bypass valve 45 is fully closed and no steam flows to the desuperheater 46.

Some of the steam in the incoming main steam pipe 34 is removed by way of a steam pipe 406 and supplied by way of a check valve 407, a superheater 408, a control valve 409 and a steam pipe 410 to the gland seals inside the steam turbine 36 to provide the desired sealing action therein. After passage through the gland seal structure, this gland steam is removed by way of a pipe 411 and passed to a gland steam condenser 412, the resulting condensate being passed to a drain tank (not shown) by way of a drain line 413.

Some of the steam in main steam line 34 is also supplied by way of a control valve 414 to an air ejector mechanism 415. Air ejector mechanism 415 is a Venturi type air ejector which is used to evacuate the condenser 31. The steam leaving the air ejector 415 passes by way of a steam line 416 to an air ejector steam condenser 417, the resulting condensate being passed to the drain line 413. Air is removed from the condenser 31 by way of a line 418 which runs to the air ejector 415. The Venturi effect occurring in the air ejector 415 serves to suck the air out of the condenser 31 by way of the air line 418. Under typical operating conditions, this evacuates the condenser 31 to a pressure of approximately two inches of mercury.

Extraction steam for feedwater heating purposes is removed from the steam turbine 36 between the tenth and eleventh stages thereof by way of turbine outlet 313 and is supplied by way of a steam pipe 420, a check valve 421, a control valve 422 and steam pipe 423 to a pair of branch steam pipes 424 and 425. The branch steam pipe 424 supplies extraction steam to the deaerator 68 included in the first steam generator 18 while the branch steam pipe 425 supplies extraction steam to the deaerator 90 included in the second steam generator 28. The "internal water removal" steam removed between the 12th and 13th stages via the steam turbine outlet 314 is supplied by way of steam pipe 426 to the condenser 31. Level transmitters 428 and 429 produce electrical signals which indicate the water levels in hotwell portions 335a and 335b, respectively.

Condensate is pumped from the two hotwell portions 335a and 335b of the divided hotwell 335 by means of condensate pumps 30a and 30b, respectively. The inlet side of pump 30a is connected to the hotwell condensate outlet 338a (FIG. 12), while the inlet side of pump 30b is connected to the hotwell condensate outlet 338b (FIG. 12). The condensate pumped by pumps 30a and 30b is supplied by way of a condensate pipe 430, the air ejector steam condenser 417, the gland steam condenser 412, a condensate pipe 431 and a condensate pipe 432 to a pair of branch condensate pipes 434 and 435. Branch condensate pipe 434 runs to the deaerator 68 located in the first steam generator 18, while the second branch condensate pipe 435 runs to the deaerator 90 located in the second steam generator 28. The condensate as it leaves the pumps 30a and 30b is at a temperature of approximately 110° Fahrenheit. This condensate flows through the coolant tubes in the air ejector condenser 417 and the gland steam condenser 412 to provide the cooling action which occurs in these condensers 417 and 412. A normally-open manual crossover valve 436 is connected between the two hotwell outlets and can be closed if half the condenser 31 is shut down for maintenance purposes or the like. Each of the condensate pumps 30a and 30b has sufficient capacity to enable either pump alone to carry the full flow load in the event the other pump should fail.

Some of the condensate flowing in the pipe 431 is also supplied by way of a pipe 437, a desuperheater control valve 438 and a pipe 439 to the desuperheater 46. This condensate provides the cooling medium in the desuperheater 46. The desuperheater 46 is of the water spray type such that the relatively cool condensate entering by way of pipe 439 is sprayed into the relatively hot steam flow entering by way of the pipe 404. Under typical conditions for such steam flow, this lowers the steam temperature to about 350° Fahrenheit. The temperature signal produced by the temperature element 405 coupled to the desuperheater outlet pipe 47 is supplied by way of a temperature transmitter (not shown) and a temperature controller (not shown) to the desuperheater control valve 438 for purposes of regulating same to hold the temperature of the desuperheater outlet steam in pipe 47 fairly constant.

If the condensate level in the hotwell portions 335a and 335b becomes too low, then makeup water from a makeup water storage tank 440 is supplied to the hotwell portions 335a and 335b by means of a makeup water pump 441, a makeup block valve 441a, a makeup control valve 442 and a makeup water pipe 443 which runs to the makeup water inlet 340 on the condenser 31. Conversely, if the condensate level in hotwells 335a and 335b becomes too high, then condensate is returned to the makeup water storage tank 440 by way of a condensate return valve 444. In other words, the pump 441 is operated and the valves 442 and 444 are opened and closed as needed in order to hold the condensate level in hotwells 335a and 335b fairly constant. This is accomplished by means of level sensing switches (not shown) associated with the hotwells 335a and 335b which operate the appropriate control circuits (not shown) to control the pump 441 and the valves 442 and 444. Block valve 441a is fully open during normal operation. When needed, additional water is supplied to the makeup water storage tank 440 from an external water source by way of a demineralizer 445 and a control valve 446.

A pair of auxiliary steam bypass lines 447 and 448 are connected by way of a common bypass line 449 to the bypass steam pipe 404 which runs to the desuperheater 46. Bypass line 447 enables steam from the first steam generator 18 to be passed directly to the desuperheater 46 under certain operating conditions, while the bypass line 448 does likewise for the second steam generator 28.

Temperature elements 450 and pressure transmitters 451 generate electrical signals which serve to monitor the temperature and pressure of the incoming circulating water. The circulating water leaves the condenser 31 by way of the outlet pipe 110. A further temperature element 452 generates an electrical signal to monitor the temperature of the outgoing circulating water.

Various additional temperature elements, pressure transmitters, level transmitters and other measurement devices are associated with the condenser 31 and the steam turbine 36, these items being omitted from FIG. 2B for sake of simplicity.

Considering now the details of the first heat recovery steam generator 18 (FIG. 2A), condensate from the condenser hotwells 335a and 335b is supplied to the deaerator 68 by way of the condensate pipe 434, a flow element 501, the condensate control valve 32 (Cf. FIG. 1) and a check valve 502. A flow transmitter 503 cooperates with the flow element 501 to provide an electrical signal which indicates the value of the condensate flow rate through the flow element 501. Flow element 501 provides a restriction in the flow path and flow transmitter 503 measures the pressure difference across the restriction. As is well known, this pressure difference is indicative of the flow rate. Thus, flow element 501 and flow transmitter 503 constitute a well-known type of flowmeter for measuring fluid flow.

Deaerator 68 provides a feedwater heating action as well as a deaerating action, and it is of the spray tray or jet tray type. The condensate entering from check valve 502 is sprayed by way of spray nozzles into a tray structure which also receives steam from the low pressure evaporator tubes 263. More particularly, the water or condensate collected in the deaerator 68 flows to a low pressure feedwater storage tank 69 which, among other things, serves as a storage reservoir for the deaerator 68. Water from this storage tank 69 flows by way of a pipe 504, a low pressure circulation pump 505, a standby electric heater 506, the low pressure evaporator tubes 263 and a pipe 507 to a steam inlet into the tray structure inside the deaerator 68. Low pressure circulation pump 505 provides the desired fluid flow and the low pressure evaporator tubes 263 in the stack structure 64 serve to convert the water into steam. This steam is supplied to the deaerator 68 by way of pipe 507 to heat the condensate entering the deaerator 68 from check valve 502. This provides a substantial portion of the desired feedwater heating.

Electric heater 506 is used for standby heating purposes when the gas turbine 12 is not in service. If the gas turbine 12 is not in operation and if it is desired to maintain the steam generator 18 in a hot standby condition, then the heater 506 is controlled by a temperature switch 508 so as to maintain the temperature of the water in the storage tank 69 at a value of approximately 250° Fahrenheit. If, on the other hand, it is desired that the steam generator 18 be shut down for an extended period of time but not drained, then electric heater 506 is used to provide freeze protection. In this latter case, the heater 506 is controlled by a temperature switch 509 so as to prevent the temperature of the water in this part of the system from falling below a value of 40° Fahrenheit. In both of these cases, the low pressure circulation pump 505 must be turned on and operating. A pressure switch 510 monitors the operation of the pump 505 and produces the warning signal if the pressure differential across the pump 505 becomes too low.

For total plant loads above approximately 80% of the total plant capacity, supplemental feedwater heating is provided by the extraction steam taken from the steam turbine 36. This extraction steam is supplied to the deaerator 68 by way of the extraction steam pipe 424, a check valve 511, a motor operated isolation valve 512 and a steam pipe 513. The extraction steam control valve 422 is opened for plant loads above the 80% figure. Below this figure, the steam used for feedwater heating is obtained from the low pressure evaporator tubes 263.

Figure 3:
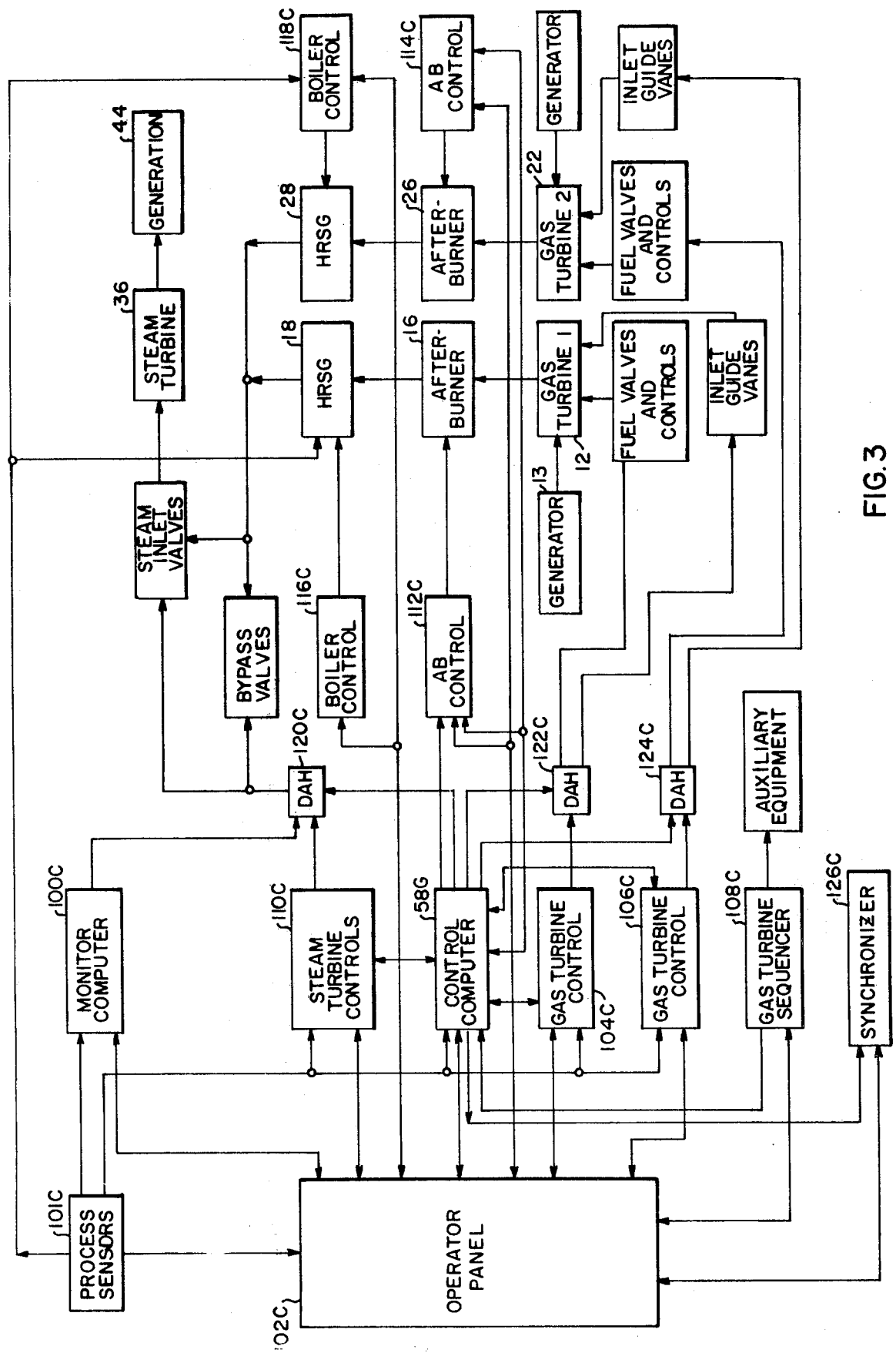
FIG. 3 shows a schematic view of a control system arranged to operate the plant of FIGS. 1, 2A, 2B and 2C in accordance with the principles of the invention.

Deaerator 68 is provided with a low pressure vent valve 514 which is controlled by an actuator 515. Actuator 515 is of the solenoid type and is controlled by an appropriate control signal from the main operator control board in the plant control center building 150 (FIG. 3). During normal operation, the vent valve 514 is kept fully open to allow air to escape from the deaerator 68. The deaerator 68 is also provided with a pressure safety valve 516. Deaerator 68 is provided with a further pressure release mechanism which includes a check valve 517 and a dump valve 518, the outlet side of the latter being connected by way of a pipe 519 to the auxiliary steam bypass pipe 447 by way of which steam may be returned to the desuperheater 46 and condenser 31. If the pressure within the deaerator 68 exceeds 160 pounds per square inch, dump valve 518 opens to dump steam in the deaerator 68 back to the condenser 31. Among other things, this prevents a popping of the safety valve 516.

A pressure transmitter 520 senses the pressure within the deaerator 68 and provides a signal indicative of the value thereof. Level switches 521 and 522 monitor the water level within the low pressure storage tank 69, switch 521 producing an electrical warning signal if the water level is too high and switch 522 producing an electrical warning signal if the water level is too low. A level transmitter 523 produces an electrical signal indicative of the actual water level in the tank 69.

Boiler feedwater stored in the low pressure storage tank 69 is pumped through the economizer tubes 262 in the stack structure 64 by means of a main boiler feed pump 524. The intake side of boiler feed pump 524 is connected to the storage tank 69 by means of a feedwater pipe 525. The outlet side of boiler feed pump 524 is connected to the inlet side of economizer tubes 262 by means of a check valve 526, a motor operated block valve 527 and a feedwater pipe 528. Valve 527 is open during normal operation. The electric motor which runs the boiler feed pump 524 has a nominal rating of 1250 horsepower. A pressure safety valve 529 is connected between the outlet side of pump 524 and the low pressure storage tank 69. A pressure switch 530 monitors the pressure difference across the boiler feed pump 524 and produces an electrical warning signal if such pressure difference falls below a desired lower limit. A further pressure switch 531 monitors the pressure in the feedwater pipe 528 and produces an electrical warning signal if such pressure falls below a desired lower level.

A standby boiler feed pump 532 is connected in parallel with the main boiler feed pump 524 and the valves 526 and 527, the outlet side of this standby pump 532 being connected by way of a check valve 533 and a motor-operated block valve 534 to the feedwater pipe 528 which runs to the inlet of the economizer tubes 262. During normal operation of the steam generator 18, the standby pump 532 is turned off and the block valve 534 is closed. The electric motor which runs the standby pump 532 has a nominal rating of 25 horsepower. The standby pump 532 is used when the steam generator 18 is in either the hot standby mode or the freeze protection mode. At such time, the main boiler feed pump 524 is turned off and its block valve 527 is closed. A pressure safety valve 535 is connected to the outlet side of the standby pump 532 and is connected back to the low pressure storage tank 69. A pressure switch 536 monitors the pressure difference across the standby boiler feed pump 532 and produces an electrical warning signal when the pressure difference is too low.

A manually-operated drain valve 537 is provided for draining the deaerator 68 and low pressure storage tank 69 when the steam generator 18 is to be shut down for maintenance purposes or other desired reasons. A manually-operated vent valve 538 is connected to the economizer feedwater pipe 528 for venting air from the system when the steam generator 18 is being shut down and the system filled with a nitrogen blanket. During normal operation, the drain valve 537 and the vent valve 538 are closed.

During normal load operation, the main boiler feed pump 524 pumps boiler feedwater through the economizer tubes 262, such feedwater being obtained from the low pressure storage tank 69. Under typical peak load conditions, the feedwater leaving the storage tank 69 will be at a temperature of approximately 250° Fahrenheit. As this feedwater flows through the economizer tubes 262, it is heated to within 5° Fahrenheit of the saturation temperature, that is, the temperature at which it will boil at the pressure at hand. Under typical peak load conditions, the feedwater leaving the economizer tubes 262 will be at a temperature of approximately 570° Fahrenheit.

The hot feedwater leaving the economizer tubes 262 goes to two different places. Firstly, some of this feedwater flows by way of a pipe 540, a flow element 541, a feedwater control valve 542, a check valve 543 and a pipe 544 to the feedwater reservoir section 70a of the vertical steam drum 70. The remainder of the hot feedwater leaving economizer tubes 262 flows by way of pipe 540, a flow element 545, a recirculation control valve 546 and a pipe 547 back to the deaerator 68, wherein it serves to provide some of the heating of the condensate entering the deaerator 68.

During normal load operation, the feedwater control valve 542 and the recirculation control valve 546 are automatically controlled in a coordinated manner to keep constant the water flow rate through the economizer tubes 262. For example, if less water is required by the feedwater reservoir 70a (lower load level), then more water is recirculated back by way of the valve 546 to the deaerator 68, the proportions being such as to hold constant the water flow in the pipe 540. As the power generated by steam turbine 36 increases, more economizer water flow is directed to the feedwater reservoir 70a.

Constant water flow through the economizer tubes 262 is important in order to minimize steaming and prevent stagnation in some of the economizer tubes 262 at part loads. If the flow rate were not constant but instead were allowed to vary with load, then the flow rate would decrease as the load decreased. At the lower flow rates, the likelihood of steaming would be greater. The problem with steaming is that it produces an increased pressure drop in the tube wherein it is occurring. This leads to less flow and more steaming and ultimately stagnation or a complete absence of flow in such tube.

In the present embodiment, the flow rate is maintained constant at a relatively high value such that the same high water velocities are provided in the various economizer tubes at all load levels. Thus, the pressure drop across the entire economizer section 262 is relatively high at all load levels. Consequently, any increase in pressure drop caused by steaming in certain tubes is small compared to the total pressure drop, resulting in insignificant changes in water flow and thereby preventing stagnation in any of the economizer tubes 262. In addition, the higher pressure drops produced by the higher water velocities through the economizer tubes 262 promotes a more uniform distribution of water flow through the economizer tubes which, among other things, results in higher heat transfer coefficients on the inside of the tubes.

A further advantage of the constant water flow rate through the economizer tubes 262 is that the main boiler feed pump 524 operates at a constant and optimum rate in terms of pump efficiency for all plant load levels.

A flow transmitter 548 and a temperature element 549 are associated with the feedwater flow element 541, with the flow transmitter 548 providing an electrical signal indicative of the feedwater flow rate through the flow element 541 and the temperature element 549 providing temperature compensation for the flow rate signal. Similarly, a flow transmitter 550 and a temperature element 551 are associated with the recirculation path flow element 545, with the flow transmitter 550 providing an electrical signal indicative of the value of the flow rate of the water flowing back to the deaerator 68 and the temperature element 551 providing temperature compensation for the flow rate signal. A manually-operated drain valve 552 is connected to the feedwater pipe 540 for purposes of draining the economizer tubes 262 when the steam generator 18 is to be shut down. During normal operation, the drain valve 552 is closed.

The hot, nearly boiling feedwater in the feedwater reservoir 70a is pumped through the high pressure evaporator tubes 261 by a high pressure circulation pump 554. The electric motor associated with this pump 554 has a nominal rating of 60 horsepower. The inlet side of the pump 554 is connected to the feedwater reservoir 70a by way of pipe 555. The outlet side of pump 554 is connected to the high pressure evaporator tubes 261 by way of a standby electric heater 556 and a pipe 557. As the hot feedwater flows through the high pressure evaporator tubes 261 it is converted into steam which is then supplied by way of a pipe 558 to the moisture separator section 70b of the steam drum 70. Under typical peak load conditions, the steam leaving the high pressure evaporator tubes 261 will be at a temperature of approximately 575° Fahrenheit.

The high pressure circulation pump 554 is of a type which employs floating ring type seals. The water required for these seals is obtained from the economizer inlet pipe 528 by way of a pipe 560, a water-to-water heat exchanger or cooler 561, a motor-operated control valve 562 and a pipe 563. Heat exchanger 561 cools the 250° Fahrenheit water coming from the feedwater pipe 528 to a temperature of approximately 150° Fahrenheit. The water leaving the pump seals is carried to a drain by way of a pipe 564.

With floating ring type seals, it is necessary to control the flow of water through the seals such that flashing will not occur since flashing of the water through the seals would result in erosion of the labyrinth elements in the seals. To this end, a temperature element 565 is located in the atmospheric collection chamber at the exit of the seals to sense the temperature of the seal water leaving the seals. This temperature element 565 produces an electrical signal which is supplied to a temperature transmitter (not shown) which drives a temperature controller (not shown) which, in turn, controls the motor 566 which operates the seal water control valve 562. This control loop modulates the control valve 562 to assure that only the required amount of water is provided to the pump seals.

Water for the stuffing box in the high pressure circulation pump 554 is supplied thereto from the cooling water source for heat exchanger 561 by way of a pipe 567. The stuffing box water is drained by way of the drain pipe 564. A pressure switch 568 monitors the pressure difference across the pump 554 and produces an electrical warning signal if this pressure becomes too low. A further pressure switch 569 monitors the differential pressure across the seals in pump 554 to provide an electrical warning signal if this pressure differential becomes too low.

The electric heater 556 is used for standby and freeze protection purposes when the gas turbine 12 is not in service. When the gas turbine 12 is not in operation and the steam generator 18 is in the hot standby mode, the heater 556 is controlled by a pressure switch 570 to maintain the proper steam pressure in the steam drum 70. In other words, pressure switch 570 turns on the heater 556 if the steam drum pressure falls below the desired minimum value. On the other hand, if the plant 10 is shut down for an extended period of time and the plant operator chooses not to generate steam in the steam generator 18, then the heater 556 is controlled by a temperature switch 571 to maintain the water in the steam drum 70 above the freezing point. The high pressure circulation pump 554 must be kept on and operating during either of these operating modes for the heater 556.

The moisture separator section 70b of the steam drum 70 receives the wet steam from the high pressure evaporator tubes 261 and removes practically all of the remaining water from such steam. The resulting dry steam leaves the moisture separator 70b and is supplied by way of a steam pipe 572 to the superheater tubes 260 located in the stack structure 64. Under typical peak load conditions, the dry steam leaving the moisture separator 70b is at a temperature of approximately 575° Fahrenheit and a pressure of approximately 1300 pounds per square inch (absolute).

A pressure transmitter 573 generates an electrical signal which indicates the steam pressure at the outlet of the moisture separator 70b. A high pressure vent valve 574 is connected to the steam line 572 for purposes of, among other things, venting some of the steam if it appears that the steam pressure inside the steam drum 70 is becoming too large. During normal operation, the vent valve 574 is closed. The steam drum 70 is also provided with one or more pressure safety valves which for simplicity of illustration, are not shown.

A steam line 575 is connected from the main steam pipe 572 to a deaerator pressure control valve 576 which is, in turn, connected to an additional steam inlet of the deaerator 68. The control valve 576 is controlled by a pressure controller 577 which is responsive to the pressure within the deaerator 68. Pressure controller 577 and control valve 576 function to maintain the desired steam pressure in the deaerator 68 at part loads for the plant 10. If the steam pressure within the deaerator 68 falls below the desired value, then pressure controller 577 opens the valve 576 to bring the pressure back up to the desired value. This is most likely to occur at part loads of less than about 80% because, in such cases, the extraction steam control valve 422 (FIG. 2B) is closed and no extraction steam is being supplied to the deaerator 68.

A nitrogen gas supply 578 is connected to the main steam pipe 572 by way of an actuator-operated nitrogen admission valve 579 and a check valve 580. During normal operation, the nitrogen admission valve 579 is closed and no nitrogen is admitted into the steam system. Valve 579 is opened during the process of draining and venting the steam generator 18 and transferring it to a dry status. The nitrogen valve 579 is opened as more or less the final step in this process. The nitrogen gas is admitted into the steam system for purposes of replacing steam which condenses in the system during the draining and venting process. Among other things, this minimizes subsequent rusting or scaling in the steam drum 70 and the evaporator and superheater tubes 261 and 260. As mentioned elsewhere herein, the gas turbine 12 can be operated for prolonged periods of time with the steam generator 18 in a dry conditions without causing serious damage to the boiler tubes 260-263 and other parts of the steam generator 18.

The feedwater reservoir section 70a of the steam drum 70 is provided with a high-indicating level switch 581, a low-indicating level switch 582 and a level transmitter 583. Switch 581 produces an electrical warning signal when the water level in the reservoir 70a gets too high, while switch 582 produces an electrical warning signal when the water level gets too low. Level transmitter 583 produces an electrical signal indicating the actual water level in the reservoir 70a. The water level signal from the transmitter 583 is supplied to a controller (not shown) which controls the feedwater control valve 542 to maintain a fairly constant water level in the feedwater reservoir 70a.

As the dry steam from the steam drum 70 flows through the superheater tubes 260, it is further heated to raise its temperature another 300° to 400° Fahrenheit. Under typical peak load conditions, the superheated steam flowing in the main steam outlet line 37 is at a temperature of 952° Fahrenheit and a pressure of approximately 1277 pounds per square inch (absolute). During normal operation of the plant 10, this superheated steam flows by way of main steam outlet line 37, isolation valve 38, steam pipe 34 and steam turbine valves 35a, 35b, 308a and 308b to the main steam inlet of the steam turbine 36. Connected in series in the main steam outlet line 37 are a flow element 584 and a check valve 585. A flow transmitter 586 and a temperature element 587 (for temperature compensation of flow transmitter 586) are associated with the flow element 584, the flow transmitter 586 producing an electrical signal indicating the value of the output steam flow rate for the steam generator 18. During normal load operation, the main steam isolation valve 38 is, of course, fully open.

The final output steam temperature for the steam generator 18 is the temperature of the superheated steam flowing in the steam generator outlet line 37. This temperature is primarily determined by the temperature rise of the steam in the superheater tubes 260, this temperature rise being dependent on the temperature of the exhaust gas leaving gas turbine 12 and the amount of supplemental heat added to the turbine exhaust gas by the afterburner 16. The final steam temperature in outlet line 37 is also controlled in part by means of a superheater bypass valve 588 which is connected between the inlet and outlet of the superheater tube section 260. More specifically, the outlet side of bypass valve 588 is connected to the superheater outlet header 264 to which is connected the steam generator outlet line 37.

Superheater bypass valve 588 controls the output steam temperature by bypassing some of the lower temperature steam coming from the steam drum 70 around the superheater tubes 260 and then mixing this lower temperature bypassed steam with the higher temperature superheated steam emerging from the superheater tubes 260. Other things being constant, the greater the degree of opening of the bypass valve 588, the greater the amount of the lower temperature steam which is bypassed and, hence, the lower the temperature of the steam flowing to the steam turbine 36. The maximum amount of steam that can be bypassed by the bypass valve 588 is about 20% of the total steam flow from the steam drum 70.

The superheater bypass valve 588 is the final control element in a temperature control loop which is used to regulate the output steam temperature to hold it fairly constant at a predetermined setpoint value. In the present embodiment, this predetermined setpoint value is 952° Fahrenheit. Also included in this temperature control loop is a temperature element 589 which senses the temperature of the steam flowing in the outlet steam line 37 downstream of the bypass valve 588. Temperature element 589 cooperates with a temperature transmitter (not shown) to produce an electrical signal which is transmitted to a temperature controller (not shown) which controls the degree of opening of the superheater bypass valve 588. If the steam temperature in the outlet line 37 is greater than the 952° Fahrenheit setpoint value, then the temperature controller sends a signal to the bypass valve 588 to increase the degree of opening of such valve. This reduces the steam temperature in outlet line 37 to bring it back to the 952° value. Conversely, if the steam temperature in outlet line 37 is less than 952° Fahrenheit, the temperature controller decreases the degree of opening of the bypass valve 588. This causes more steam to pass through the superheater tubes 260 and thus increases the temperature of the steam in the outlet line 37.

This type of temperature control system has several advantages. It is superior to a system in which water is injected into the superheated steam to cool it because such a system could also send slugs of water into the steam turbine if its control valve failed. Since the present system injects dry steam, this is not a problem. The present system is also better than a system which controls steam temperature by varying the afterburner firing rate because it will respond more rapidly to load charges.

There is also connected to the main steam outlet line 37 a normally-closed manually-operated vent valve 590, a pressure safety valve 590a, a temperature element 591 and a pressure transmitter 592. During normal operation, the vent valve 590 and the previously considered drain valve 48 are closed. Temperature element 591 and pressure transmitter 592 generate electrical signals which indicate the temperature and pressure of the steam in the outlet line 37 and transmit such signals to the plant control center building 150.

In certain situations, the main steam isolation valve 38 is closed and the steam produced by the steam generator 18 is bypassed to the condensor 31 by way of an auxiliary steam bypass path which includes a check valve 593, a motor-operated block valve 594 and a steam line 595 which runs to and connects with the auxiliary steam bypass line 447 which communicates with the desuperheater 46 by way of pipes 449 and 404. This particular arrangement wherein the main steam isolation valve 38 is closed and the auxiliary bypass block valve 594 is open is employed, for example, to drain the outlet steam line 37 of water when the No. 1 steam generator 18 is to be started up after the No. 2 steam generator 28 has already been put into operation and is busy supplying steam to the steam turbine 36.

The steam generator 18 further includes an automatic "blowdown" mechanism for minimizing the buildup of mineral deposits on the inner walls of the high pressure evaporator tubes 261. This blowdown mechanism includes a motor-controlled blowdown block valve 596 and a blowdown control valve 597 which are connected in series between the feedwater outlet pipe 555 of the steam drum 70 and an appropriate drain or sewer outlet 597a. During normal operation, the block valve 596 is full open.

The blowdown control valve 597 is controlled by a signal developed by a conductivity element 598 which continuously measures the conductivity of a sample portion of the steam drum feedwater, which sample portion flows by way of the block valve 596 and a cooler 599 to the drain outlet 597a. Conductivity element 598 is connected to the outlet side of the cooler 599, the function of the cooler 599 being to cool the feedwater sample to a temperature suitable for the conductivity element 598. The conductivity element 598 cooperates with a conductivity transmitter (not shown) to generate an electrical signal indicative of conductivity, which signal is transmitted to a conductivity controller (not shown) which controls the blowdown control valve 597.

The conductivity element 598 provides an electrical signal which indicates the electrical conductivity of the feedwater flowing in the steam drum outlet pipe 555. The "hardness" or mineral content of the feedwater in the steam drum outlet pipe 555 determines the conductivity of this feedwater. The greater the "hardness" or mineral content, the greater the conductivity.

The conductivity element 598 and its associated conductivity controller operate to adjust the degee of opening of the blowdown control valve 597 so as to keep the feedwater mineral content below a desired limit. If the feedwater mineral content increases above the desired limit, then the blowdown control valve 597 is opened to a greater degree to dump a greater amount of the steam drum feedwater into the drain outlet 597a. This tends to lower the water level in the system. This, in turn, signals the makeup water pump 441 and the makeup water valve 442 (FIG. 2B) to add fresh demineralized water to the system. This brings the mineral content of the water in the system back down to the desired level.

As seen from the foregoing description, the heat recovery steam generator 18 includes not only the stack structure 64 and the various boiler tubes 260–263 located therein, but also the deaerator 68, the low pressure storage tank 69, the steam drum 70 and the various other items 501–599 considered in connection therewith.

The normal operation of the heat recovery steam generator 18 will now be briefly summarized for the case where the combined cycle plant 10 is operating under typical peak load conditions. In this case, both of the gas turbines 12 and 22, both of the afterburners 16 and 26, both of the heat recovery steam generators 18 and 28 and the steam turbine 36 are in operation. The condensate pumps 30a and 30b pump condensate at a temperature of approximately 110° Fahrenheit from the condenser hotwell sections 335a an 335b via pipes 430, 431, 432 and 434 to the deaerator 68 wherein such condensate is deaerated and heated to a temperature of approximately 250° Fahrenheit by heat from the steam from the low pressure evaporator tubes 263, the extraction steam from the steam turbine 36 (via steam pipe 424) and the hot water being recirculated from the economizer tubes 262 by way of the recirculation control valve 546 and the pipe 547. This heated 250° water is supplied to the low pressure storage tank 69. At this point, the water is referred to as boiler feedwater.

The boiler feedwater in the storage tank 69 is pumped through the economizer tubes 262 by the main boiler feed pump 524. As this feed water flows through the economizer tubes 262, heat from the turbine exhaust gas raises its temperature to within 5° Fahrenheit of the saturation temperature, that is, the temperature at which it will boil at the particular pressure at hand. Typically, the hot feedwater leaving the economizer tubes 262 will be at a temperature of approximately 570° Fahrenheit. This hot feedwater flow to the feedwater reservoir 70a of the steam drum 70, the water level in the reservoir 70a being controlled by the feedwater control valve 542.

The hot feedwater in the reservoir 70a is pumped through the high pressure evaporator tubes 261 by the high pressure circulation pump 554. As the feedwater flows through the high pressure evaporator tubes 261, more heat from the turbine exhaust gas converts it into steam having a temperature of approximately 575° Fahrenheit. This steam is supplied to the moisture separator 70b which serves to remove practically all of the remaining moisture from such steam.

The resulting dry steam leaving moisture separator 70b flows by way of steam pipe 572 to the superheater tubes 260. As this steam flows through the superheater tubes 260, heat from the turbine exhaust gas at the gas entry end of the stack structure 64 raises its temperature to a value of approximately 952° Fahrenheit. The resulting superheated steam leaving superheater tubes 260 flows by way of steam generator outlet line 37 and steam pipes 39 and 34 to the steam turbine 36, wherein it is used to drive the rotor blades of the steam turbine 36. At the same time, the second steam generator 28 is similarly making superheated steam which is also flowing to the steam turbine 36 by way of steam pipes 42 and 34, this steam combining with the steam from the first steam generator 18 to produce the total driving force for the steam turbine 36.

As will be considered in greater detail hereinafter, when the combined cycle plant 10 is operating above a minimum load level with both steam generators 18 and 28 in operation, the steam turbine 36 is operated in a pure turbine following mode. In this mode, the steam turbine bypass valve 45 is fully closed and the steam turbine governor or control valves 35a and 35b and throttle or stop valves 308a and 308b are all fully open. In this case, the power developed by the steam turbine 36 is determined entirely by the steam generated by the steam generators 18 and 28 which is, in turn, determined by the operating levels of the gas turbines 12 and 22 and the afterburners 16 and 26.

The hot gas produced by the gas turbine 12 and the afterburner 16 flows vertically upward in the stack structure 64. On the other hand, the fluid in the superheater tubes 260 and the economizer tubes 262 flows in a downward direction, counter to the direction of gas flow. This downflow or counterflow in the superheater and economizer sections 260 and 262 provides better heat transfer for the steam and water moving through these sections. In the evaporator sections, namely, the high pressure evaporator 261 and the low pressure evaporator 263, the water and steam flow is in the upward direction which is the same direction as that of the hot gas flow. This is of particular importance with respect to the high pressure evaporator 261. Since the process of evaporation is isothermal, the temperature advantage is the same for either an upflow or a downflow design. The upflow design used for the high pressure evaporator section 261 is, however, more advantageous in that it permits operation at part loads by means of natural circulation should there be a failure of the high pressure circulation pump 554.

Considering now the No. 2 heat recovery steam generator 28, it is noted that this steam generator 28 includes, in addition to the elements previously considered, various elements bearing reference numerals 601 through 699, inclusive. These elements 601-699 are the same as elements 501-599, respectively, previously considered for the first steam generator 18. These elements 601-699 serve the same purposes and function in the same manner as do the corresponding ones of counterpart elements 501-599 in the first steam generator 18. Thus, the second steam generator 28 is of the same construction as and operates in the same manner as does the first steam generator 18. For this reason, a detailed description of the second steam generator 28 will not be given herein.

STEAM TURBINE MECHANICAL STRUCTURE

Figure 4:
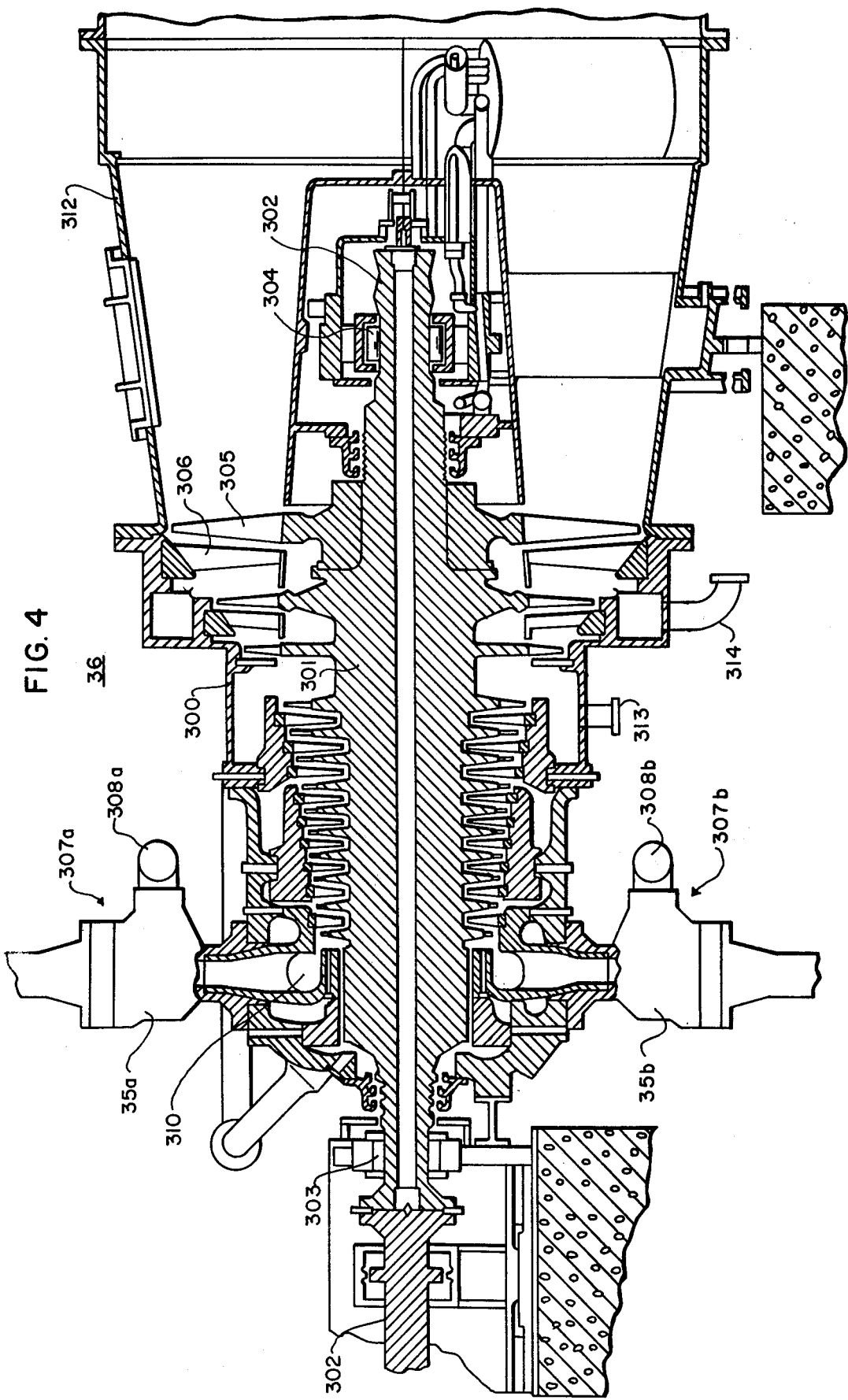
FIG. 4 illustrates a steam turbine structure which can be employed in the plant of FIGS. 1, 2A, 2B and 2C.

Referring now to FIG. 4, there is shown a longitudinal, partially cross-sectional, elevational view of the steam turbine 36. Steam turbine 36 is a 13-stage single-cylinder or single-element non-reheat type of steam turbine constructed for operation at a rated speed of 3,600 rpm and is capable of driving an electric generator for producing in excess of 107 megawatts of electrical power. The steam turbine 36 includes an outer casing 300 and an inner rotor structure 301 having a rotor shaft 302 which is supported at the high end of the turbine by a bearing 303 and at the exhaust end of the turbine by a bearing 304. The load being driven, in this case, the electric generator 44, is coupled to the high pressure end of the shaft 302. Thirteen sets of rotor blades 305 are mounted on the rotor structure 301, while thirteen intervening sets of stationary blades 306 are supported by the casing 300.

Mounted on top of the casing 300, at the high-pressure end thereof, is an upper steam inlet valve assembly 307a which includes a steam stop valve 308a followed by a steam control valve 35a. Attached to the bottom of the casing 300 is a second steam inlet valve assembly 307b which includes a steam stop valve 308b followed by a steam control valve 35b. For the sake of cross-reference, control valves 35a and 35b correspond to the control valve 35 shown in FIG. 1. Steam enters by way of the stop valves 308a and 308b (which are open during normal turbine operation), passes through control valves 35a and 35b and feeds into a 360° steam inlet or steam admission chamber 310 in the casing 300. In other words, there is a 100% arc of steam admission and both of the control valves 35a and 35b communicate with this arc. During normal operation, both of the valve assemblies 307a and 307b are operated in unison to function like a single valve assembly. When desired, either of the valve assemblies 307a and 307b may be tested while the steam turbine 36 is in operation.

The greater bulk of the steam passes through the various sets of rotary and stationary blades 305 and 306 and leaves the steam turbine 36 by way of an exhaust structure 312, the outer end of which is coupled to the duct 104 (FIG. 3) leading to the condenser 31. Some of the steam is extracted from the turbine 36 between the tenth and eleventh stages thereof by way of an extraction steam outlet 313. As will be seen, this extraction steam is supplied to the deaerators 68 and 90 (FIG. 2B) associated with the steam generators 18 and 28 for providing some of the feedwater heating performed in such deaerators 68 and 90. This extraction steam feedwater heating is typically employed for plant loads of 80% or more. A portion of the steam is also removed between the twelfth and thirteenth stages by way of outlet 314 and passed directly to the condenser 31. This so-called "internal water removal" provides a turbine end loading which is less than the maximum allowable.

The steam turbine 36 is constructed to utilize incoming steam having a pressure of approximately 1200 pounds per square inch and a temperature of approximately 950° Fahrenheit. The height of the rotor blades 305 in the last row or set at the exhaust end of the turbine 36 is 28.5 inches, this being a measure of the flow capacity of the steam turbine 36. The steam turbine 36 is capable of driving an electric generator to produce in excess of 107 megawatts of electrical power.

PLANT CONTROL SYSTEM

The plant control system 50 is organized to operate the plant equipment safely through startup and loading with high reliability so that the plant is highly and quickly available to meet power demanded from it. To achieve this purpose, the plant control system is preferably embodied in digital/analog hybrid form, and the digital/analog interface is preferably disposed in a way that plant protection and plant availability are enhanced.

Generally, the total plant power is controlled by controlling the operating level of the turbines and the afterburners, but the steam turbine goes into a follow mode of operation once the steam bypass valves are closed and the steam turbine inlet valves are fully opened. In the follow mode, the steam turbine produces power at a level dependent on the steam conditions generated by the heat inputs to the steam generators.

As shown in FIG. 3, the control system 50 includes a digital control computer 58G, a digital monitor computer 100C and various analog controls for operating the plant equipment in response to process sensors 101C while achieving the described objectives. In this instance an automatic startup control for the steam turbine 36 is largely embodied in the monitor computer 100C. An operator panel 102C provides numerous pushbutton switches and various displays which make it possible for the plant to be operated by a single person. The pushbutton switches provide for numerous operator control actions including plant and turbine mode selections and setpoint selections.

In the operator analog or manual mode of operation, the operator sets the fuel level for the gas turbines 12 and 22 and the afterburners 16 and 26 through gas turbine controls 104C and 106C during loading, but an analog startup control included in each of the gas turbine controls 104C and 106C automatically schedules fuel during gas turbine startups. In addition, sequencers 108C start and stop auxiliary equipment associated with the gas turbines during gas turbine startups. The turbine bypass steam flow and the turbine inlet steam flow are controlled by operator valve positioning implemented by a steam turbine control 110C during steam turbine startup and loading in the operator analog mode. Certain automatic control functions are performed for the steam and gas turbines by the controls 104C, 106C and 110C in the operator analog mode.

In the operator automatic mode, the computers 58G and 100C perform various control functions which provide for automatic startup and automatic loading of the gas and steam turbines under the direction of the operator on a turbine-by-turbine basis. Afterburner controls 112C and 114C and boiler controls 116C and 118C operate under operator setpoint control during the operator analog and operator automatic modes. Respective digital/analog hybrid circuits 120C, 122C and 124C interface the digital and analog controls.

Under plant coordinated control, the computer 58G generally directs the plant operation through startup, synchronization and loading to produce the plant power demand. The extent of coordinated plant control is dependent on the existing plant configuration, i.e. according to the availability of apparatus for operation or for coordinated operation. For example, if a gas turbine is shut down, it is excluded from coordination. Similarly, if the gas turbine has been excluded from coordinated control by the operator, the computer 58G will operate accordingly. In all coordinated control cases, the boiler controls 116C and 118C function separately, i.e. they react automatically to operator setpoints and signals generated by the process sensors 101C to control the steam generators according to plant conditions produced by coordinated turbine and afterburner operations. The computer 58G provides setpoint signals for the afterburners in the coordinated control mode but not in the operator automatic mode. Coordinated control provides the highest available level of plant automation, and the operator automatic and operator analog modes provide progressively less automation. Some parts of the analog controls function in all of the plant modes.

Generator synchronization is performed by a synchronizer 126C under operator control or under computer control in the coordinated mode. Generally, the respective generators are sequenced through synchronization by switching actions supplied to the synchronizer inputs and outputs.

Once the plant reaches hot standby and either gas turbine or both gas turbines have been started, the steam turbine can be started when minimum steam supply conditions have been reached. Thereafter, the turbines are accelerated to synchronous speed, the generators are synchronized and the fuel and steam valves are positioned to operate the turbines at the demand load levels. The manner in which the control system 50 is configured and the manner in which it functions throughout startup and loading depends on the selected plant mode and the selected or forced plant configuration and the real time process behavior.

DIGITAL/ANALOG HYBRID COUPLER (NHC) CARD

Figure 8:
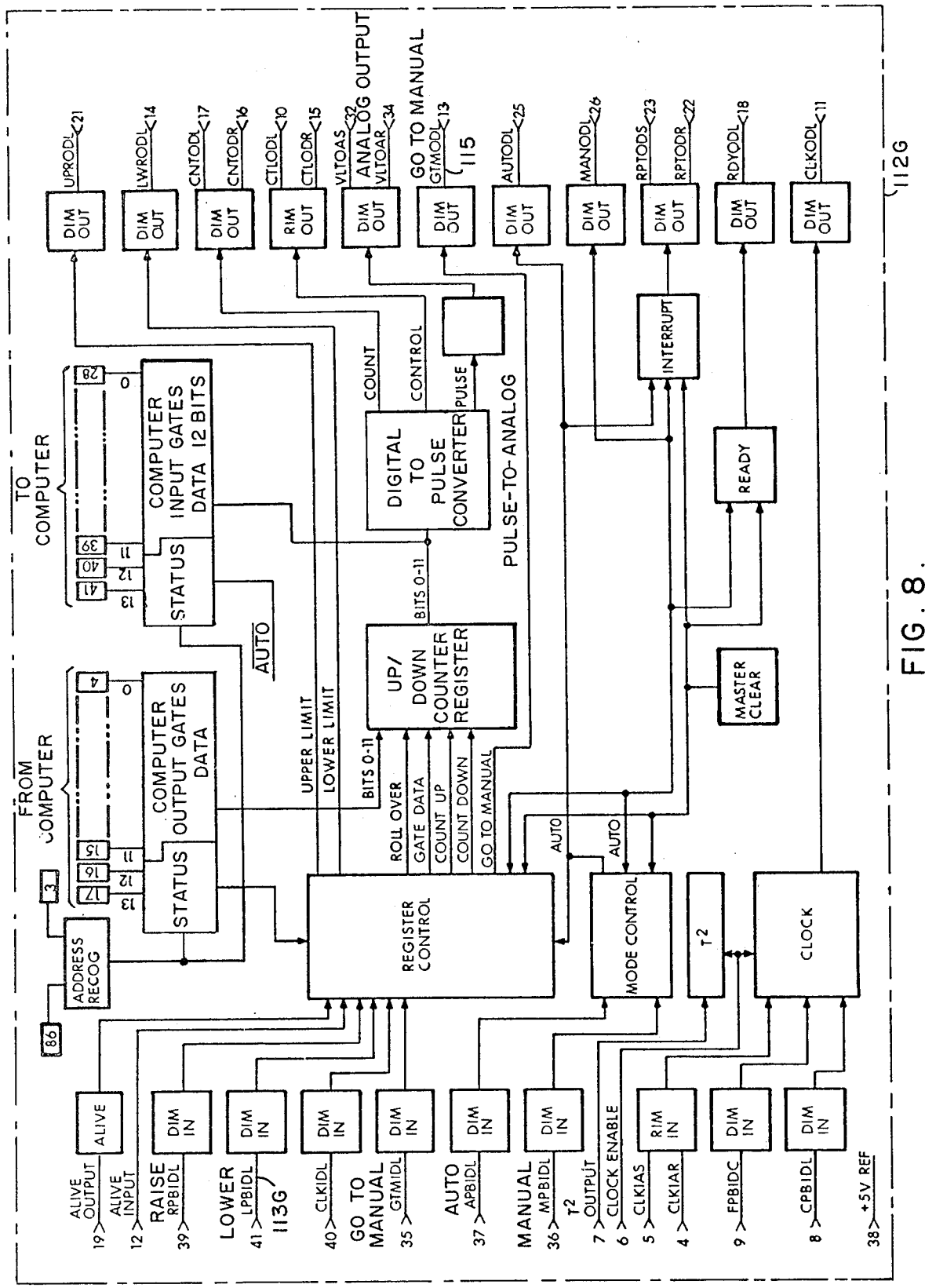
FIG. 8 shows a schematic diagram of a circuit card which provides a hybrid interface between the digital computer circuitry and the analog circuitry employed in the steam turbine control system.

NHC card 801 (FIG. 8) converts a 12 bit binary number from the computer to an analog output signal. This card operates in either the manual or the automatic mode. In the automatic mode, the NHC card output can be set or read by a computer peripheral channel. In the manual mode, the NHC card output is controlled by signals generated outside the computer which raise or lower the output.

In automatic operation, if the computer does not update the NHC card within a set time period, the card is set to the manual mode by an alive circuit. The alive circuit has a timing device which can be set for 1, 5 or 20 seconds. The time period is selectable by resistor and capacitor values.

In manual operation, clock pulses determine the rate of change of the analog output signal. The clock pulses may be generated by either an external or an internal clock.

Automatic Operation

The computer uses a 14 bit word to send and receive data and status. When the address recognition circuit senses that the computer is addressing the NHC card, it gates the data and status bits through the output gates. The status bits are routed to the register control and the data bits are routed to the up/down counter. The status bits are decoded and appropriate action is taken. The output of the up/down counter (which contains the last word from the computer) is converted to a pulse train by the digital/pulse converter. The pulse train is then converted to an analog signal. The output of the up/down counter and the status bits are routed to the input gates and sent to the computer.

Manual Operation

In the manual mode, the count in the up/down counter is regulated by external raise (RPBIDL) and lower (LPBIDL) signals generated either by pushbuttons from a manual/automatic control station or by logic circuitry. The clock will increment or decrement the counter as long as the raise or lower signal is present. Roll over is inhibited; that is, the up/down counter cannot count past 4095 or below 0. The clock rate, which is adjustable by analog control, i.e. by means of a variable voltage at pins 4 and 5, determines the amount of time it takes to change the signal level. When the raise or lower signal goes low, i.e. logical zero, the count in the up/down counter is held; thus, the analog output signal remains constant at that level. The D/A register consists of a set of binary up/down counters which accept parallel data and act as latches in the Automatic mode. In Manual mode the operator (or external logic) has control of the counters and can count them up or down. The raise/lower logic and the clock control this process. The raise and lower inputs control which direction the counters move. The counting rate is determined by the clock. If both raise and lower are enabled simultaneously the counters will do nothing.

Manual/Auto Transfer

If forced to Manual mode, the analog output signal remains unchanged at its last value until increased or decreased manually; thus, the transfer is bumpless. The external interrupt alerts the computer to a change in the card's operating mode. It is activated when the card goes from Auto to Manual or from Manual to Auto for any reason. A manual to auto transfer may be initiated only by the operator depressing the "Auto" pushbutton. The card will remain in Manual mode if any internal or external "Go To Manual" signal exists. A "Ready" output indicates that the card is in Manual mode and that no "Go To Manual" signal is present. The card can be forced to Manual by a "Go To Manual" signal. An internal "Go To Manual" is generated by the computer outputting a "Go To Manual" status, by either a "Raise" or "Lower" input, or by the Keep Alive circuit. After an Auto to Manual transition, the last number set in the D/A register by the computer remains until changed by the operator.

Figure 5:
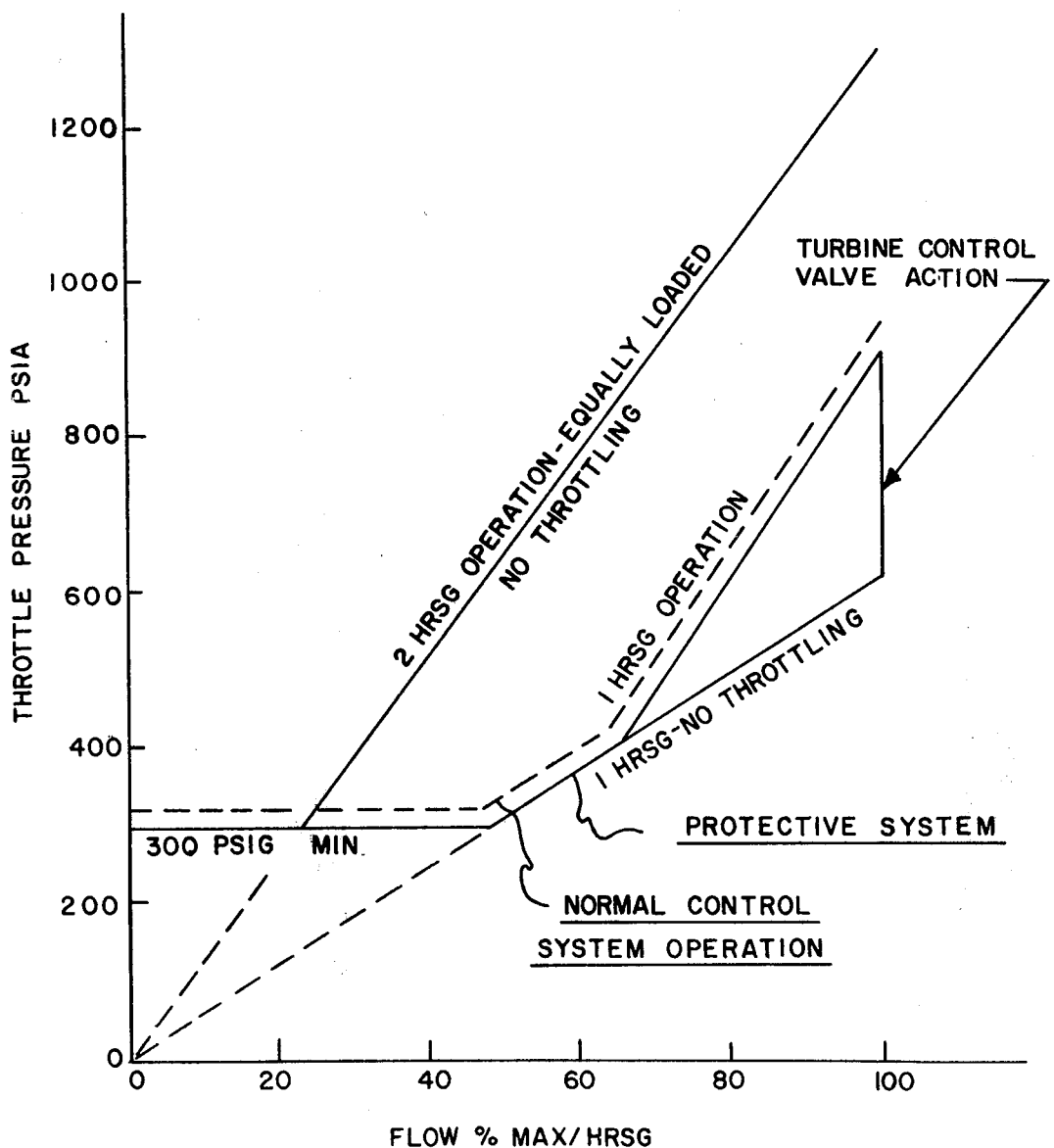
FIG. 5 is a graphical illustration of pressure versus flow characteristics of steam with one or both of the gas turbines operating in conjunction with the steam turbine and illustrating the effect of the throttle pressure limiting function of the control system of FIG. 3 for the plant of FIGS. 2A, 2B and 2C.

Referring to FIG. 5, line BF represents the normal pressure flow relationship with steam being generated by both HRSG's; and with the steam turbine control valves fully open. This rate of steam generation for operation of the steam turbine in one actual installation does not require throttling on the control valves, except to maintain a minimum pressure of in the order of 300 pounds per square inch as represented by line AB in order to satisfy the requirements of the heat recovery steam generators HRSG. Thus, the pressure can slide from 300 to a maximum of 1200 pounds depending on the steam flow or load of the turbine. The rate of steam generation for both HRSG's provides sufficient steam density with the pressure flow relationship being such that the probability of water carryover into the turbine and the erosion of the steam generator tubes is at a minimum.

For one HRSG, operation, the normal pressure flow relationship with the steam control valves wide open is represented by line OCD. The minimum pressure requirement of the HRSG necessitates throttling of the control valves in the zero to approximately 48% flow range as represented by line AC. The rate of steam generation and thus density of the steam in the 70 to 100% flow range with the steam control valve wide open as represented by line CD provides a pressure flow relationship wherein the velocity increases the probability of water carryover into the steam turbine and such steam velocity could also accelerate tube erosion.

Thus, for a rate of steam generation corresponding to one HRSG in service, the maximum permissible velocity requires throttling of the steam control valves above approximately 70% flow to provide a pressure flow relationship as represented by line GE. Thus, with one HRSG in operation, the pressure can slide along line GE for the corresponding flow or load, and the system should be controlled so that such pressure flow relationship will not fall below line GE.

In the present embodiment of the invention, the throttle pressure limiting control is implemented both in analog hardware and a programmed digital computer. The programmed digital computer automatically controls the turbine control valves to permit the pressure to slide between approximately 25% load and 100% load along and above line BF without throttling when both HRSG's are in service; and modulates the control valves to permit the pressure to slide above and along line GE as represented by dashed line 601 when only one HRSG is in service. It also maintains minimum pressure. The analog system throttles the control valves to prevent the pressure flow relationships from falling below line GE, when one HRSG is in operation; and maintains minimum pressure when one or both of the HRSG's are in operation. It also tracks and stores the actual operating pressure.

Another operational situation, which can create excessive steam velocity and affect the shrink-swell characteristics of the steam generation, thus increasing the probability of water carryover into the turbine, is the transfer from two HRSG operation to one HRSG operation. In this event, the pressure flow relationship can be maintained above the line GE by both the digital and analog control system, but the rapid decay of pressure without throttling between lines BF and GE, particularly in the high flow range can increase such probability. Therefore, the analog system includes a feature for limiting the rate of pressure decay until the pressure is on the line GE. Without such additional feature, the steam pressure would decay to line GE in the order of a fraction of a second while with such feature, the rate of decay is appreciably longer.

Figure 6A:
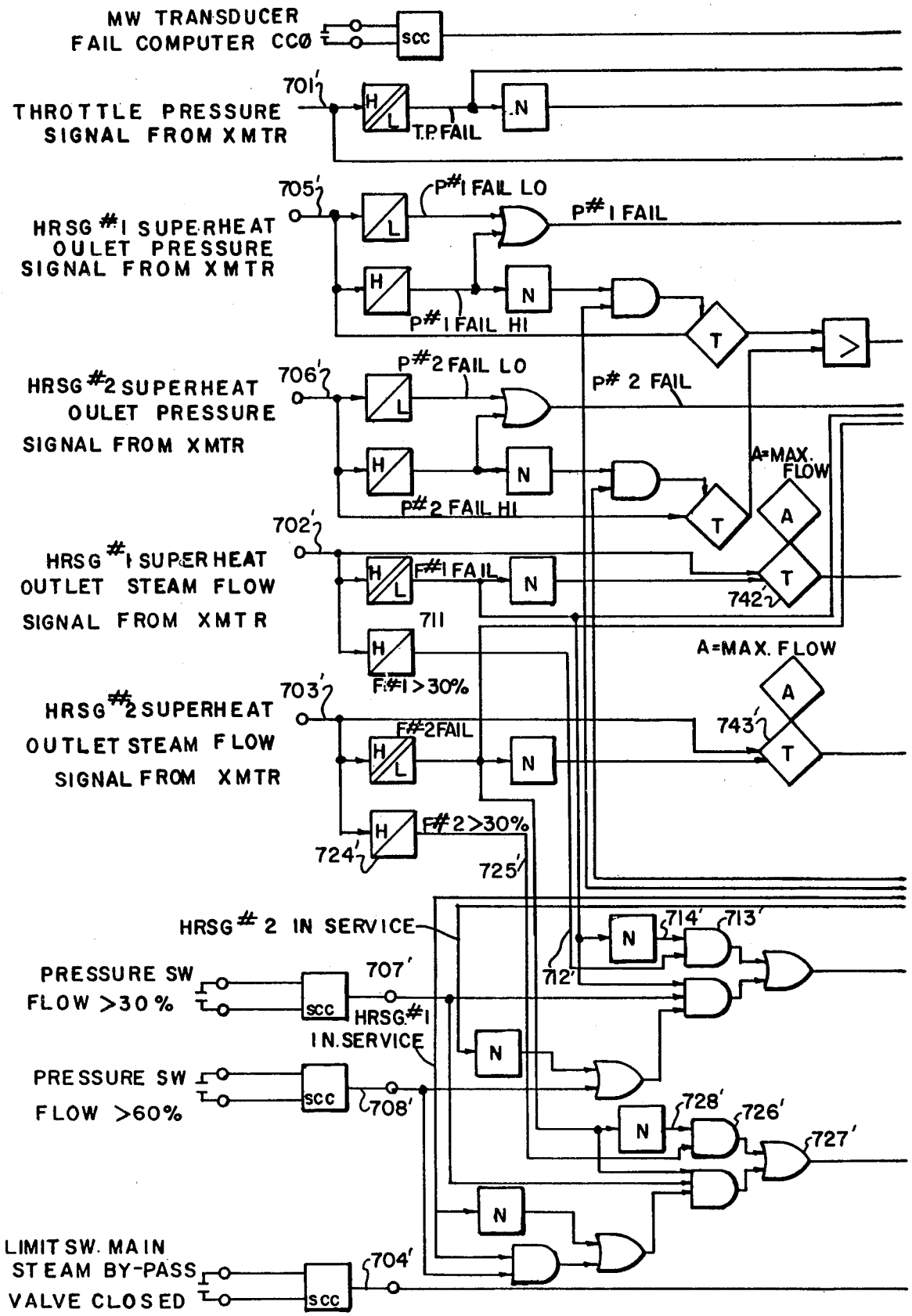
FIGS. 6A, 6B and 6C when placed side-by-side show a functional block diagram of a throttle pressure limit control arranged in accordance with the invention.
Figure 6B:
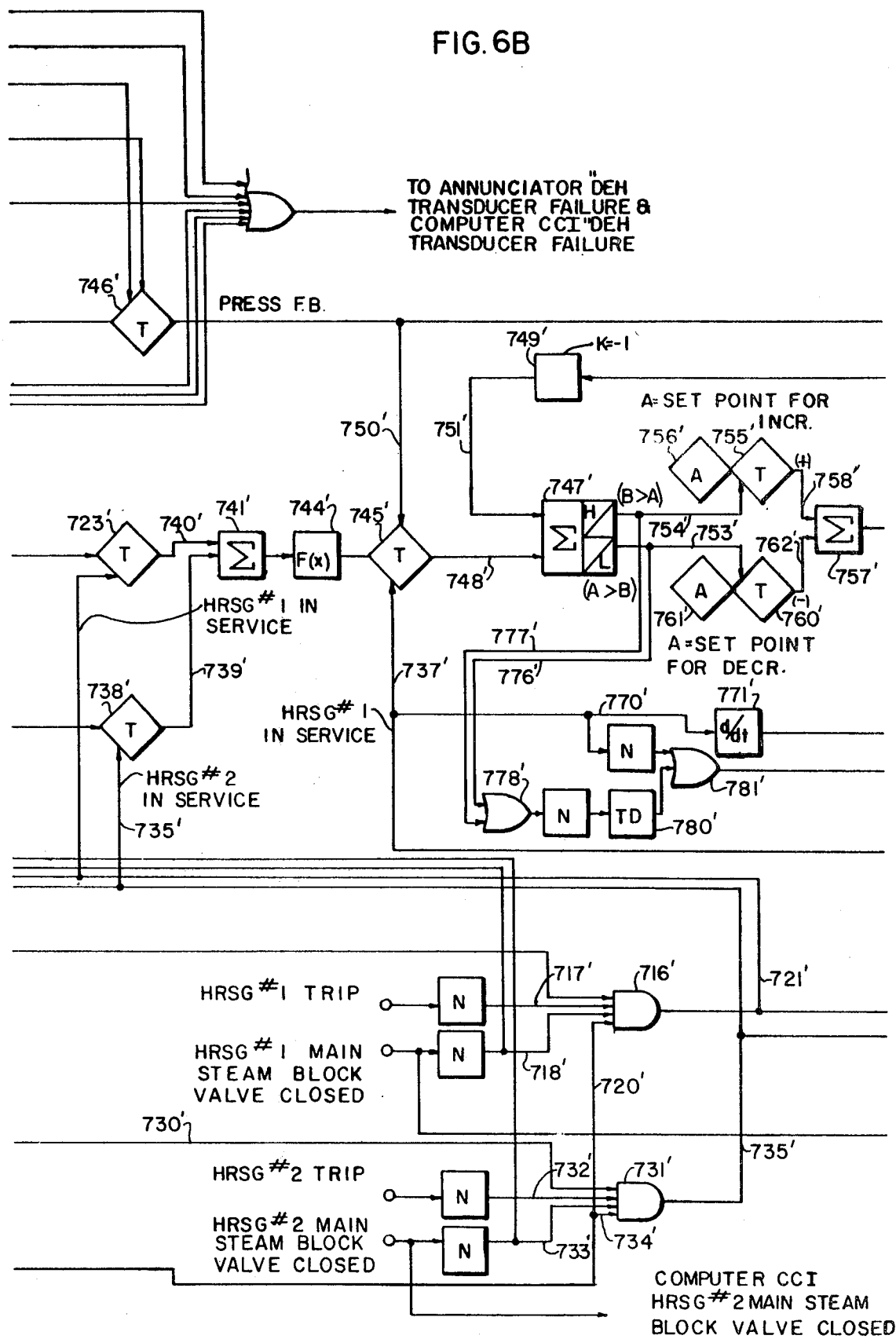
Figure 6C:
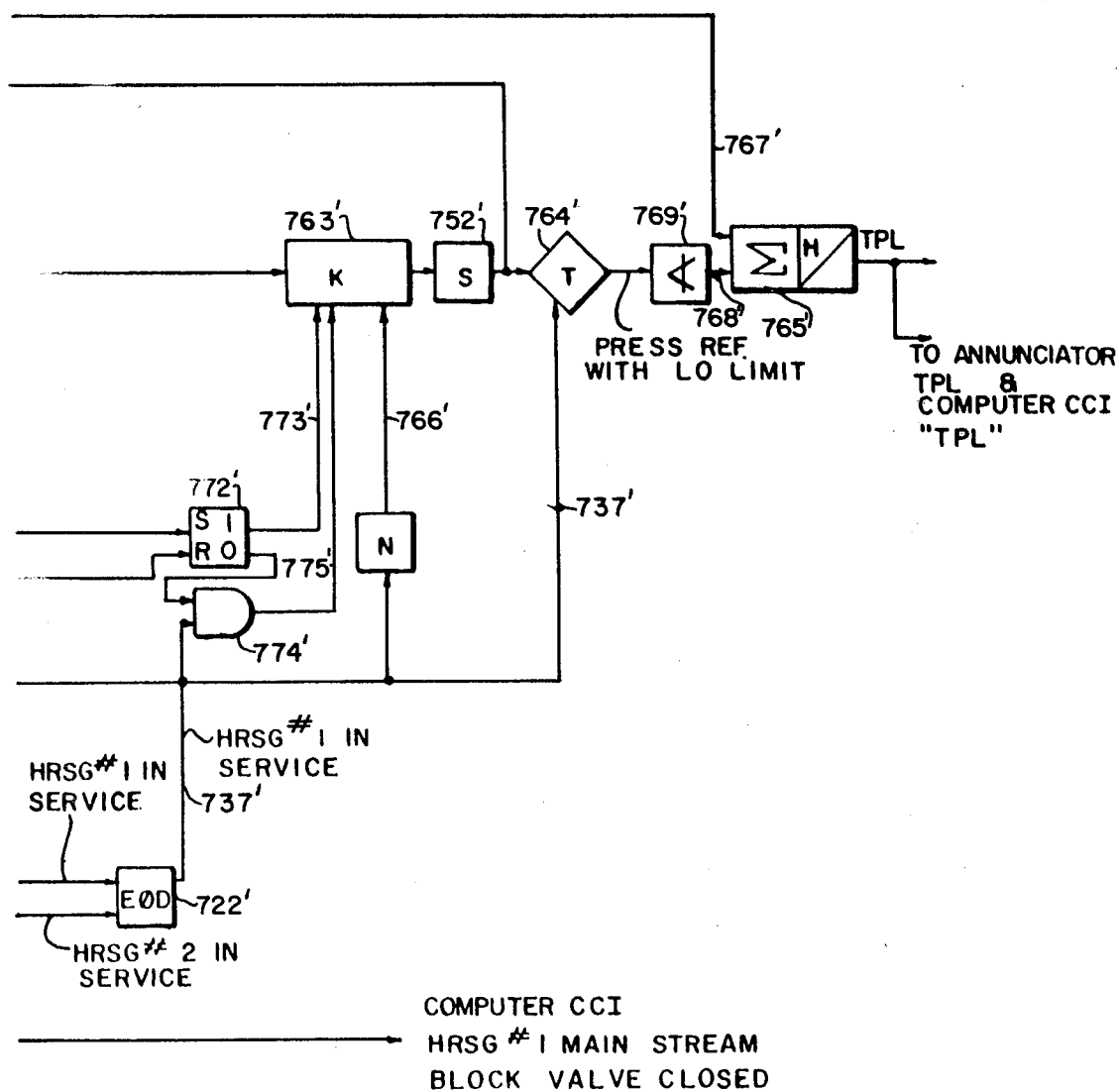

Referring to FIGS. 6A, 6B and 6C, the throttle pressure limiting system is controlled under various conditions of operation by the throttle pressure in the main steam header, the flow in each steam generator HRSG, and the closed condition of the main bypass valve. The throttle pressure is sensed in the line 34 (see FIG. 2B) and then an appropriate signal is transmitted by pressure transmitter 403. A signal representative of flow from the steam generator HRSG No. 1 is transmitted via the flow transmitter 586 (see FIG. 2A); and a signal representative of flow from steam generator HRSG No. 2 is transmitted via the flow transmitter 686 (see FIG. 2C).

Referring to hardwired system of FIGS. 6A, 6B and 6C, and more particularly to FIG. 6A, the throttle pressure signal from the transmitter 403 is applied at an input 701'. The superheated steam flow from the transmitter 586 is applied at an input 702', and the superheated steam flow from the transmitter 686 is applied at an input 703'. Additionally, a switch 704' senses the open or closed condition of the main steam bypass valve.

Inputs 705' and 706', to which is applied a signal representative of the outlet pressure from the steam generators HRSG1 and HRSG2, respectively, is utilized only in the event of a throttle pressure signal failure. Inputs 707' and 708', to which is applied a signal representative of a threshold level of flow above 30% and 60% of maximum respectively, is utilized in the event of a signal failure on input 702' or 703'. The portion of the circuitry of FIG. 6A, involved with providing operability in the event of a signal failure such as may be caused by a transducer failure, for example, is evident from the drawings; and the hardwired throttle pressure limiting system will be described for the sake of simplicity under non-failure input conditions in response to the inputs 701', 702', 703' and 704'.

The throttle pressure limiting system in response to the inputs 701'–704', broadly performs three primary functions; namely, it determines the number of steam generators that are in operation, selects the pressure flow relationship for the steam turbine in accordance with such determination, and either tracks the throttle steam pressure, or runbacks the steam control valve to maintain the selected pressure flow relationship as described in connection with FIG. 5.

The flow signal on input 702' is applied to a function block 711', which provides a digital signal on output 712' when the superheat outlet steam flow from HRSG No. 1 is greater than 30% of its maximum. This output on 712' is applied to an AND gate 713', which provides a digital output when there is a no failure condition on its other input 714'. The AND gate 713' through OR gate 715' provides a digital output to an AND gate 716'. In addition to the flow from HRSG No. 1 being greater than 30%, which eventually provides one of the digital inputs to the AND gate 716', inputs 717', 718' and 720' must have a digital signal present in order for the AND gate 716' to provide a digital output on a line referred to as 721' to indicate that HRSG No. 1 is in service. The input 717' is satisfied when it is indicated that the generator HRSG No. 1 is not tripped; the input 718' is satisfied when it is indicated that the main steam block valve for generator HRSG No. 1 is not closed, and the input 720' is satisfied when it is indicated from the input 704' that the main steam bypass valve is closed. The digital output on line 721' from the AND gate 716' is conducted to an exclusive OR function block 722', which provides a digital output when only one of its inputs 721' or 735' has a digital signal applied thereto. The output on line 721' to indicate that HRSG No. 1 is in service is connected to a transfer functional block or switch 723' to pass the signal from input 702'.

Similarly, a flow signal on input 703' for HRSG No. 2 is applied to a function block 724', which provides a digital signal on its output 725' when the superheated outlet steam flow from HRSG No. 2 is in excess of 30% of its maximum. The output on line 725' is applied to an AND gate 726' which in turn is applied to an OR gate 727'. The AND gate 726' has another input 728' which indicates a no fail condition on input 703'. Thus, when the outlet steam flow exceeds 30% for HRSG No. 2 a digital signal is present on output 730' which is applied to an AND gate 731'. The AND gate 731' also includes an input 732', 733' and 734', all of which must have a signal present in order for the AND gate 731' to provide a distinctive signal on its output 735' which leads to the exclusive OR gate 722'. A signal on the input 732' indicates that the generator HRSG No. 2 is not tripped, a signal on the input 733' indicates that the main steam block valve for HRSG No. 2 is open, and a signal on the input 734' indicates that the main steam bypass valve is closed. As previously mentioned, the exclusive OR function 722' which has an input 721' and 735' from generator HRSG No. 1 and HRSG No. 2 respectively provides a distinctive output when only one or the other of these two inputs has a distinctive signal. Thus, in order for the exclusive OR gate 722' to provide a distinctive signal on its output 736', one or other of the generators must be out of service. The output 735' is also connected to a switch 738', which passes the flow signal from the input 703'.

The switch 723' conducts an analog signal representative of the superheat outlet steam flow for generator HRSG No. 1 to an input 740' of a summing device 741' and the switch 738' conducts a signal on input 739' of the summing device 741'. Thus, when a digital signal is present on the input 721' or 735' indicating that HRSG No. 1 or HRSG No. 2, respectively is in service, an analog signal representative of the outlet steam flow is present on the respective input 740' or 739' as long as there is no failure condition. Should there be a failure condition, switch block 742' or 743', as the case may be provides a signal corresponding to maximum flow of HRSG No. 1 or HRSG No. 2. The device 741' which compares the values of the flow signal from inputs 702' and 703', passes the longest of the signals to a function generator 744'. The function generator 744' produces an output function corresponding to a predetermined pressure flow characterization corresponding to the line GE of FIG. 5.

The output from the function generator 744' is conducted to a transfer function block 745', which determines whether or the signal from the function generator 744' or a signal from transfer function block 746' is conducted to a summing device 747' over its output 748'.

When only one HRSG is in service, as indicated by a digital signal on output 737' from the exclusive OR gate 722', the output of the function generator 744' is conducted to the summing device 747'. When both HRSG's are in service, there is no signal present on the output 737'; and the switch 745' permits the actual throttle pressure applied at input 701' to be applied to the summing device 747' through switch 746' indicating a no failure condition and output 750'. Thus, when both HRSG's are in service, an analog signal representative of the actual throttle pressure is applied to the summing device 747'; and when only one HRSG is in service, an analog signal from the output of the function generator 744' is applied to the summing device 747' over the input 748'.

The device 747' directly compares the analog value of the signal of one polarity on the line 748' with a signal of opposite polarity on the input 751', which is connected through an amplifier 749' to an integrator 752'. When the analog signal on the line 751' is greater than the analog signal on the line 748', a digital output occurs on output line 753' of the comparing device 747'; and when an analog signal on input line 748' is greater than the analog signal on the line 751', a digital output occurs on the output 754' of the device 747'.

A digital signal on the output 754' causes a switch or transfer function block 755' to pass a first analog setpoint signal represented by a function block 756', to a summing device 757' by way of an input 758'. A digital signal on the output 753' causes a transfer function block 760' to pass a second analog setpoint signal represented by block 761' to the summing device 757' via an input 762'. The function block 756' represents a setpoint signal of suitable value to increase the signal at the output of the summing device 757'; and the function block 761' represents a signal of suitable value to decrease the signal at the output of the summing device 757'. The output of the summing device 757' is connected to an amplifier 763'. Thus, when the input signal 751' is greater than the input signal 748', the input to the amplifier 763' is decreased; and when the input signal 748' is greater than the input signal 751' the signal to the amplifier 763' is increased. When the analog signals on the inputs 751' and 748' are equal, there is no effective output from the summing device 757' to the amplifier 763'. The amplified analog signal from the amplifier 763' is applied to an integrator 752' which serves as a memory device. The output of the integrator 752' is applied through block 749' to provide an equal and opposite signal for the other input 751' of the comparator 747'. The output of the integrator 752' also applied to a switch 764' which passes the output of the integrator 752' to a comparator 765' only when one HRSG is in service. When both HRSG's are in service, switch 764' blocks the integrated signal from the integrator 752' and such integrator tracks the valve of the analog signal on the input 737' or 750' depending on whether one or both of the HRSG's are in service. The actual flow is tracked while both HRSG's are in operation to provide for the transfer from a two HRSG operation to a one HRSG operation.

The comparator 765' provides an output on line TPL only when the analog input signal on input line 768' from the low limite device 766' is greater than the signal on input line 767' representing the actual throttle pressure from the input 701'. The output on line TPL operates the steam inlet control valves toward a closed condition as described later herein.

The integrated signal from the integrator 752' is blocked by the switch or transfer function block 764' when both HRSG's are in service, and the limiting function 766' provides a pressure reference output for the summing device 765', corresponding to a minimum 300 pound throttle pressure for the steam generator. Thus, during a two generator operation the actual throttle pressure on input 767' to the summing device 765' is compared to the pressure reference on input 768' from the low limit device 766'. Under this condition of operation. Output TPL does not occur to operate the control valves of the steam turbine towards a closed position until the actual throttle pressure is less than the pressure reference or 300 pounds.

In the event the system transfers from a two HRSG operation to a one HRSG operation, in response to a turbine trip, for example, the exclusive OR gate 722' provides a digital output signal on the line 737' which operates the transfer function block 745' to block the actual throttle pressure analog signal on line 750', and pass the analog signal representative of a characteristic pressure flow relationship from the function generator 744'. As previously mentioned, the input to such function generator 744' is an analog signal representing the outlet steam flow from that generator HRSG which is still in service from either input 703' or 702' applied to the summing device 741'. Simultaneously, the transfer function 764' is switched in response to a digital signal on its input 737' to pass the integrated signal from the integrator 752' through the limit function 766' to the comparator 765'. In such event, and assuming that both generators HRSG are operating in the 100% flow range just prior to the transfer to a one HRSG operation, the integrated signal on 768' to the summing device 765' becomes greater than the actual pressure on input 767' which starts to close the valve. Also, the analog input to the summing device 747', which is now the characteristic pressure flow relationship, causes the signal on input 748' to change depending on the flow from the HRSG in service to operate the valve to a closed position depending on actual pressure as the pressure flow relationship decreases below the line GE as shown on FIG. 5. As long as such pressure flow relationship is above the line GE, then the input 748' remains in a static condition and the inputs to the comparator 757' are equal and there is no output on either 753' or 754', and thus, no analog output on TPL to operate the valves to a closed position.

During this transfer operation, the gain of the amplifier 763' is changed in accordance with the pressure of a digital signal on input 733', 755' or 776'. A change in the condition of the output 737' in response to a transfer from a two generator operation to a one generator operation also produces a signal on input 770' to a one shot multi-vibrator 771'. The operation of the one shot multivibrator sets a flip-flop or function block 772' to produce a digital signal on its output 773' connected to the amplifier 763' to change the rate of gain from the fast tracking rate to a slow transfer rate. The integrator 752' remembers the initial pressure prior to changing the operation from a two HRSG to a one HRSG state, and the pressure reference to the comparator 765' on input 768' is permitted to change slowly in accordance with the slow rate of gain of the amplifier 763'. During the time that the flip-flop 772' is in a state to provide a digital signal on the line 773', the transfer function 760' is switched to decrease the output of the integrator 752' in accordance with the setpoint from the function 761'. As long as the input from the integrator 752' is greater than the actual throttle pressure on the line 767', output will occur on the line TPL, and the control valves to the turbine will continue to close gradually in accordance with the selected rate of gain. Inasmuch as the gain of the amplifier 763' is at a slow rate, during such tranfer while the flip-flop 772' has an output on the input 773', the pressure reference on the input 768' changes very slowly until the one shot multivibrator 771' resets the flip-flop 772' to provide an output to AND gate 774' for providing a digital signal on input 775' to provide a medium rate of gain for the amplifier 763'.

When the outputs 753' and 754' of the comparator 747' are equal, indicating that the pressure flow relationship is on the line GE, there is no potential difference across inputs 776' and 777' of an OR gate 778'. This condition commences the operation of a timing device 780', which after a certain lapse of time produces an output through OR gate 781' to reset the flip-flop 772'. The resetting of the flip-flop 772' causes the AND gate 774' to conduct, thereby increasing the rate of gain of the amplifier 763' to the medium tracking rate. Upon transfer from a single HRSG operation to a two HRSG operation, the gain of the amplifier 763' is charged to a fast rate in response to a digital output on the input 766', and the resetting of the flip-flop 772' through the single service operation negative input 769'.

In summary, when both HRSG's are in operation, the pressure can slide upwardly or downwardly depending on the output of the generators without throttling the turbine inlet valves provided that the pressure is above the predetermined low limit. Should the pressure get below the minimum, then an output signal on TPL causes the control valve to the steam turbine to close, thereby building up the pressure in the steam generators at least to the lower limit. During the two HRSG operation, the integrator 752' remembers the actual pressure on the input 748' of the comparator 747' by the previously described circuit. Reference setpoints for increasing and decreasing the signal to the amplifier 763' are selected to be slightly below the generated setpoint of the throttle pressure control system of the digital computer in order to prevent interaction between the hardware and the programmed digital computer system. Thus, when both HRSG's are in operation, the pressure is permitted to slide at any position along the line BF, as shown in FIG. 5.

Upon the removal of one HRSG from operation, in response to a steam generator trip (for example); or, should one of the generators HRSG have its superheat outlet steamflow fall to below 30% of its maximum, the pressure reference on line 750' is switched by the transfer device 745', and the output of the function generator 744' is substituted therefor as the input to the comparator 747'. The characteristic output of the function generator 744' is controlled by the steam flow from the particular generator HRSG which is still in operation. The transfer device 764' is switched to the integrator 752' so that the actual pressure of the steam generators prior to the transfer to the one generator operation is substituted as the pressure reference. Upon transfer from two to one HRSG in service, the pressure would tend to fall very rapidly without any throttling action of the turbine control valve until the pressure flow relationship reaches line GE. However, the substitution of the flow from the steam generator in service according to the predetermined characterization of the function generator 744' together with a change in the rate of gain of the amplifier 763' to a slow transfer rate provides a throttling action for controlling the rate of decay of the pressure flow until it reaches the line GE of FIG. 5. In other words, the pressure is controlled to decay gradually between the curve BF and GE when transferring a one HRSG operation. The steam control valves for the turbine would continue to close in response to an output on TPL until such time as the pressure flow relationship is on the line segment GE of FIG. 5. When the input 768' is equal to the input on 751' for a predetermined length of time, then the input lines 776' and 777' have no potential and the gain of the amplifier 763' is switched to the medium operational rate for the one HRSG operation and the control valve will close or hold position to keep the pressure flow relationship on the line GE.

Briefly, upon transfer from two to one operation, the stored tracked output is applied to the comparator, and since the actual pressure is following the pressure prior to transfer is greater, and a TPL output occurs to throttle the valves. The substituted pressure flow relationship is of course less than the actual pressure to the input of the comparator, which applies a decreasing signal to the amplifier. Inasmuch as the rate of gain of the amplifier, is slow, the feedback from the output of the integrator is slow to shut off the signal for decreasing the pressure reference for cutting the output from TPL. Once the output of the integrator and the pressure reference obtained from the flow are equal, the control valves hold position, and a medium rate of gain is applied to the integrator. Then, the control valves will continue to close as required to maintain the pressure flow along the curve GE. Any opening of the control valves must be accomplished manually. Of course, when the pressure reaches the 300 pound minimum, throttling occurs through the limiting device 766'.

Figure 15A:
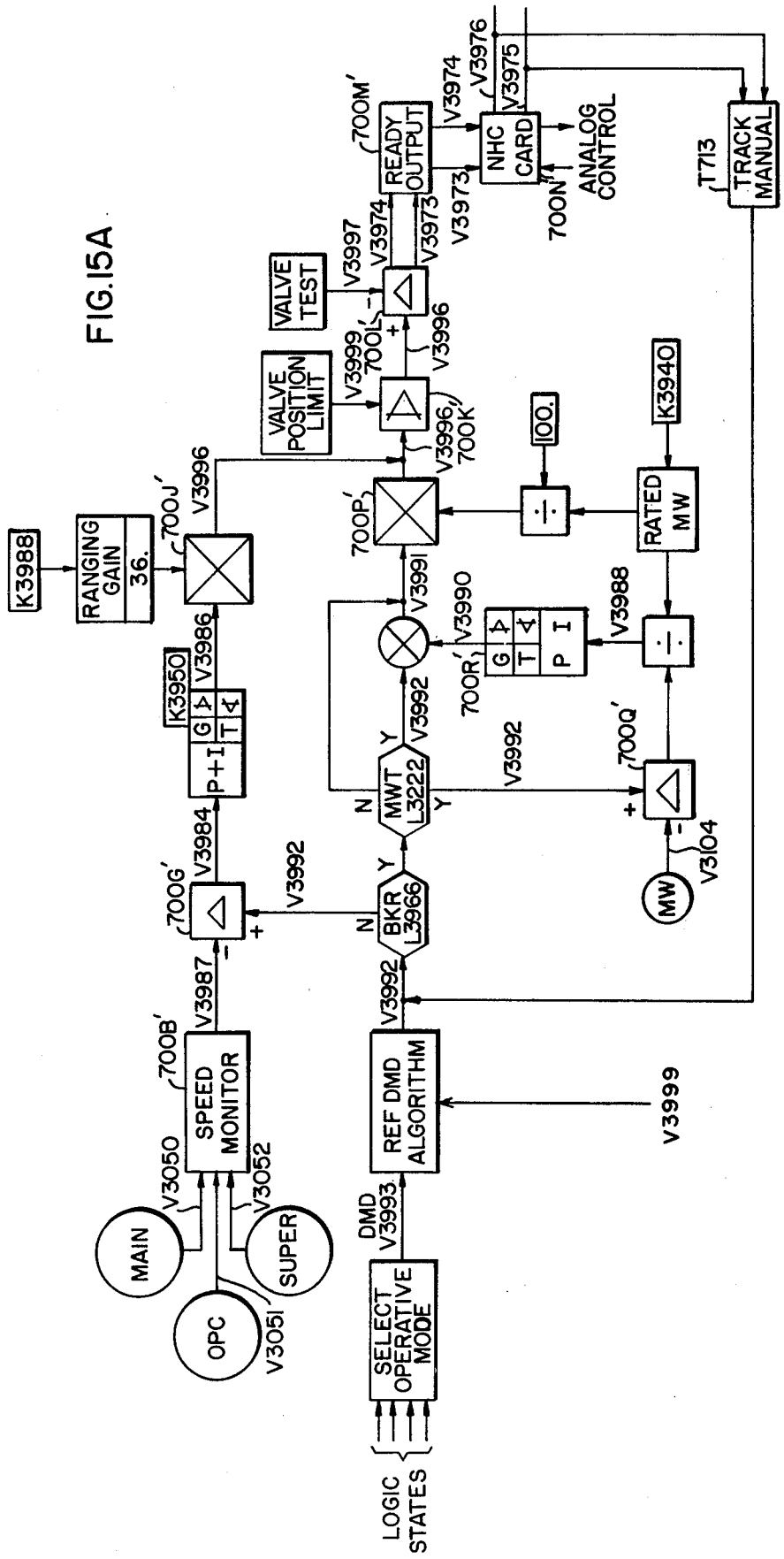
FIGS. 15A and 15B show a functional diagram of the digital control system for the steam turbine.
Figure 15B:
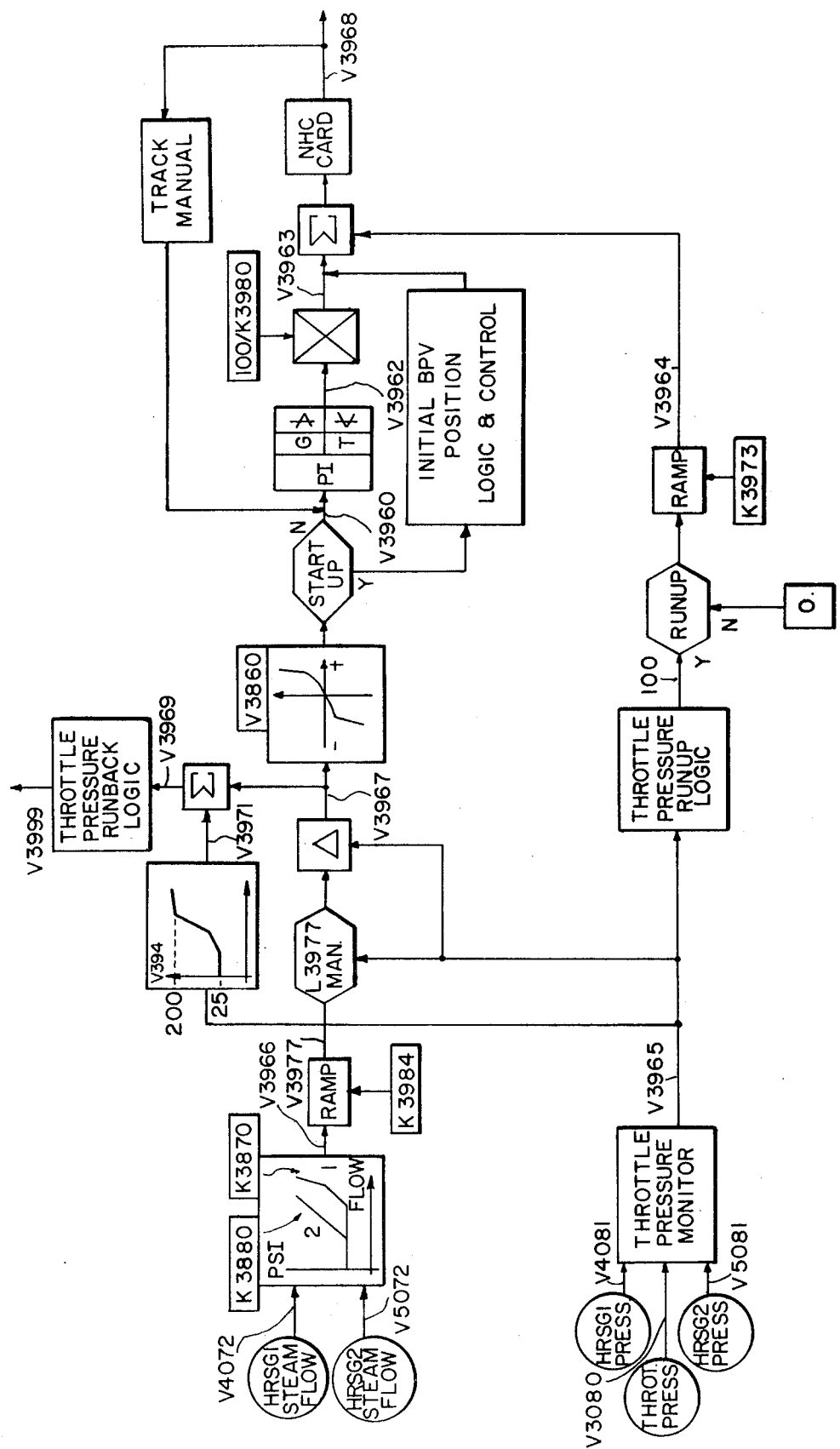

Referring to FIGS. 15A and 15B, a functional diagram of the control system for the steam turbine control valves and main bypass valves, which in the present embodiment is implemented by a programmed digital computer, includes a speed monitor logic function referred to as 700B'. The speed monitor logic function includes an input V3050 which is the proper speed under normal conditions. It includes an overspeed protection controller input V3051 and a supervisory speed input V3052. The speed monitor function logic 700B' provides an output V3987 which represents the actual speed of the turbine. A select operating mode function 700C' is the logic for a particular selected operational state, such as coordinated control, operator automatic, or operator analog. This logic function 700C' provides a demand signal V3993, which is either automatically selected or selected by the operator at the main control panel. A reference demand algorithm 700F' performs the function of determining the rate at which the demand speed for the turbine (speed control mode) approaches and equals the reference speed of the system. The output of the reference demand algorithm 700F' is a reference representation V3992.

A function block 700D' has an input V4072 representing the steam flow at the outlet of the superheater from the heat recovery steam generator HRSG1; and an input V5072 which represents the steam flow from the steam generator HRSG2. The function 700D' provides a representation V3966 which is a function of flow according to a curve BF when both steam generators HRSG1 and HRSG2 are in service; and in accordance with curve CGE when only one of the generators HRGS1 and HRGS2 are in service. Recalling the description of FIG. 5, the curve BF of 700D' is slightly above the natural pressure flow relationship of the line corresponding to 2HRSG operation of FIG. 5. The line CGE of 700D' is slightly above the corresponding line for a single HRSG operation. Thus, the output representation V3966 is a representation of a pressure flow relationship which depends on the rate of steam generation; that is, the rate of generation for a single HRSG or for both HRSG's.

A throttle pressure monitor function 700E' has an input V4081 which represents the steam header outlet pressure for the steam generator HRSG1; an input V5081 which represents the outlet pressure for the steam generator HRSG2. Additionally, an input V3080 represents the throttle pressure to the steam turbine. The output of the throttle pressure monitor 700E' is a representation V3965 which by way of the throttle pressure monitor function provides a representation of actual throttle pressure for the system.

Thus, the system includes a selected monitoring speed V3987, a selected throttle pressure V3965 and a selected speed demand V3993. Additionally, it provides a representation of pressure as a function of flow. A summing device 700G' compares the selected speed V3987 with the reference speed V3992 provided that the breaker flip-flop L3966 indicates that the main circuit breaker is open. The output of a function 700G' is a speed error representation V3984 which is input to a proportional plus integral controller 700H'. The controller output V3986 is multiplied at function 700J' by a constant which represents an output ranging gain for speed control K3988. The controller output V3996 is then checked for a valve position limit V3949 by a function block 700K'. The controller output is then again put to a valve test function 700L' to provide outputs V3974 and V3973 which are representative of valve position setpoints for the upper control valve and the lower control valve position respectively. The position setpoint representations are applied to their respective NHC cards referred to as 700N' through a ready output function 700M'. An output V3975 represents the NHC card position for the lower control valve; and output V3976 represents the NHC card position for the upper steam turbine control valve. These two outputs are tracked by a function T713' which is connected to the reference representation V3992 to insure that the NHC card is in its proper position.

When the breaker flip-flop L3N66 indicates that the main generator circuit breaker is closed, the speed reference signal becomes a load reference signal; and it is input to a megawatt loop flip-flop L3008. If the megawatt loop is out of service, the reference representation V3992 is multiplied at function 700B' by the rated megawatts and the percentage representation therefrom V3996 is applied to the function 700K' and finally to the NHC card 700N' as described in connection with the operation of the turbine under speed control. The function block 700P' provides the megawatt compensated output V3996 in order that there will be sufficient steam to minimize motoring action upon closure of the main circuit breaker. A megawatt feedback loop is also provided which is cut in or out by a megawatt flip-flop L3008. The actual megawatt output is subtracted from the load reference V3992 at function 700Q', and the output error is divided by the rated megawatts K3990 to provide an input representation V3988 to the proportional plus integral controller 700R'. An output V3990 of the controller 700R' is multiplied by the load reference V3992; and the compensated megawatt output therefrom V3991 is converted to a percentage of rated megawatts by the function 700P'.

Thus, the steam turbine control valves both during wide range speed control and load control are operated toward their open position during startup and load increase in accordance with representations relating to a reference speed or a reference load as compared to the actual speed during speed control and as compared to actual megawatts during load control.

The output V3966 from the function 700D' is ramped by function T700' and applied to a difference function T701'. The selected throttle pressure V3965 is also applied to the difference function T701' to generate a representation of error V3967. When the actual selected throttle pressure V3965 is greater than the output V3966 of the function 700D' the error output V3967 is positive, and in a direction to open the bypass valve. When the actual throttle pressure is less than the output V3966, the error is negative and in a direction to close the bypass valve. A function T704' has a central deadband to prevent the bypass valve from oscillating in response to small deviations in the inputs V4072 or V5072 and is characterized by a steep slope on the lock side of the deadband to operate the bypass valve quickly in the appropriate direction in response to large error changes. An error input V3960 to the proportional plus integral controller T705' results in an output V3962 which is multiplied by rated pressure at function T706' to obtain a representation corresponding to a percentage of rated pressure V3963. This is applied to a summing device T710' and the NHC card T712' for the main bypass valve through a ready output function T711'. Throttle pressure runup logic T707' is provided to open the bypass valve through a ramp function T708' with its output V3964 applied to the summing device T710' to increase the valve setpoint V3963 to open the bypass valve in response to certain predetermined contingencies. Initial bypass valve logic cracks the bypass valve slightly when starting up to compensate for mechanical characteristics of the valve.

The error representation V3967 is applied to a summing function T702' for summing with a characterized output from function T702A', which provides an input V3967 to throttle pressure runback logic T703'. The output of T702A' is a function of the pressure representation V3965. The runback logic T703' determine the condition of certain system states which prevent an output L3999 for decreasing the speed/load reference V3992. The curve function of T702A' prevents an unnecessary runback of the control valve, that is, at low pressures a small deviation of the pressure will cause the error V3967 to be varied; and at higher pressure, a larger deviation is permitted.

In operation, during the building up of steam pressure, with both the bypass and control valves closed, the bypass valve will start to open when the pressure has reached the minimum requirement. The bypass valve continues to open in accordance with the error output representation V3967 as the rate of steam generation increases as determined by the flow representation V4072 and V5072. If such flow inputs indicates that there are two HRSG's in service, then the function 700D' operates according to the curve BF. If there is only one HRSG in service then the function 700D' selects the curve CGE. The curve BF is slightly higher than the natural pressure flow relationship of the steam with the control valves wide open; that is, when the pressure flow relationship is on the line BF, the control valves would not be completely open; and when the control valves are wide open, the pressure flow relationship is slightly below the curve BF. The curve CGE is similarly determined, except that the steam inlet is throttled over a portion of the flow, and this throttling determination for the control valves is less than the curve CGE.

Assuming that both HRSG's are in service, should the pressure representation V3965 become less than the characterized representation V3977, then the bypass valve will be operated toward its closed position until such time as the error signal V3967 indicates that the pressure flow relationship is along the line BF.

Assuming that the system is in operator automatic condition, the operator selects the demand speed V3993 which produces a reference representation V3992. The reference representation and the speed monitor representation V3987 provide the error representation V3984. As long as the reference representation is greater than the speed monitor representation the control valves will continue to operate towards an open position. During this time, the bypass valve is being controlled by the error representation V3967 to operate towards a closed position to maintain the pressure flow relationship along the curve BF. Thus, as the control valves open to bring the steam turbine up to speed the bypass valve continues to close to maintain the proper pressure flow relationship. When the steam turbine is synchronized at 3600 rpm, the breaker flip-flop L3966 is closed and the control valves continue to open as the load demand is increased. Once the control valves are fully open, the bypass valve is fully closed. At this time, control to maintain the pressure flow relationship is transferred to the steam control valves, because the bypass valve is attempting to maintain the pressure flow relationship along the line BF. This maintains the bypass valve closed because the selected actual throttle pressure V3965 is now slightly less than the characterized representation V3977 and the error signal is in a valve close direction. Any further reduction in the pressure flow relationship only increases the error signal in a valve close direction. The error V3967 is summed with the output from the dynamic function T702A' so that small deviations of high pressure do not result in an output TPL. Should the pressure flow relationship fall below the line BF substantially as determined by the curve of T702A', the throttle pressure runback logic function T703' decreases the reference representation V3992 which operates the control valves through their respective NHC card 700N' towards a closed position. The control valves will continue to operate towards a closed position until such time as the error representation V3967 is insufficient to overcome the output of T702A′.

The throttle pressure runup logic T707′ and the function T704′ controls any opening of the bypass valve to prevent such opening unless the pressure and/or system conditions warrant such operation. The sequence during acceleration and loading of the turbine is the closing of the bypass valve as the control valves open with the bypass valve solely controlling the pressure flow relationship. Once the bypass valve is closed, the pressure flow relationship is controlled by the control valves. Should the pressure flow relationship decrease, when the bypass valve is closed, the control valve will fully close before the bypass valve assumes control of the pressure flow relationship.

Therefore, the pressure can increase or decrease along the line BF of the function 700D′ depending on the loading of the turbine. Any decrease in the pressure flow relationship will cause the control valves to operate towards their closed position until such relationship is back on the line BF. When only one HRSG is in operation, the function 700D′ controls the bypass valve to its closed position along the line CGE in the same manner as described for the control along the line BF.

FIGS. 16 through 22 inclusive are flow charts including the various line functions briefly described in connection with FIG. 15. The legends used in such flow charts are described in Appendix A herein; and an inspection of such flow charts together with the Appendix should provide a clear description of the logic utilized without a detailed description.

Figure 7C:
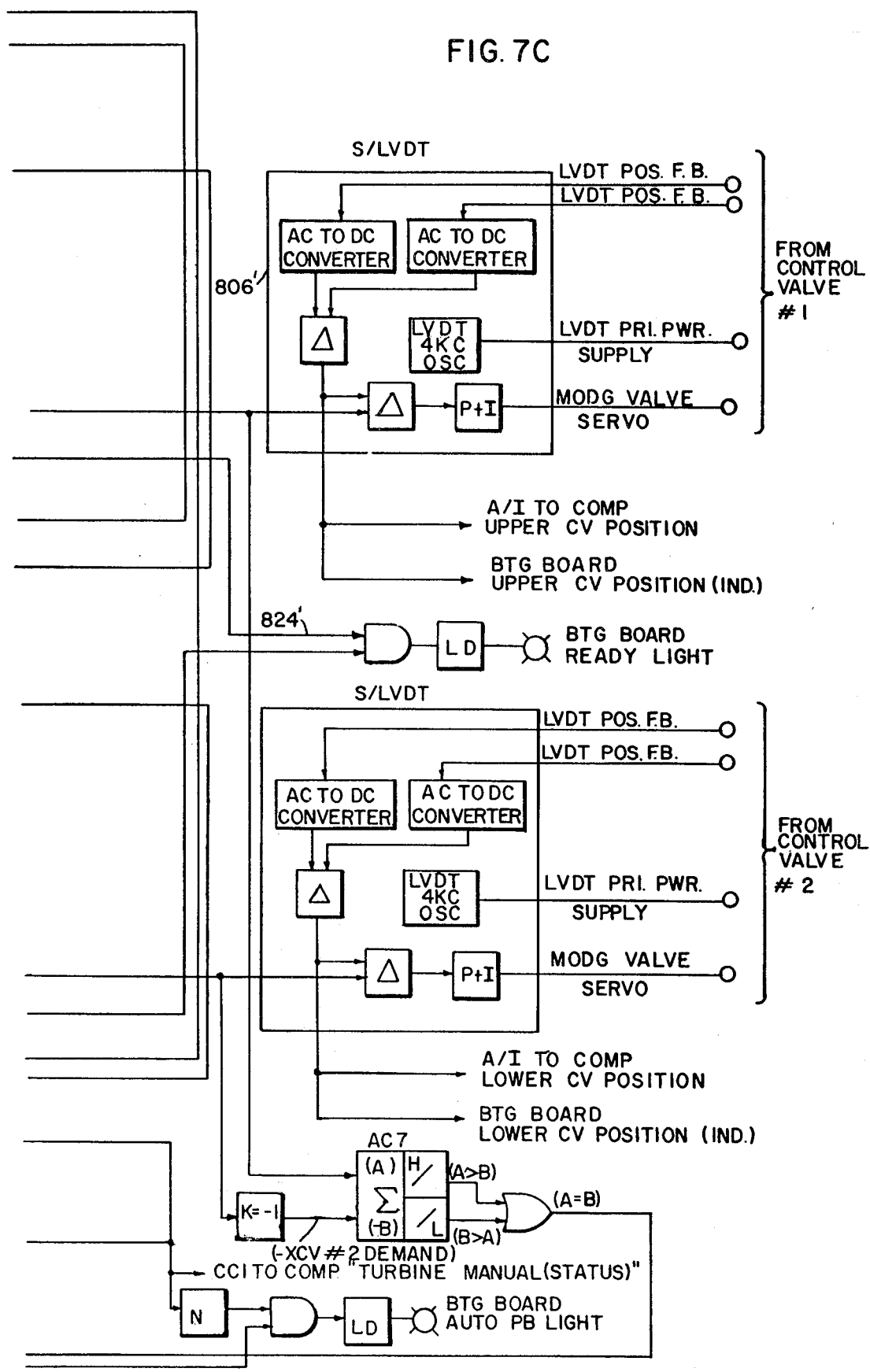

Referring to FIGS. 7A, 7B, and 7C an NHC card 801U′ and an NHC card 801L′ is provided to control the upper and lower steam inlet control valves respectively. Although under all conditions of operation the upper and the lower control valves of the steam turbine are operated in what is usually termed single valve mode; that is, the position of each of the valves is identical and they are moved toward the open or the closed position simultaneously; there is provided an individual NHC card for each of the valves in the system. Each of the NHC cards are identical, and a general description is given of their overall function in connection with a description of FIG. 8.

When the system is transferred from automatic to manual control, the NHC card responds to the analog hardware inputs instead of the inputs from the digital computer. Specifically, binary output data from the computer is input to gates referred to at 802′ for operating a register control 803′ to operate a register counter 804′ in either an upwardly or downwardly direction. The register counter 804′ provides its output to a digital to analog converter 805′ which provides an analog output which varies from 0 to +10 volts depending upon the particular count in the register. The output of the digital to analog converter 805′ is connected to a servo mechanism 806′ for operating the upper steam inlet control valve.

In the operator analog or manual mode, the counter 804′ is increased as long as there is a signal present on input 810′. The counter 804′ is decreased as long as there is a signal present on input 811′. A clock pulse generator 812′, determines the rate at which the count in the register is effective. A signal at input 813′ of the clock 812′ provides a normal rate of count increase. A signal at input 814′ of the clock 812′ provides a fast rate of increase.

A mode control function 85′ is used to transfer the NHC card between a manual and an automatic mode; or in other words, between a state of being responsive to the digital computer or to the analog hardware. The mode control function 815′ puts the NHC card in an automatic condition in response to a distinctive signal on its input 816′. This input is provided by closing a contact to operate a signal conditioner 817′ (FIG. 7A) in response to the operation of the "automatic" pushbutton on the BTG panel board. In response to the distinctive signal on the input 816′ for automatic operation, a signal is generated on 818′ to produce a computer interrupt to initiate automatic operation, provided, that the system is in a condition therefor. When a distinctive signal is present on input 820′ of the mode control 815′, the NHC card is transferred to manual rendering it responsive only to the signals on the inputs 810′ or 811′ of the register control 803′. Either the operation of the manual pushbutton on the BTG board to close a contact to signal conditioner 821′ (FIG. 7A) or a signal generated in response to a computer power failure by signal conditioner 822′ provides the distinctive signal on input 820′ for transferring the NHC card to manual. When the NHC card is in a "manual" condition, a ready function block 823′ provides an output on 824′ to indicate to the operator that the NHC cards are in a manual condition. Additionally, the NHC card 801U′ is transferred to manual in response to the presence of a distinctive signal on input 825′ to the register control 803′. When the mode control function 815′ is in a manual condition, a signal is present on output 826′ which is utilized in the logic circuitry for increasing the count of the register control 803′ in response to a signal on its input 810′ through AND gate 827′ (FIG. 7A).

The output TPL of the comparator 765′ described in connection with FIGS. 6A, 6B and 6C is connected by input 828′ (FIG. 7A) through an OR gate 829′ (FIG. 7B) to provide a signal on the input 811′ of the register control 803′ to decrease the register counter 804′. Thus, as described in connection with FIGS. 6A, 6B and 6C when a signal is present on the input 828′, either the pressure from the common header of the heat recovery steam generators HRSG is below the predetermined minimum, or the velocity of the steam is excessive in accordance with a predetermined pressure flow relationship. Also, a signal on the input 828′ of the TPL output is connected through an OR gate 830′ to more rapidly operate the clock 812′ by way of its input 814′. Also, the input 828′ is connected to an OR gate 831′ to turn the clock 812′ on through its input 813′ if it is not already on. Thus, if the flow pressure curve relationship should fall below that relationship set for the digital computer portion of the control, the output on TPL or the input 828′ permits the pressure to decay gradually as described in connection with FIGS. 6A, 6B and 6C by decreasing the count of the register in a controlled manner. If desired the "go" logic may require a manual operation to open the control valves after an output has occurred on TPL.

The NHC card 801L′ for operating the lower steam inlet control valve is identical to the previously described NHC card 801U′; and the various functional components therein have been referenced with similar reference numerals including the suffix L. Although, there is an NHC card for each control valve, the inputs to the NHC cards described in connection with 801U′ are parallel connected to the NHC card 801L′ so that they operate simultaneously in an identical manner. The remaining inputs in logic circuitry shown in connection with FIGS. 7A, 7B and 7C are provided for operating an NHC card under certain operating contingencies and operator demands. Such logic is evident from an inspection of the Figures and will not be described herein.

Figure 9A:
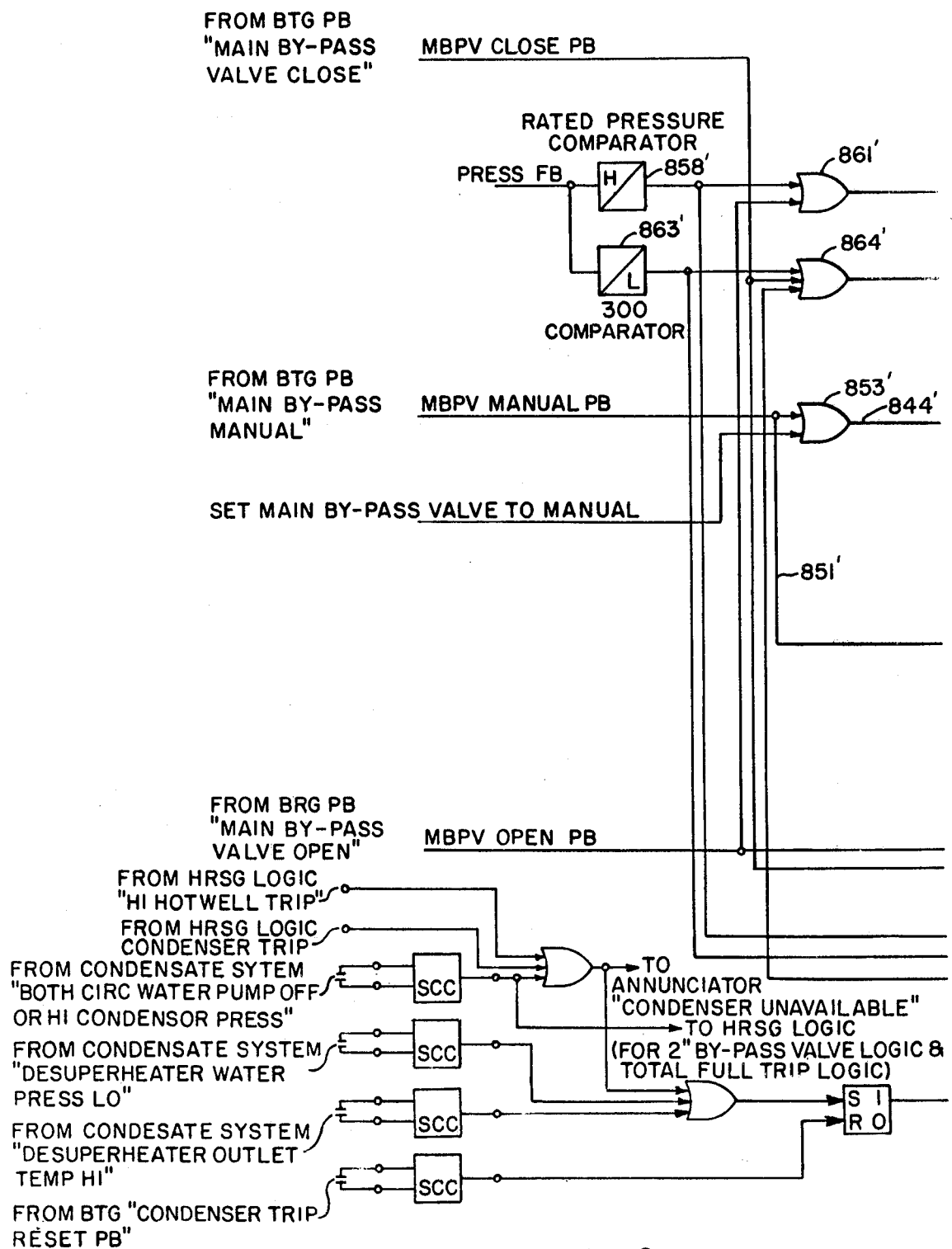
FIGS. 9A, 9B and 9C when placed side-by-side show a functional diagram of a main bypass valve control for the steam turbine arranged in accordance with the invention.
Figure 9B:
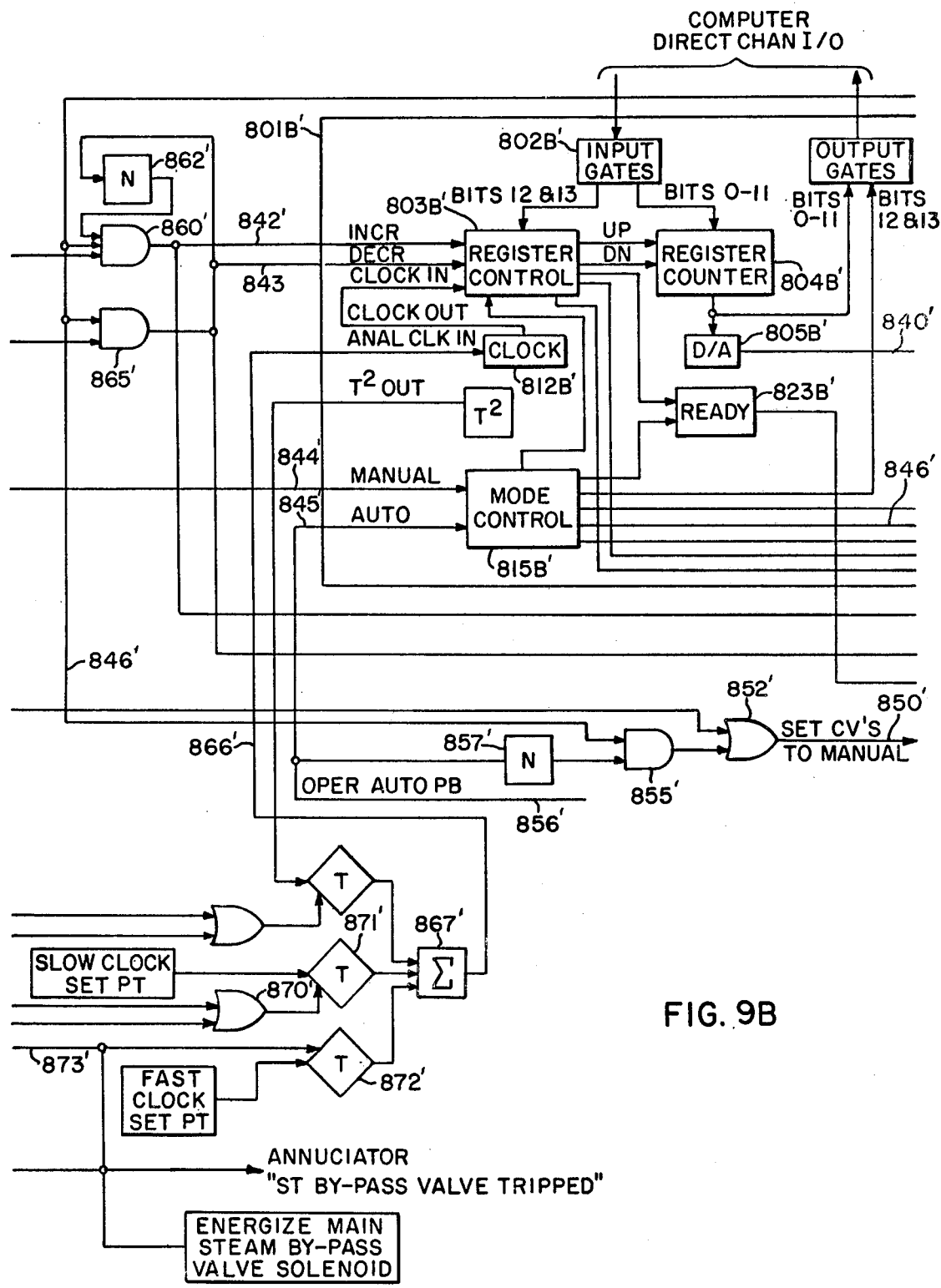
Figure 9C:
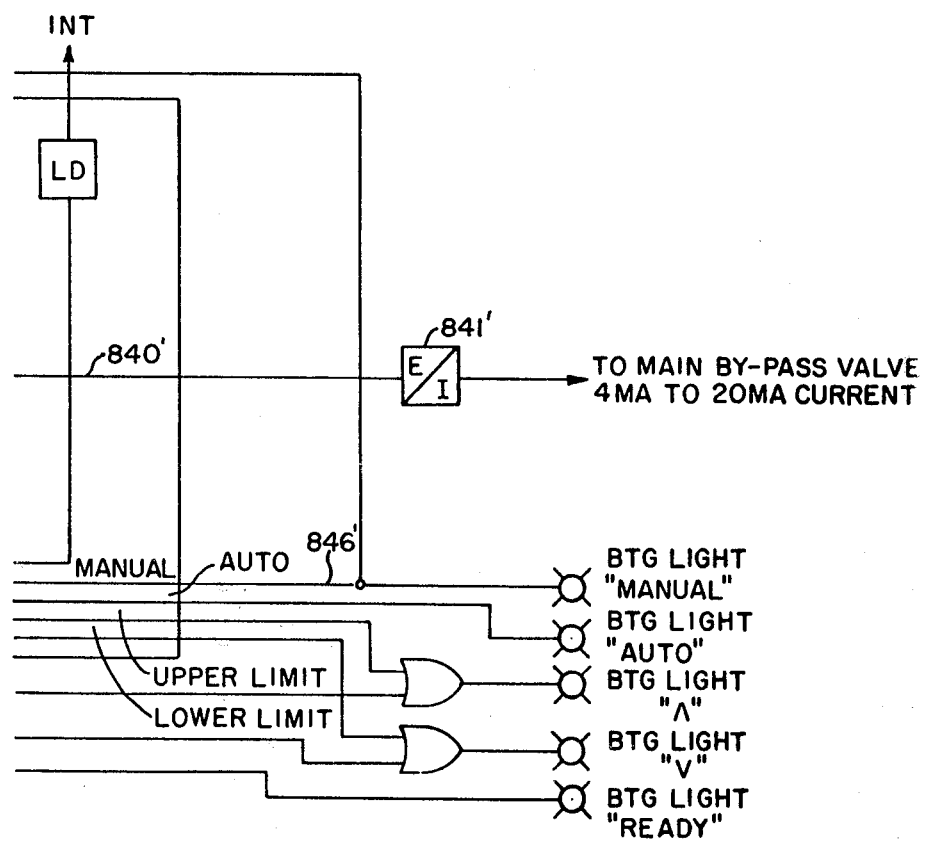
Figure 10A:
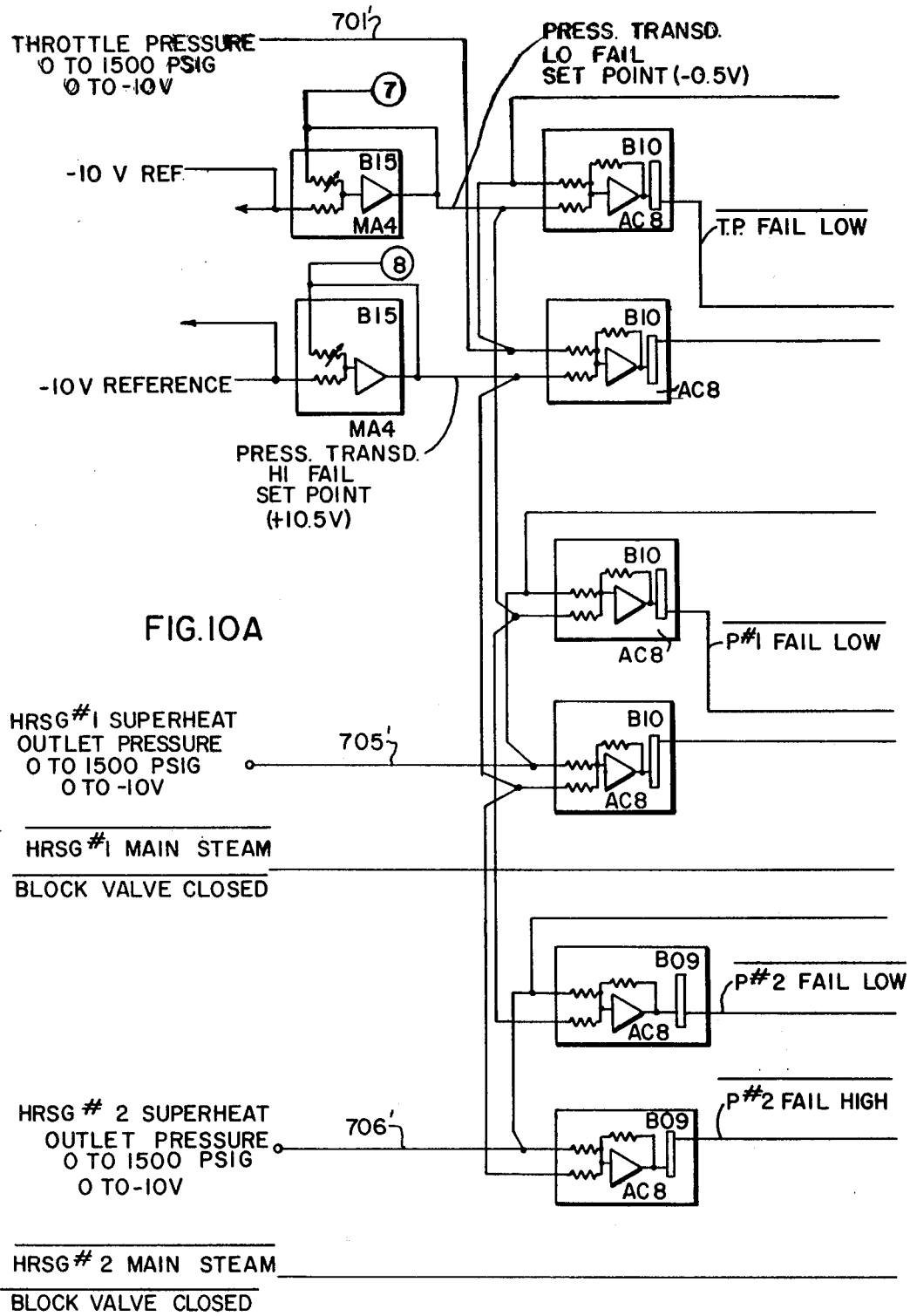
Figure 10B:
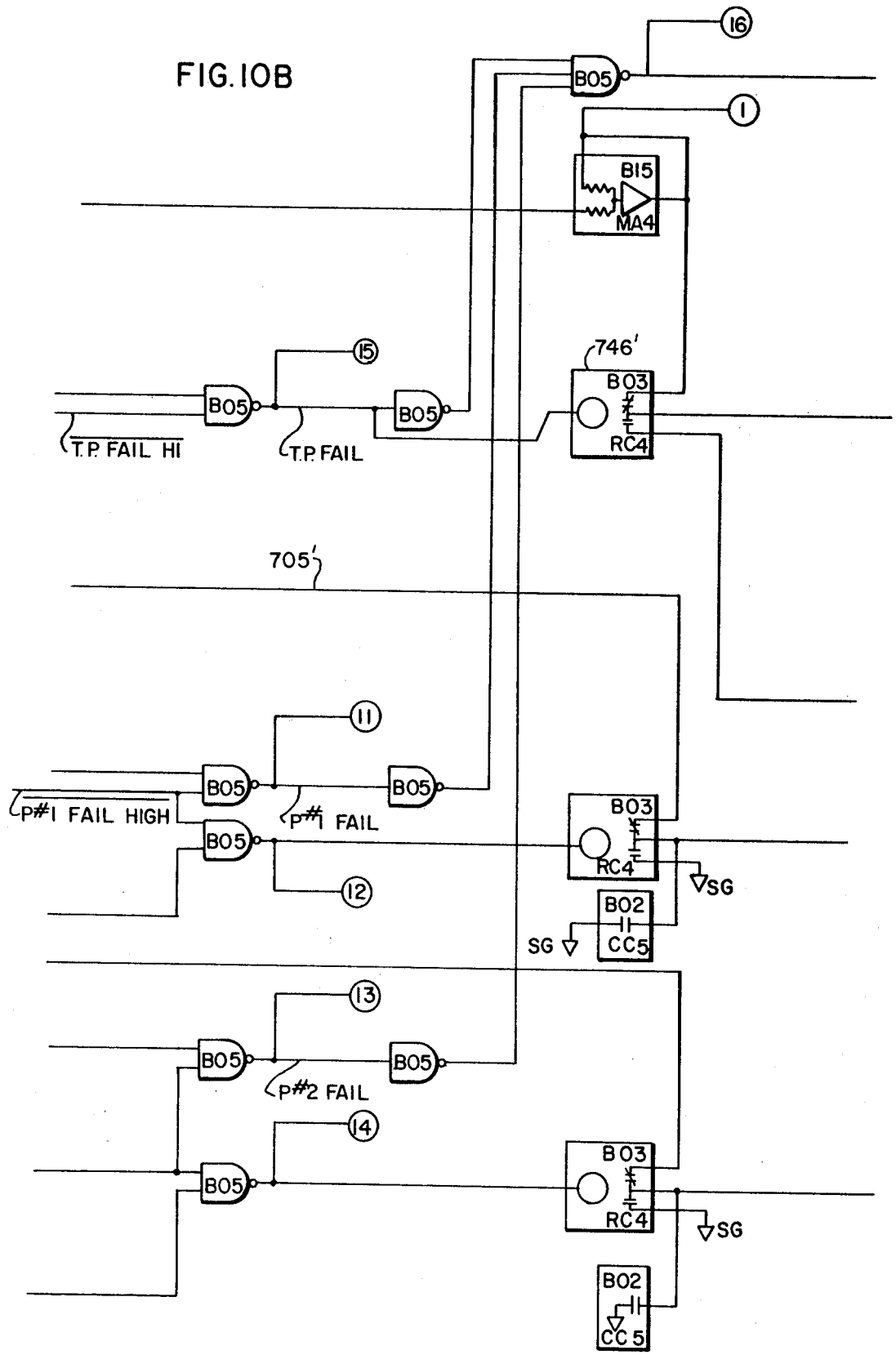
Figure 10D:
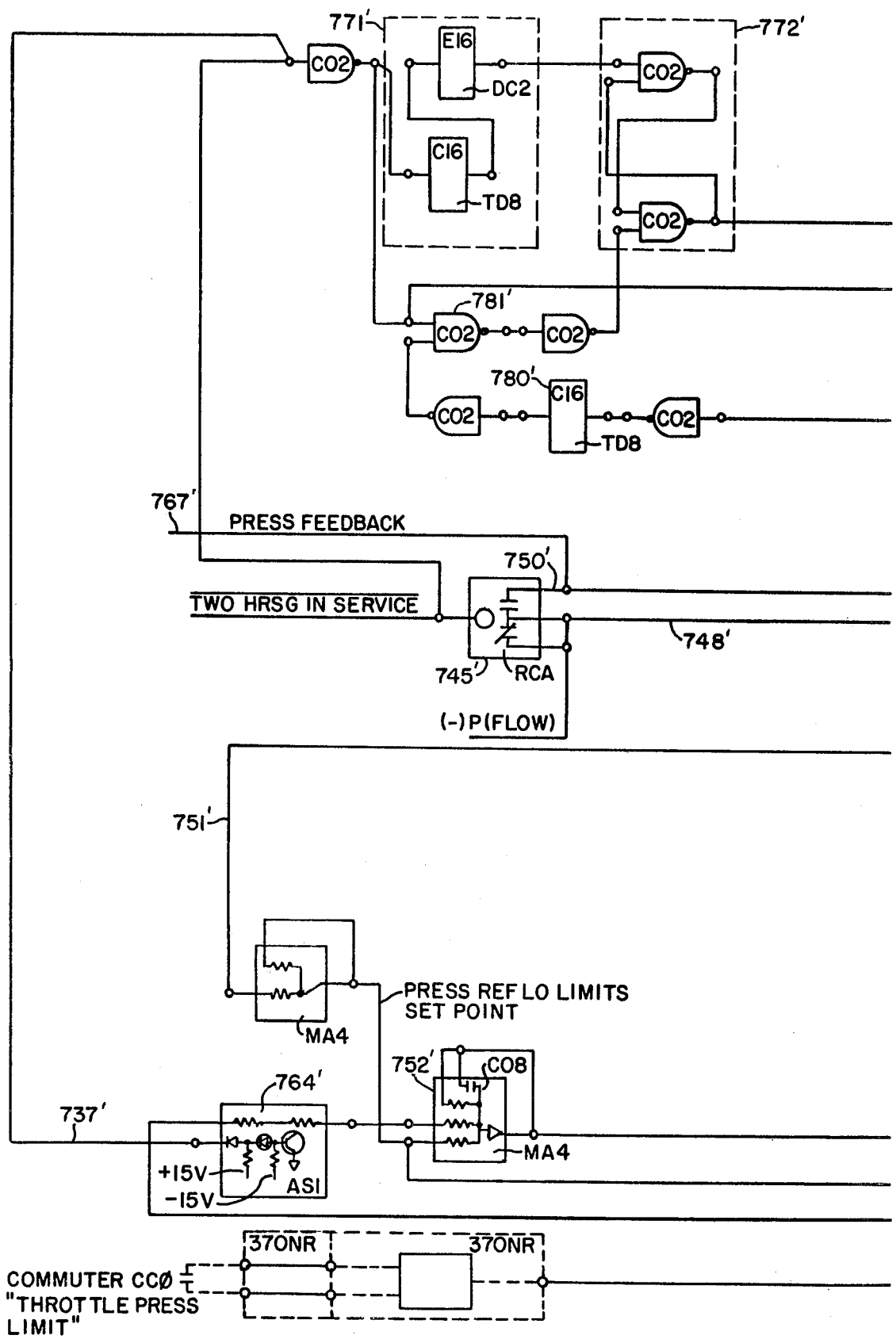
Figure 10F:
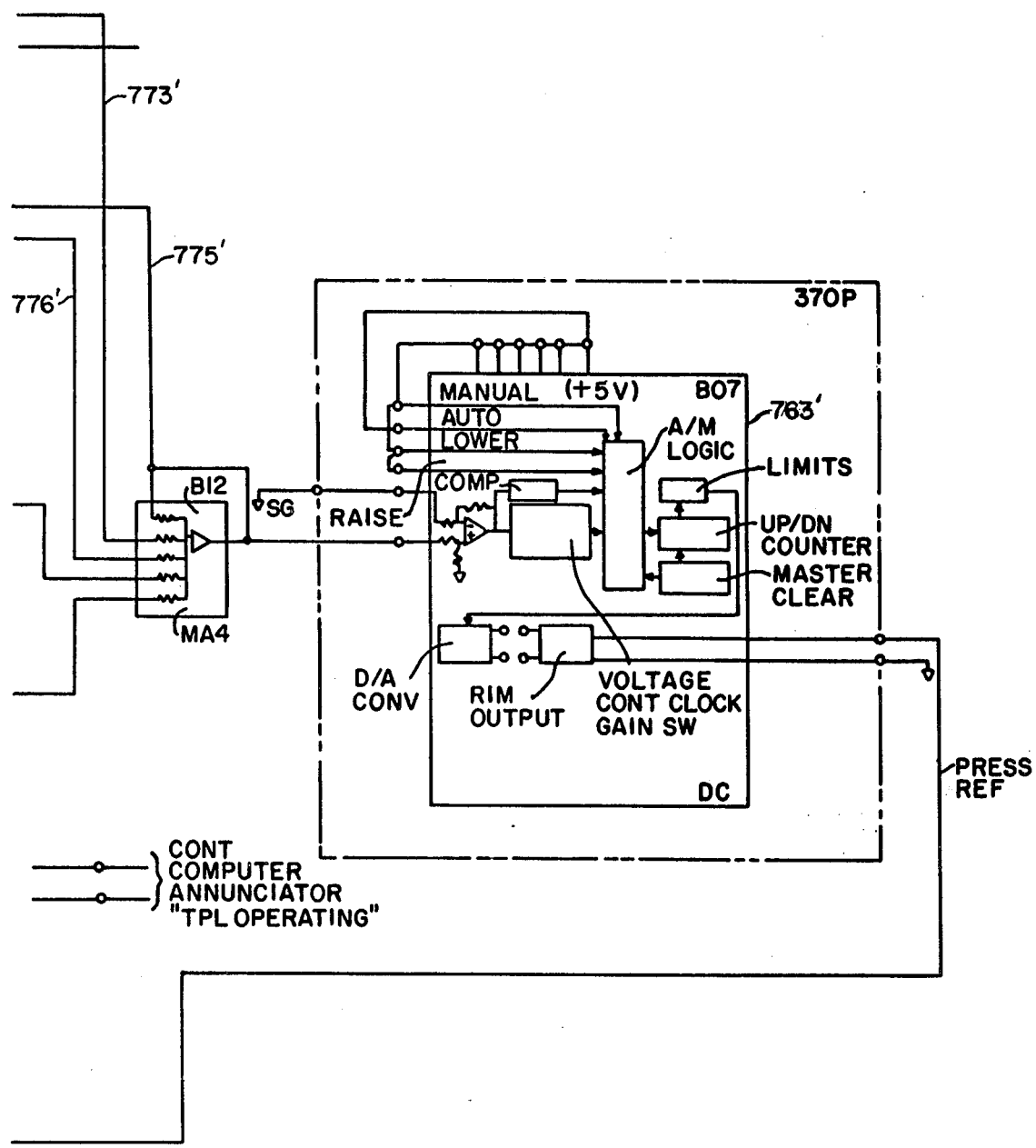
Figure 10H:
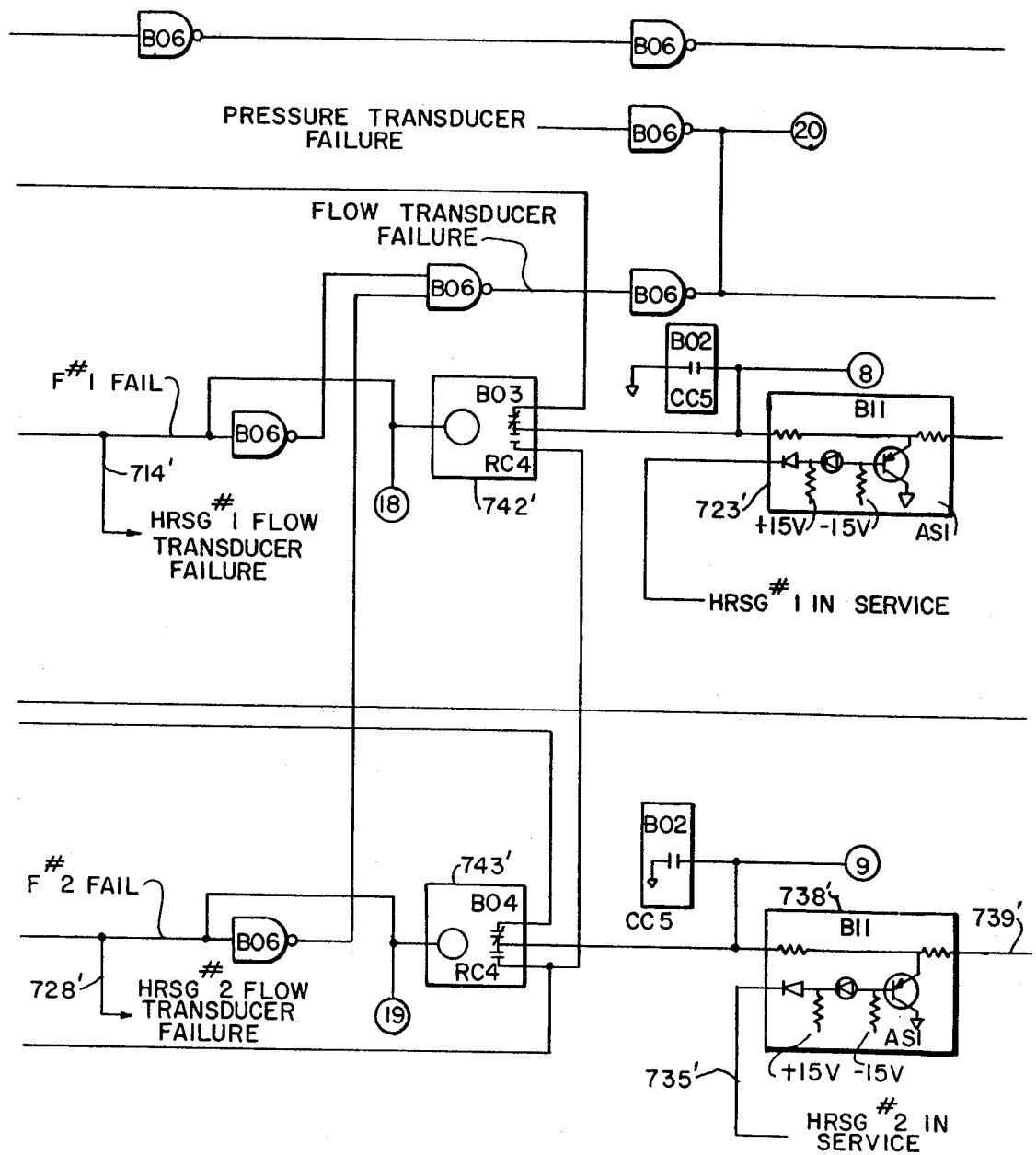
Figure 10J:
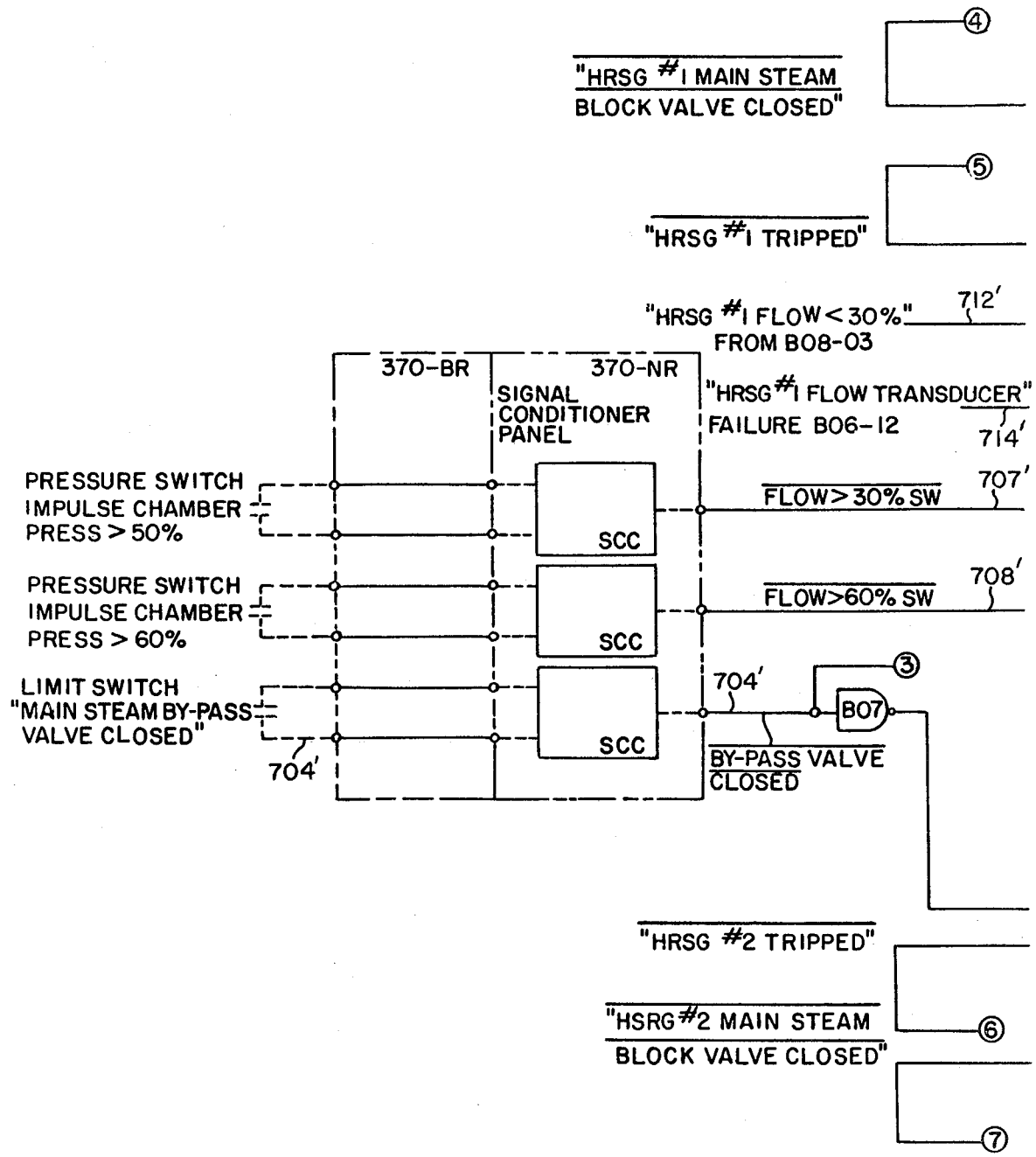
Figure 10K:
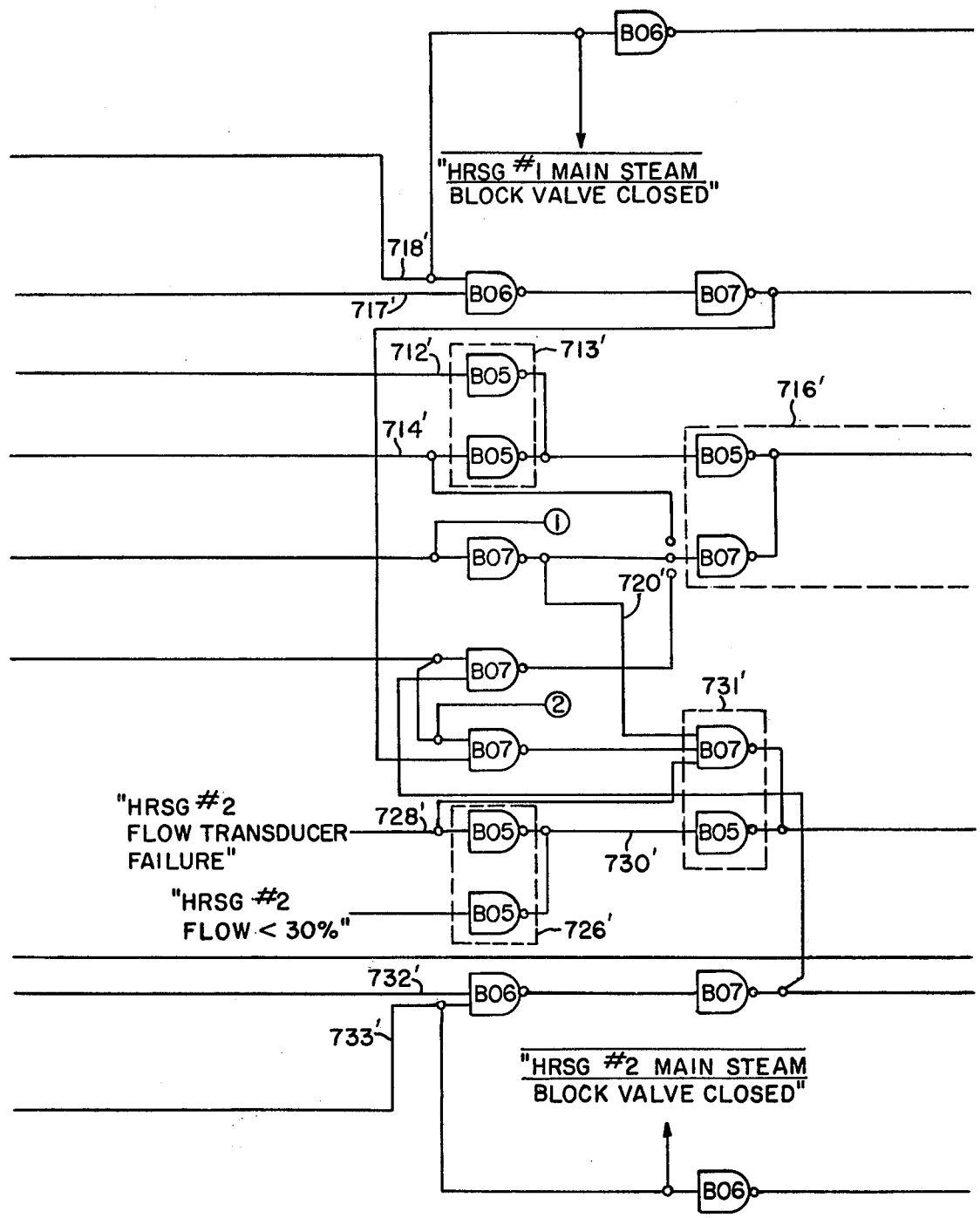
Figure 10L:
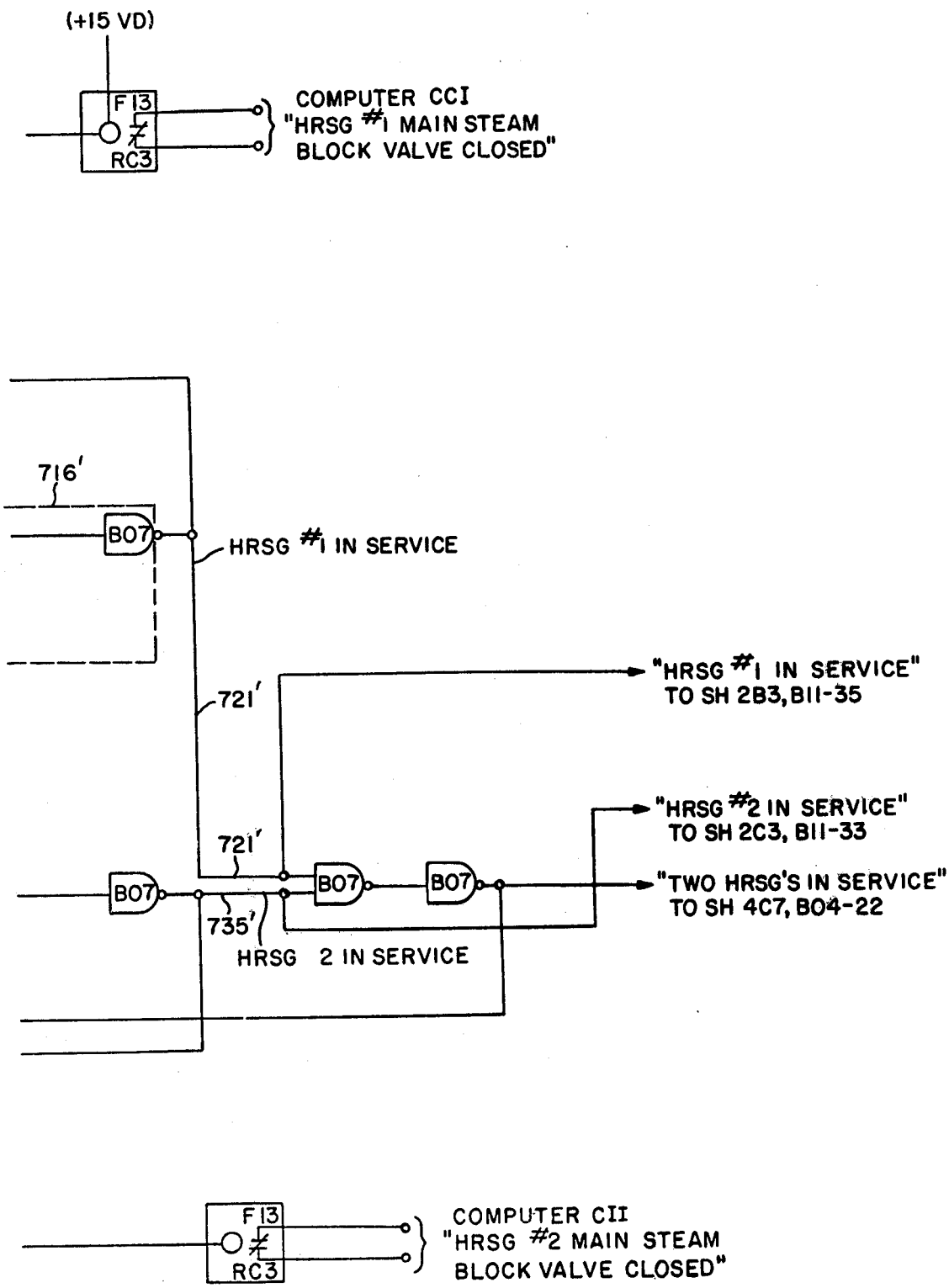
Figure 12A:
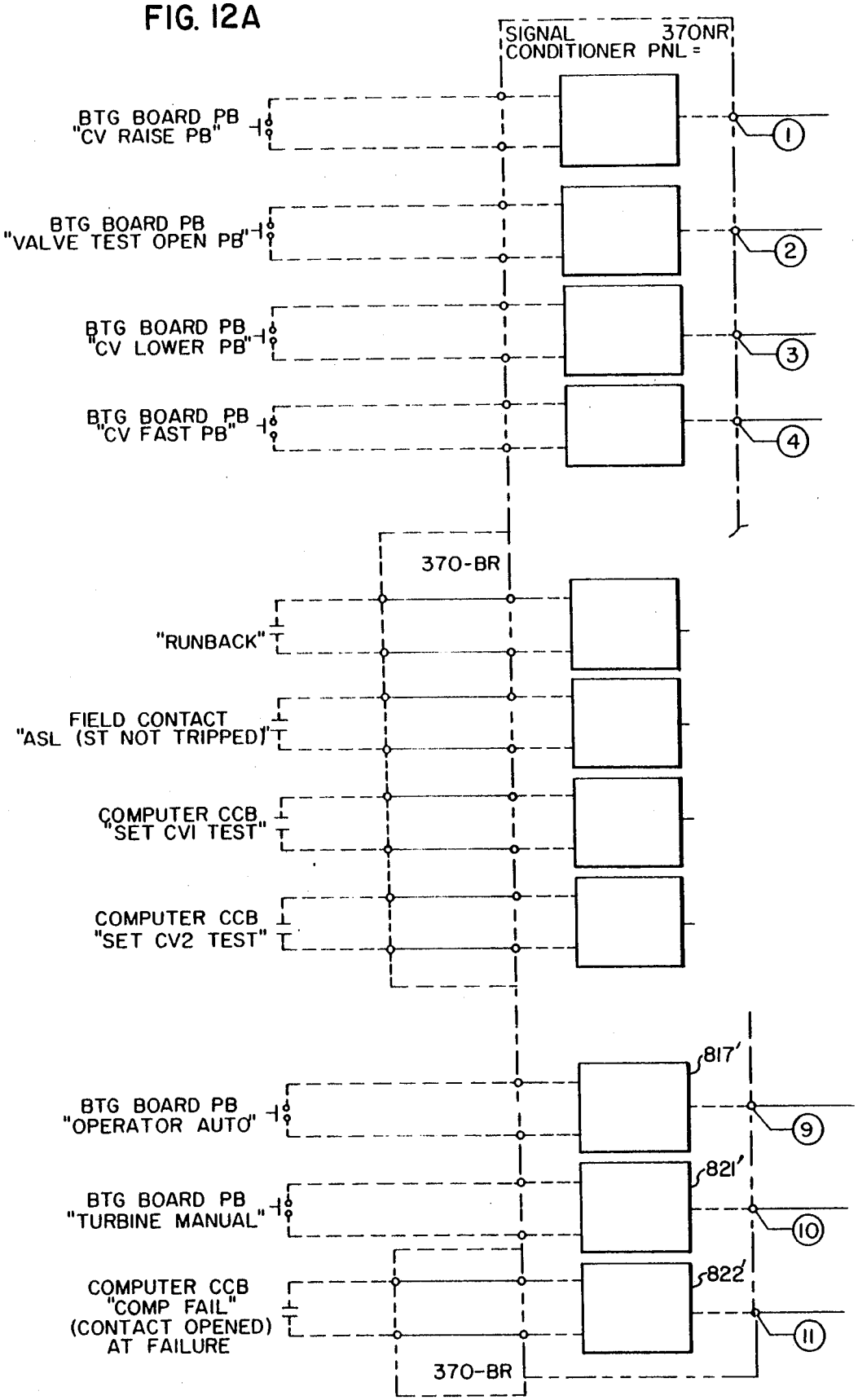
FIGS. 12A through 12F when placed side-by-side show circuitry which can be employed to embody various functional blocks in FIGS. 7A through 7C.
Figure 12B:
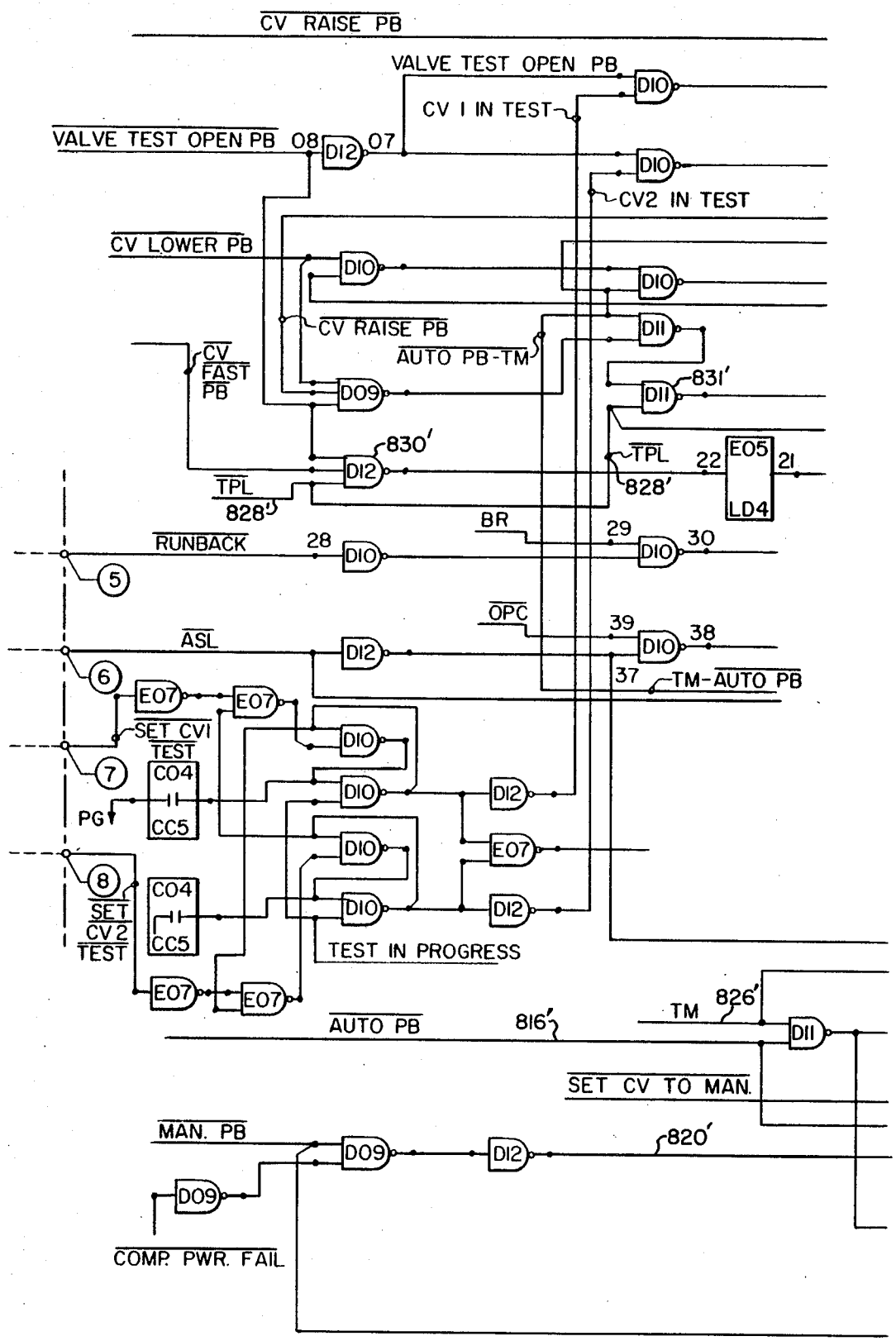
Figure 12C:
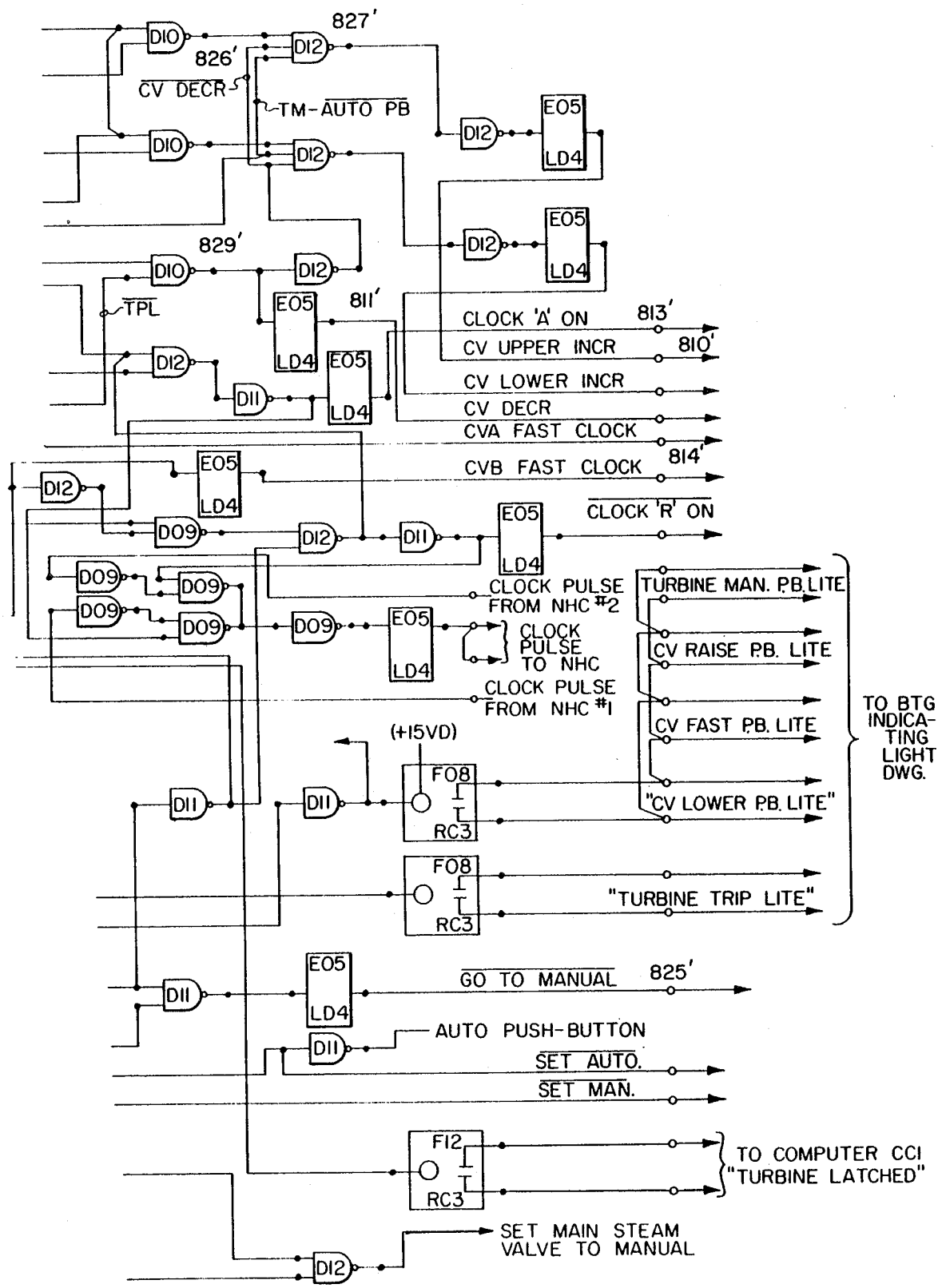
Figure 12D:
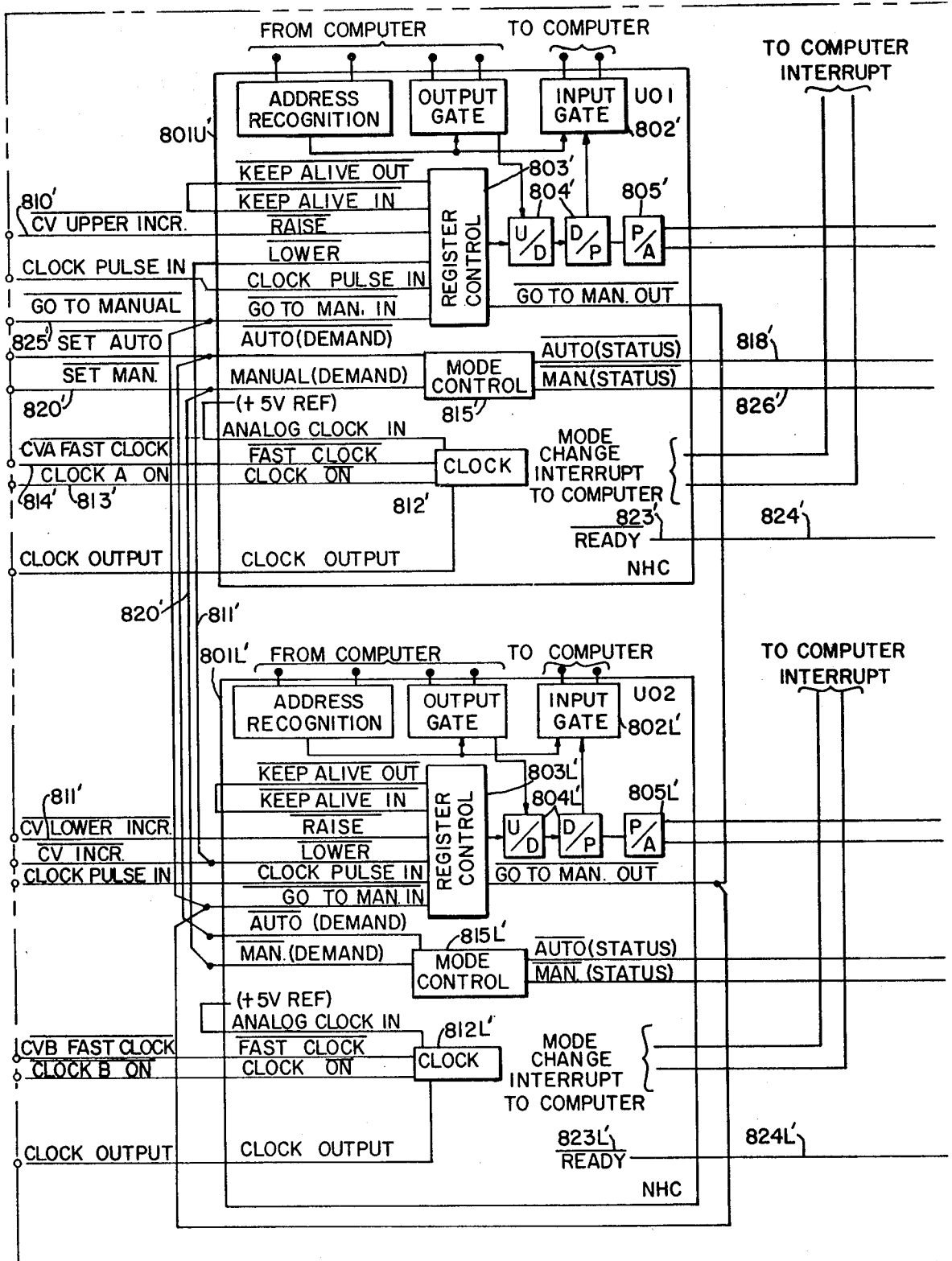
Figure 12E:
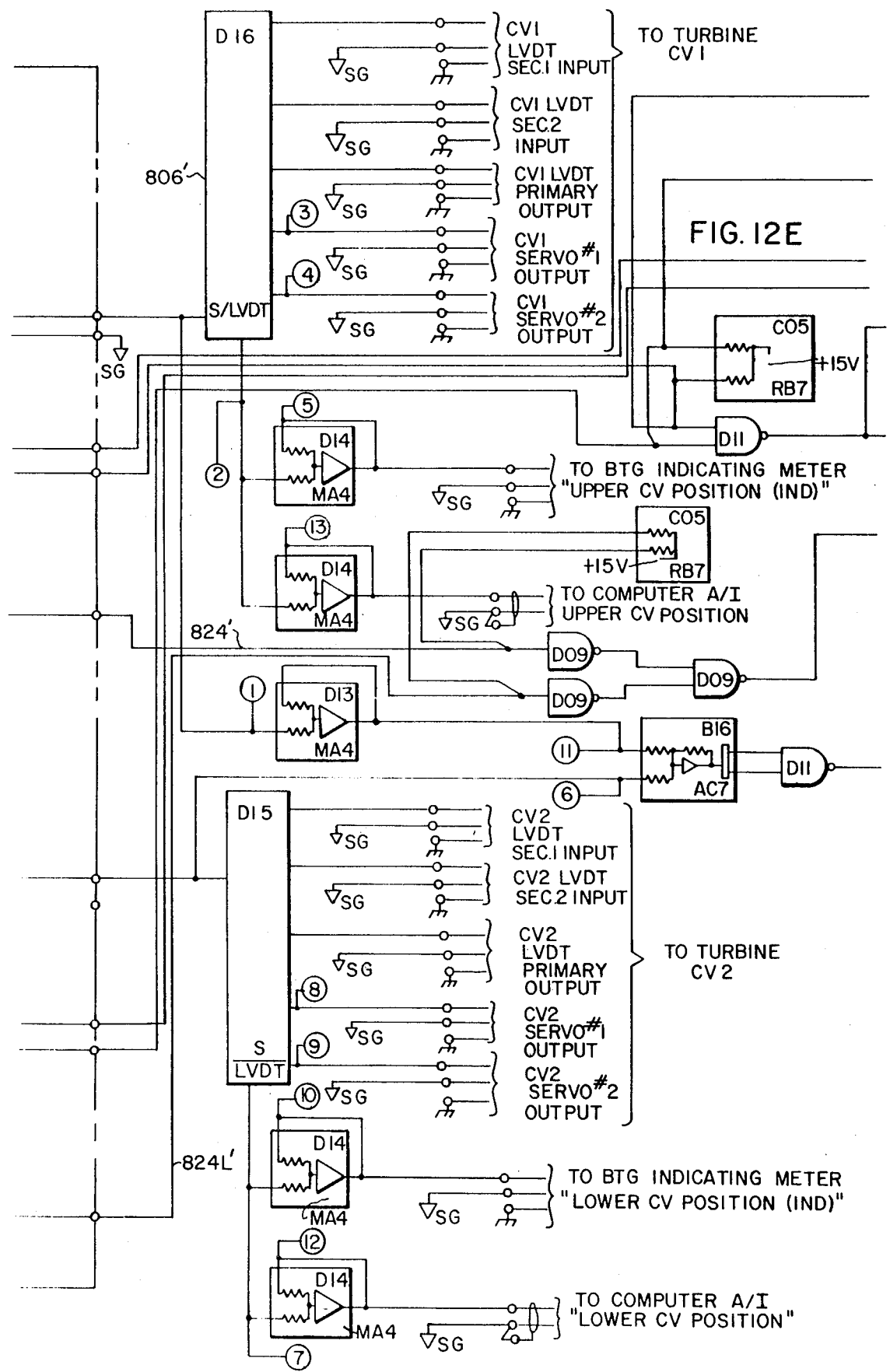
Figure 12F:
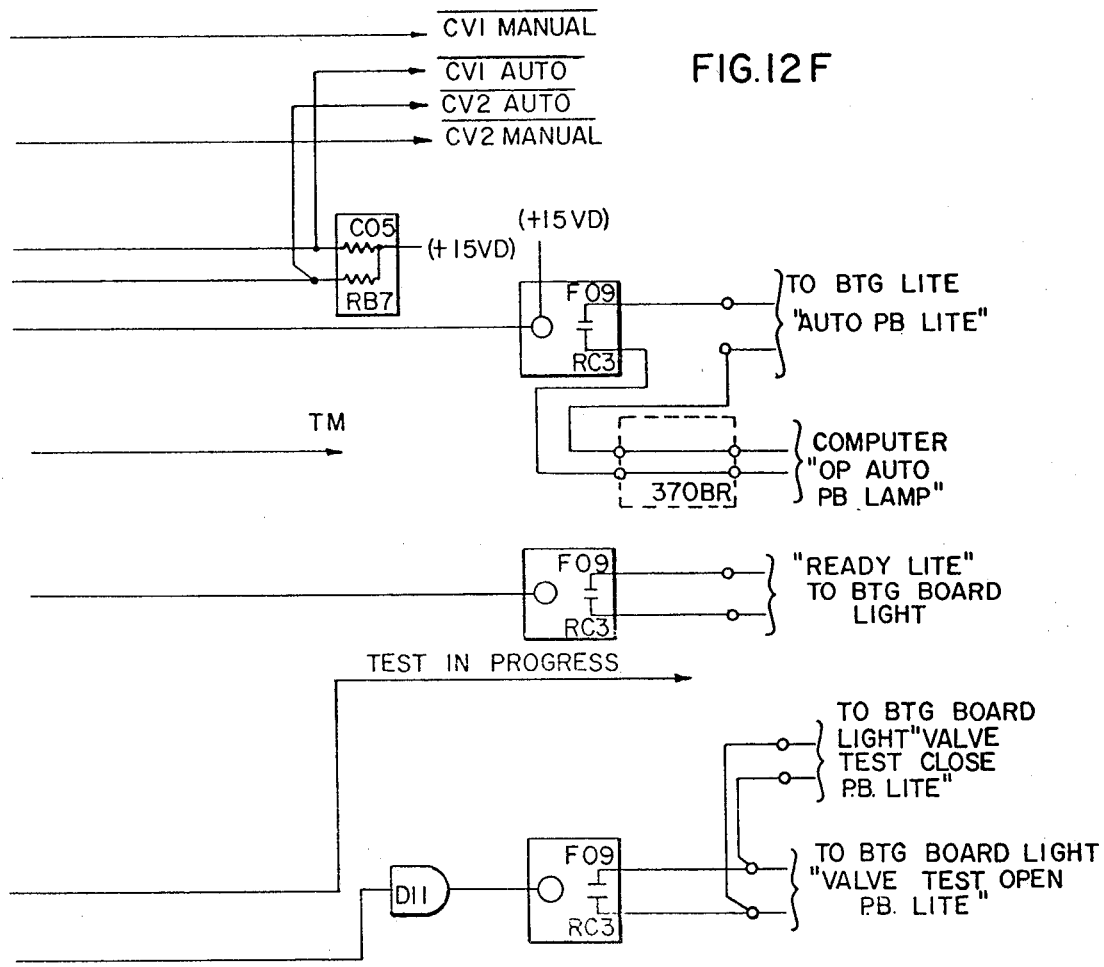
Figure 13A:
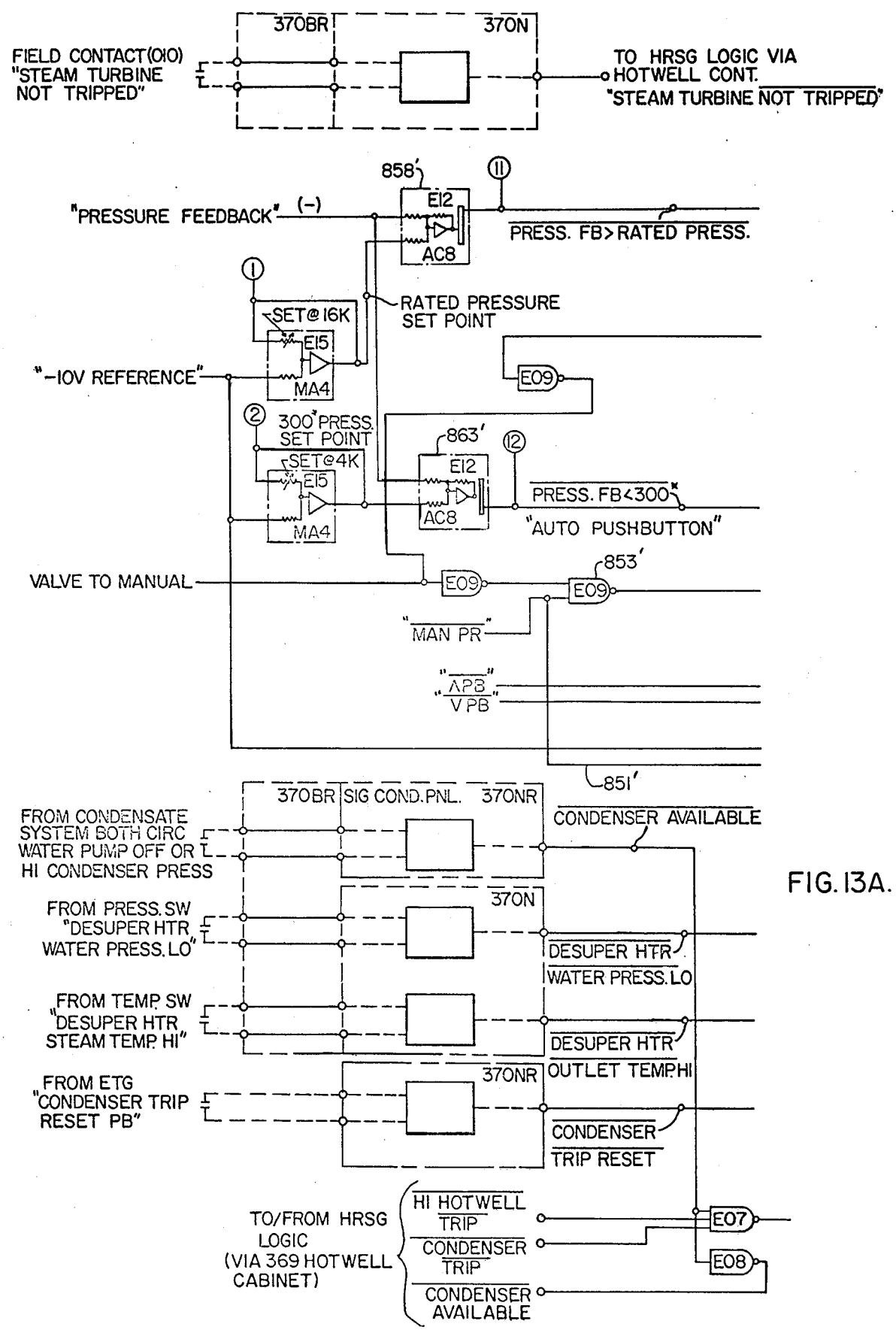
Figure 13B:
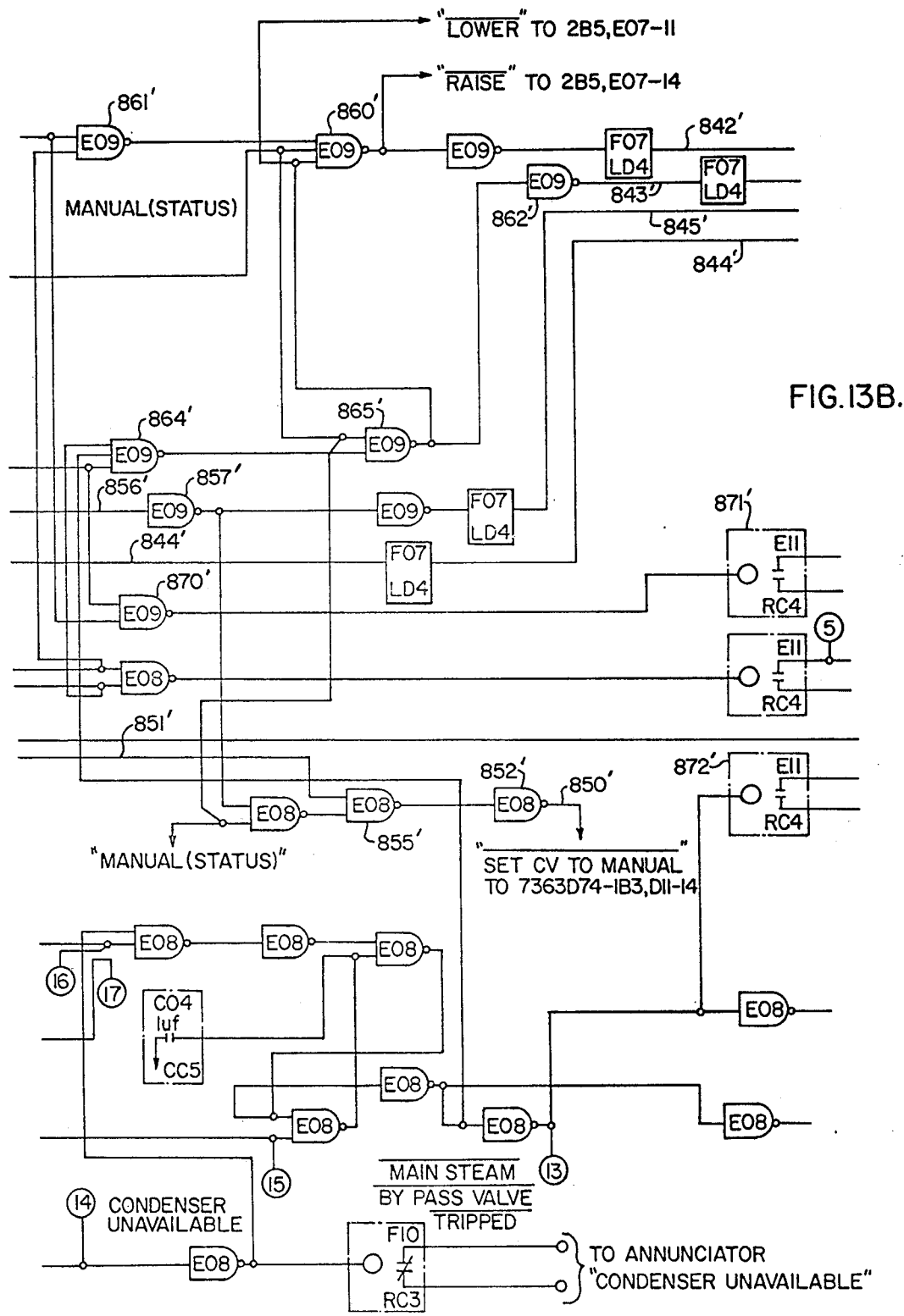
Figure 13E:
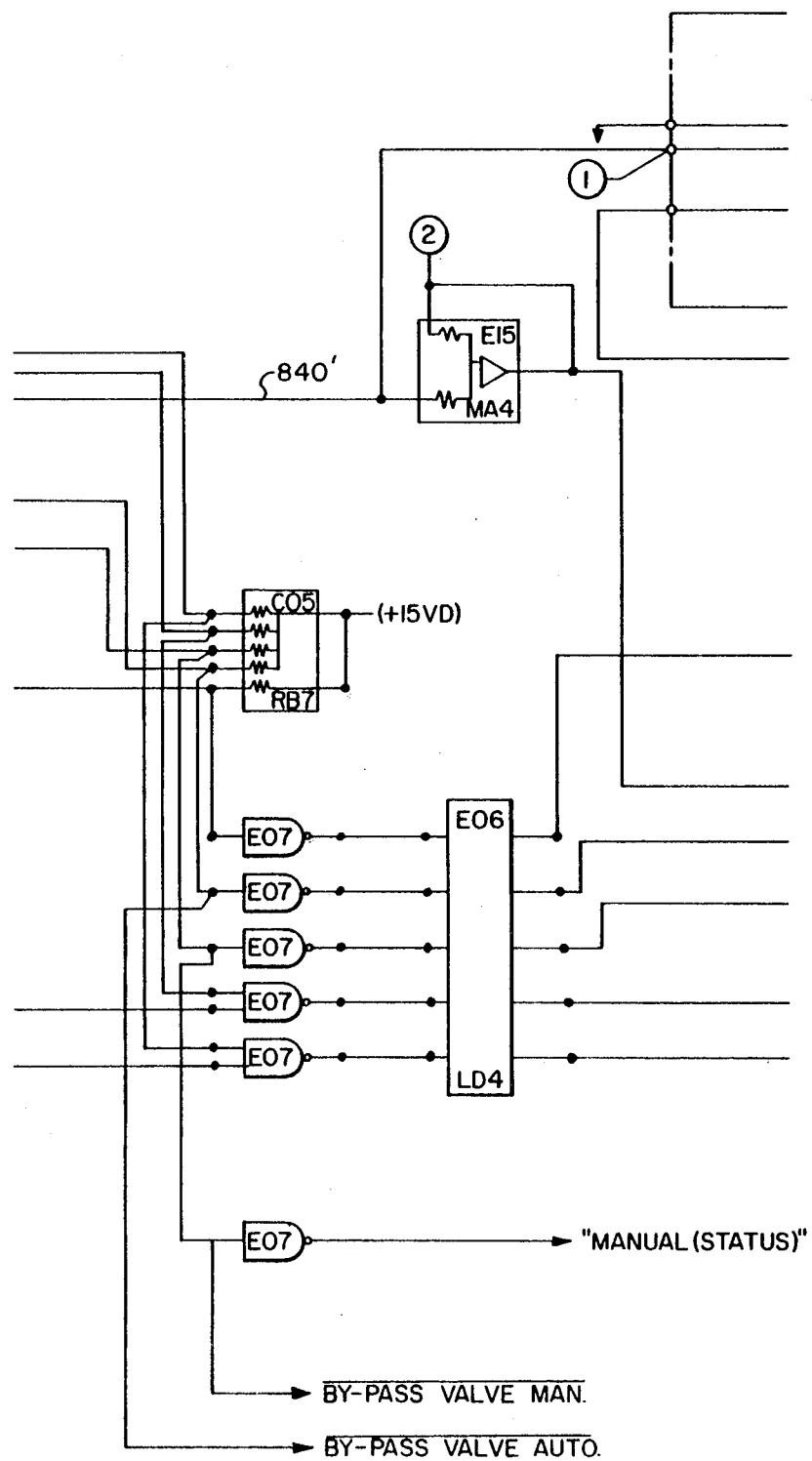
Figure 13F:
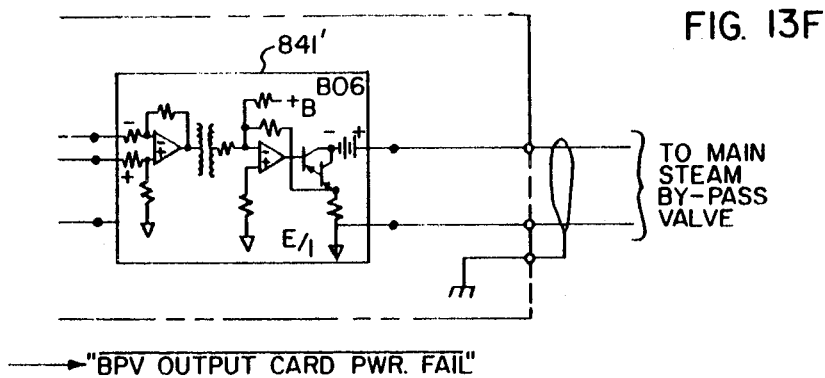
Figure 14:
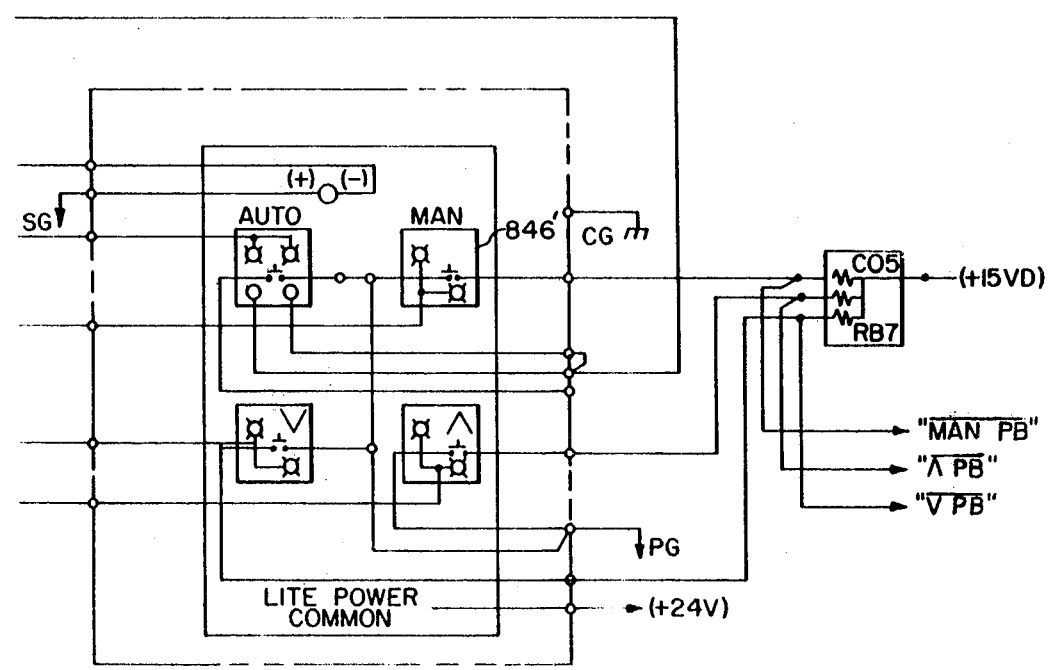
FIG. 14 shows the arrangement of FIGS. 13A through 13F.

Referring to FIGS. 9A, 9B and 9C, the analog hardware system for operating the main steam bypass valve also includes an NHC card 801B' which operates in a manner identical to the previously described NHC cards 801U' and 801L' for the upper and lower steam control valves. Under automatic control, an input gate 802B' provides data to operate a register control 803B' for counting a register 804B' up or down. A counting up of the register counter 804B' opens the main bypass valve and a down count closes the main bypass valve proportional to such count. The output from the counter 804B' is input to a digital to analog converter 805B' to generate in its output 840' an analog voltage which is converted to a current by a voltage current converter 841'. The output of the voltage to current converter 841' operates the main bypass valve. The register control for manual or analog hardware includes an input 842' for increasing the register count of the counter 804B' through the register control 803B'. An input 843' to the register control 803B' decreases the count of the register counter 804B'. The clock 812B' determines the rate at which the register counter 804B' will count in either an up or a down direction. A mode control function 815B' is used to change the mode from manual to automatic or vice versa in accordance with a distinctive signal input 844' or 845'.

Also, the output of the mode control function 815B' when in the manual mode provides a distinctive signal on 846' which is used in the logic to permit the main bypass valve to be operated toward an open position. Similarly, a signal on either 842' or 843' to increase or decrease the counter 804B' via the register control 803B' transfers the NHC card to manual control.

The bypass valve NHC card and its associated analog circuit also serves to switch the steam inlet control valves to manual through their associated NHC cards 801U' and 801L' over an input 850' (FIG. 9B). If the pushbutton for the main bypass manual valve is operated, the mode control 815B' is switched to manual and an input 851' is connected to OR gate 852' to simultaneously set the main steam inlet control valves to manual. Also, the manual pushbutton for the bypass valve provides an input to an OR gate 853' which changes the mode control function 815B' to manual. The OR gate 853' has another input for setting the main bypass valve to manual through its mode control input 844' which sets the steam control valve to manual through its output 850' by way of an AND gate 855' which will conduct through the OR gate 852' when the operator automatic pushbutton from input 856' is not operated as controlled by a negative function block 857'.

In the manual mode, should the pressure from the HRSG's exceed a predetermined maximum, as determined by a high signal monitor 858' the register control 803B' is operated to increase the register counter by way of its input 842' through an AND gate 860' and an OR gate 861'. The AND gate 860' determines that the NHC card is in manual through the output 846' of the mode control 815B'; and also determines that the main header pressure from the HRSG's is not below the predetermined minimum as determined by a negative function 862'. The negative function 862' does not provide an input to the AND gate 860' to permit the valve to be open, if a low signal monitor 863' provides an input to an OR gate 864' which operates to decrease the register counter through an AND gate 865'. Should the pressure drop below the predetermined minimum of 300 pounds, for example, in the present embodiment, the OR gate 864' passes a signal through AND gate 865' to the input 843' of the register control 803B' to decrease the register counter 804B' and operate the main steam bypass valve toward a closed position. The clock 812B' is controlled by an input 866' which in turn is controlled by a summing function 867'. An output from the high signal monitor 858' or the low signal monitor 863' causes an OR gate 870' to conduct to operate a switch or transfer function 871' for introducing a value to the summing device 867' for operating a clock at a slow rate. The clock 812B' is operated at a fast rate through the summing device 867' by a transfer device or switch 872' which is operated by inputs on a line 873'. The switch 872' is operated from such input 873' in response to contingency conditions which would require a fast closing operation of the bypass valve.

FIGS. 10A through 10L, which illustrate in detail the analog circuitry of the throttle pressure limiting system described in connection with FIGS. 6A through 6B, include reference characters identical to those in FIGS. 6A through 6C. These reference characters correspond to similarly referenced functions shown in FIGS. 6A through 6C; and an understanding of FIGS. 10A through 10L can be had by referring to the description in connection with FIGS. 6A through 6C and the reference characters included therein. Similarly, FIGS. 12A through 12F, which illustrate in detail the analog circuitry for controlling the steam turbine inlet control valves include reference characters identical to those in FIGS. 7A through 7C. These reference characters correspond to similarly referenced functions described in connection with FIGS. 7A through 7C; and an understanding of FIGS. 12A through 12F can be had by referring to the description of FIGS. 7A through 7C and the references therein. FIGS. 13A through 13F, which illustrate in detail the analog circuitry for the main steam bypass valve control system include reference characters identical to those in FIGS. 9A through 9C. These reference characters correspond to similarly reference functions described in connection with FIGS. 9A through 9C; and an understanding of FIGS. 13A through 13F can be had by referring to the description of FIGS. 9A through 9C and the references therein.

It is to be understood that more than two steam generators may be utilized in a combined cycle plant, or one steam generator with additional capacity may be used. Also, a predetermined pressure flow relationship may be used in certain installations when both steam generators are in service.

Also, modifications may be made in the control system without departing from the spirit or scope of the invention as defined by the claims.

FLOW CHART LEDGENDS FOR FIG. 16 THRU FIG. 22

Figure 16A:
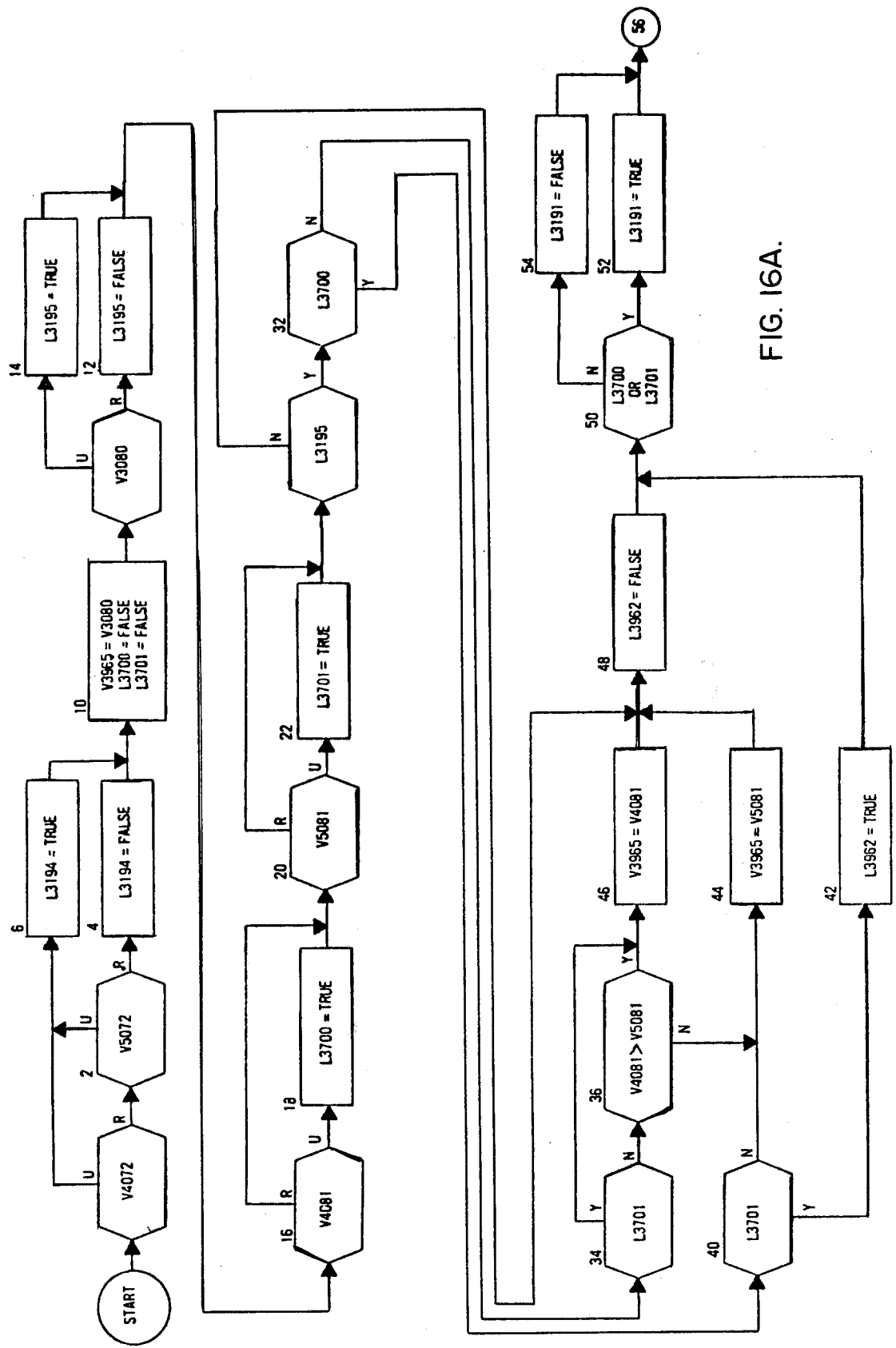
FIGS. 16A and 16B is a flow chart of the steam turbine throttle pressure monitor shown in a block form of FIG. 15.

FIG. 16A
V4072 HRSG1 FLOW
V5072 HRSG2 FLOW
V3080 THROTTLE PRESSURE
V3966 THROTTLE PRESSURE SET POINT RAMP INPUT
V3967 THROTTLE PRESSURE ERROR FOR BPV

V3969 THROTTLE PRESSURE ERROR FOR CV
V4081 HRSG1 SH. OUTLET PRESSURE
V5081 HRSG2 SH. OUTLET PRESSURE
V3965 SELECTED THROTTLE PRESSURE
V3977 THROTTLE PRESSURE SET POINT RAMP OUTPUT
L3976 MANUAL OV
L3999 THROTTLE PRESSURE RUNBACK
L3225 HOLD BUTTON LAMP
L3986 COMPUTED HOLD
L3166 THROTTLE PRESSURE ANN. CO
L3194 HRSG FLOW TRANSDUCER LAMP
L3195 THROTTLE PRESSURE TRANSDUCER LAMP
L3191 HRSG SH. PRESSURE TRANSDUCER LAMP
L3962 ALL PRESSURE TRANSDUCERS FAILED
K3981 BOILER MINIMUM FLOW
K3880 ONE-BOILER FLOW-PRESSURE CURVE
K3870 TWO-BOILER FLOW-PRESSURE CURVE
K3976 THROTTLE PRESSURE ERROR BIAS
K3984 THROTTLE PRESSURE RAMP RATE
700B SELECT SPEED

Figure 16B:
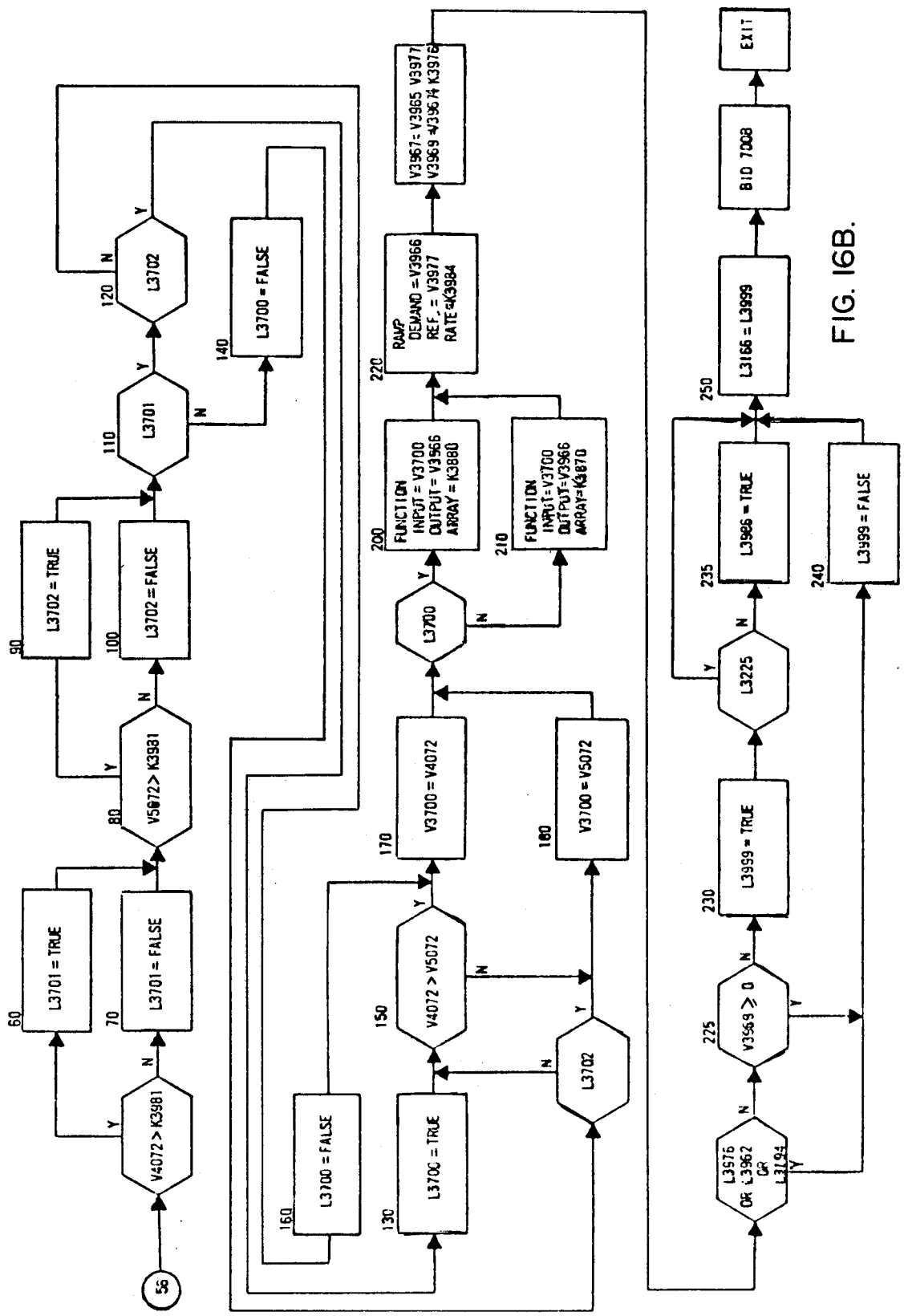

FIG. 16B
V4072 HRSG1 FLOW
V5072 HRSG2 FLOW
V3080 THROTTLE PRESSURE
V3966 THROTTLE PRESSURE SET POINT RAMP INPUT
V3967 THROTTLE PRESSURE ERROR FOR BPV
V3969 THROTTLE PRESSURE ERROE FOR CV
V4081 HRSG1 SH. OUTLET PRESSURE
V5081 HRSG2 SH. OUTLET PRESSURE
V3965 SLECTED THROTTLE PRESSURE
V3977 THROTTLE PRESSURE SET POINT RAMP OUTPUT
L3976 MANUAL OV
L3999 THROTTLE PRESSURE RUNBACK
L3225 HOLD BUTTON LAMP
L3986 COMPUTED HOLD
L3166 THROTTLE PRESSURE ANN. CO
L3194 HRGS FLOW TRANSDUCER LAMP
L3195 THROTTLE PRESSURE TRANSDUCER LAMP
L3191 HRSG SH. PRESSURE TRANSDUCER LAMP
L3962 ALL PRESSURE TRANSDUCER LAMP
K3981 BOILER MINIMUM FLOW
K3680 ONE-BOILER FLOW-PRESSURE CURVE
K3870 TWO-BOILER FLOW-PRESSURE CURVE
K3976 THROTTLE PRESSURE ERROR BIAS
K3984 THROTTLE PRESSURE RAMP RATE
700B SELECT SPEED

Figure 17:
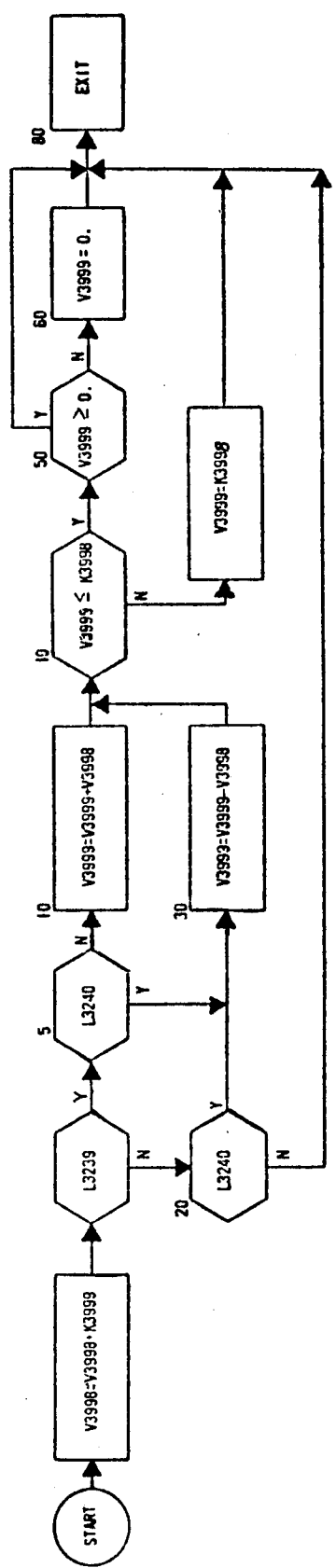
FIG. 17 is a flow chart of the valve position limit shown in block form of FIG. 15.
Figure 18A:
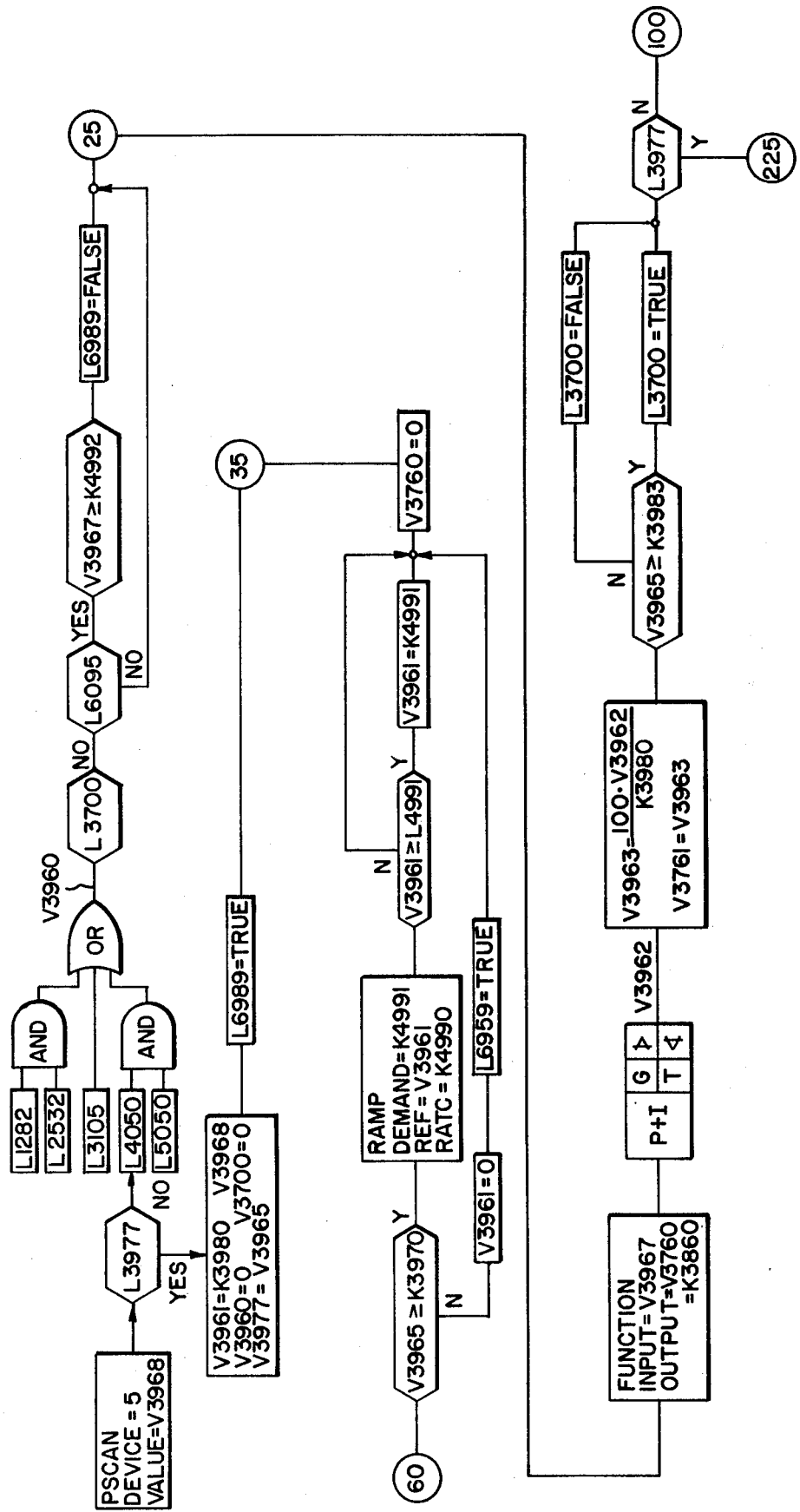
FIG. 18 is a flow chart of the steam bypass valve control.
Figure 18B:
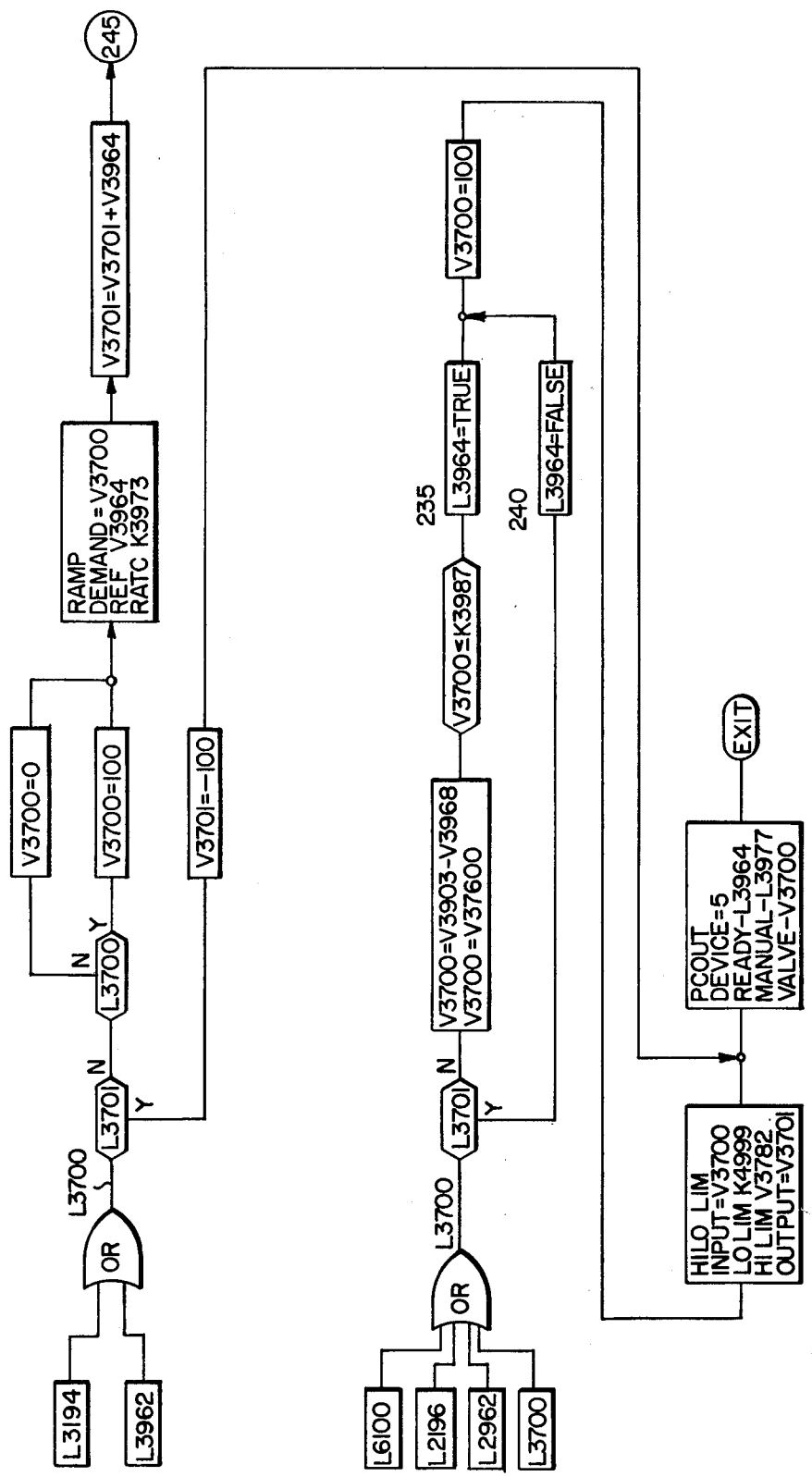

FIG. 17
V3999 VALVE POSITION LIMIT
V3998 ACCUMULATED VPL INCREMENT
L3239 VALVE POSITION LIMIT RAISE BUTTON/LAMP
L3240 VALVE POSITION LIMIT LOWER BUTTON/LAMP
K3999 VALVE POSITION LIMITE INCREMENT
K3998 MAXIMUM VALVE POSITION LIMIT

FIG. 19A
V3050 MAIN TURBINE SPEED
V3051 OPC SPEED
V3052 SUPERVISORY SPEED
V3987 SELECTED SPEED
V3992 REFERENCE
V3997 VALVE TEST SIGNAL
V6979 START TIMER
V3104 MW
L3966 BREAKER FLIPFLOP
L3162 SPEED TRANSDUCER FAILURE
L3972 REQUEST FOR AUTO SYNC
L3976 MANUAL CV
L3190 UPPER CV TEST
L3189 LOWER CV TEST
L3164 CLOSE UPPER SV
L3165 CLOSE LOWER SV
L3185 SYNC SPEED MONITOR LAMP
L3963 AUTO STARTUP
L6035 SYNC SPEED STATUS LAMP
L3196 SPEED TRANSDUCER STAUS LAMP
L3197 MW TRANSDUCER STATUS LAMP
K3986 SPEED ERROR DEADBAND
K3982 SYNC SPEED
7005 VALVE STATYS MONITOR

FIG. 19B
V3050 MAIN TURBINE SPEED
V3051 OPC SPEED
V3052 SUPERVISORY SPEED
V3987 SELECTED SPEED
V3997 VALVE TEST SIGNAL
V6979 START TIMER
V3104 MW
L3966 BREAKER FLIPFLOP
L3162 SPEED TRANSDUCER FAILURE
L3972 REQUEST FOR AUTO SYNC
L3976 MANUAL CV
L3190 UPPER CV TEST
L3189 LOWER CV TEST
L3164 CLOSE UPPER CV
L3165 CLOSE LOWER SV
L3185 SYNC SPEED MONITOR LAMP
L3963 AUTO STARTUP
L6035 SYNC SPEED STATUS LAMP
L3196 SPEED TRANSDUCER STAUS LAMP
L3197 MW TRANSDUCER STATUS LAMP
K3986 SPEED ERROR DEADBAND
K3982 SYNC SPEED
7005 VALVE STATUS MONITOR

Figure 20:
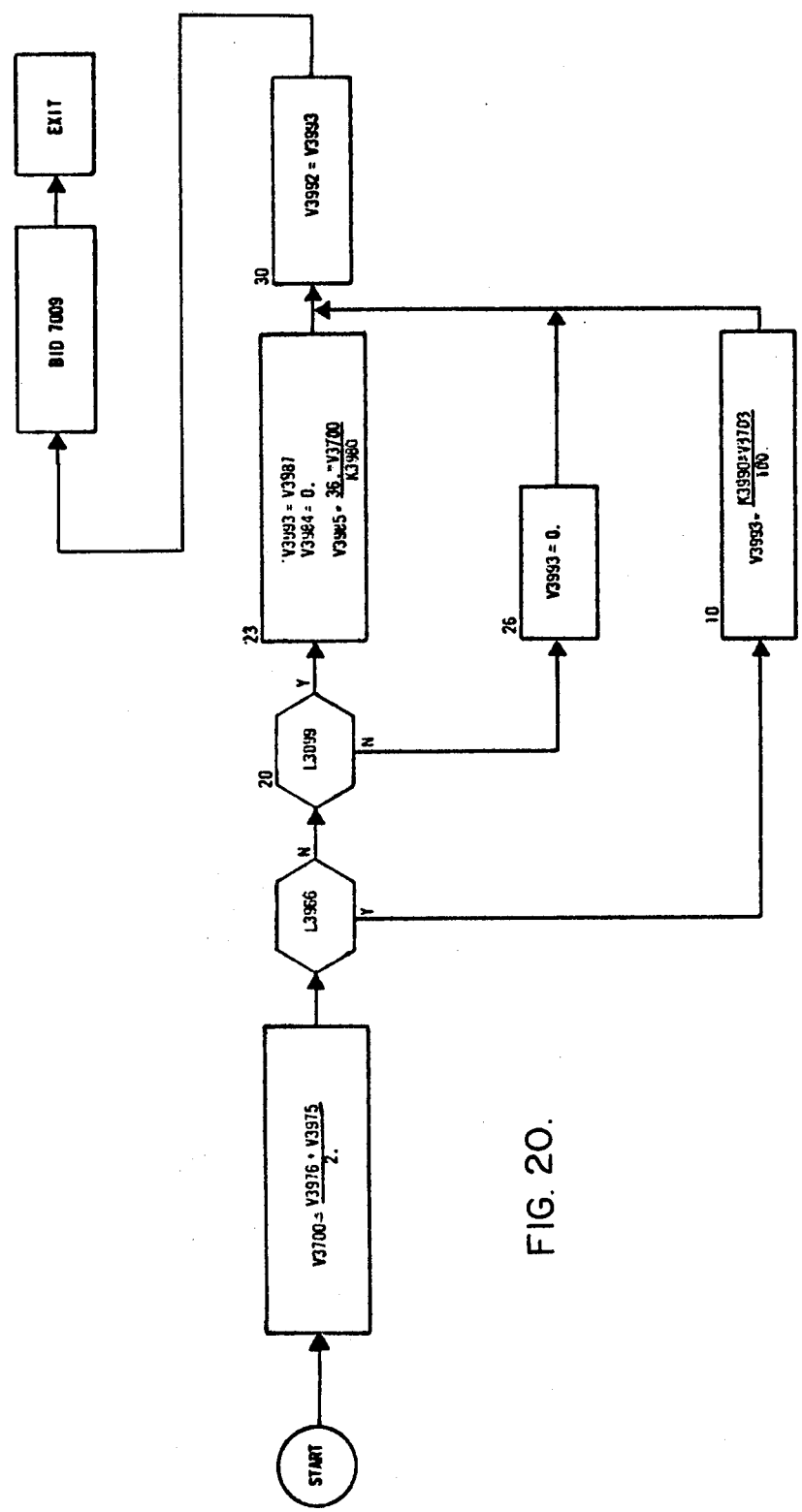
FIG. 20 is a flow chart of the manual track shown in block form of FIG. 15.

FIG. 20
V3993 OPERATOR DEMAND
V3992 REFERNCE
V3987 SELECTED SPEED
V3985 SPEED CONTROLLER INTEGRAL OUTPUT
V3984 SPEED CONTROLLER LAST INPUT
V3976 UPPER CV NHC CARD OUTPUT
V3975 LOWER CV NHC CARD OUTPUT
L3966 BREAKER FLIPFLOP
L3099 TURBINE LATCHED Cl
K3990 RATED MW
K3988 SPEED CONTROL OUTPUT RANGING GAIN
7009 STEAM TURBINR SPEED/LOAD CONTROL

Figure 21:
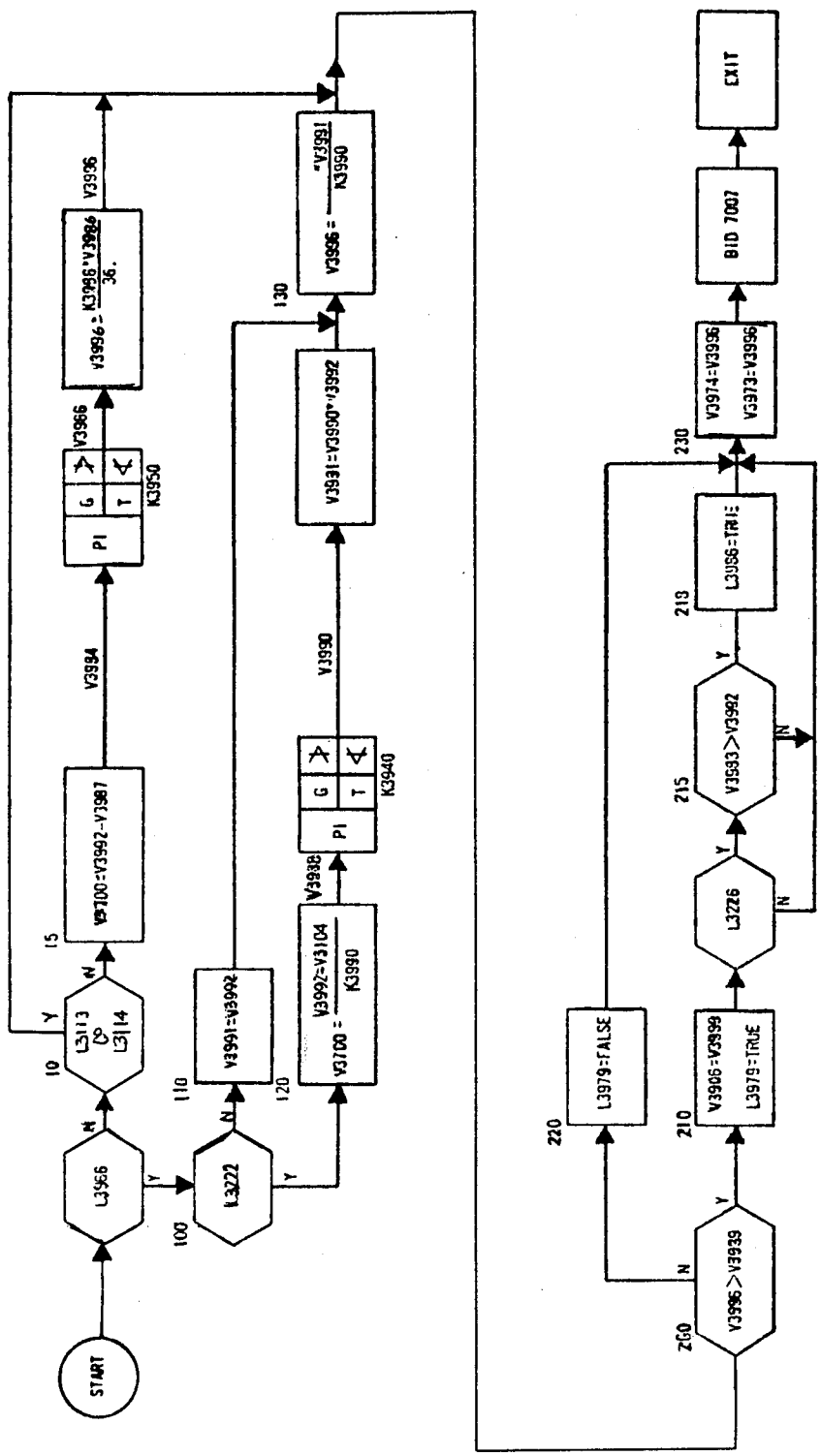
FIG. 21 is a flow chart of the steam turbine speed/load control.

FIG. 21
 V3996 CONTROL VALVE SET POINT
 V3899 VALVE POSITION LIMIT
 V3992 REFERENCE
 V3991 NW COMPENSATED REFERENCE
 V3980 NW CONTROLLERS TOTAL OUTPUT
 V3989 NW CONTROLLER INTEGRAL OUTPUT
 V3998 NW CONTROLLER LAST INPUT
 V3987 SELECTED SPEED
 V3986 SPEED CONTROLLER TOTAL OUTPUT
 V3985 SPEED CONTROLLER INTEGRAL OUTPUT
 V3984 SPEED CONTROLLER LAST INPUT
 V3974 UPPER CONTROL VALVE SET POINT
 V3973 LOWER CONTROL VALVE SET POINT
 V1104 NW A1
 V3983 DEMAND
 L3979 VALVE POSITION LIMITING
 L3222 NW FLIPFLOP
 L3966 BREAKER FLIPFLOP
 L3226 GO BUTTON/LAMP
 L3986 COMPUTED HOLD
 L3113 OPC TEST PERMISSIVE SWITCH C1
 L3114 OPC ACTING C1
 K3990 RATED NW
 K3998 SPEED CONTROL OUTPUT RANGING GAIN
 K3950 SPEED CONTROLLER PARAMETERS
 K3940 NW CONTROLLER PARAMETERS
 7007 STEAM TURBINE READY/OUTPUT

Figure 22:
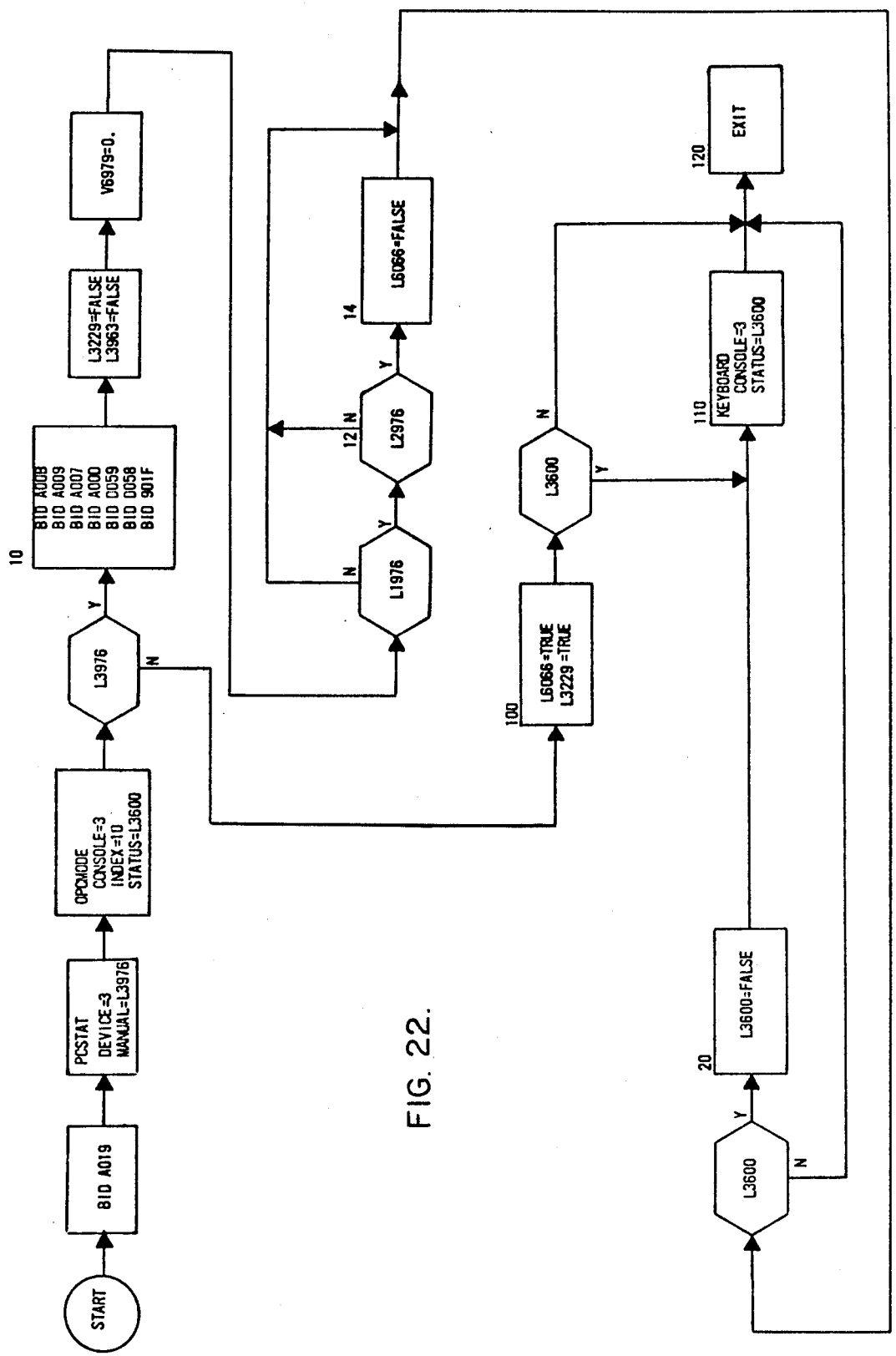
FIG. 22 is a flow chart of the steam turbine auto/manual logic.

FIG. 22
 V6879 STARTUP TIMER
 L3976 MANUAL CV
 L2976 GT2 MANUAL FUEL VALVE
 L1976 GT1 MANUAL FUEL VALVE
 L6066 PLANT AUTO LAMP
 L3229 AUTO BUTTON
 L3962 START UP IN COORDONATED CONTROL
 A00B NW IN/OUT LOGIC
 A009 AUTO SYNC LOGIC
 A007 ATS LOGIC
 A00D GO/HOLD LOGIC
 D059 UPPER CV TEST
 D058 LOWER CV TEST
 901F COORD LOGIC
 AD19 ATS READY LOGIC

What we claim is:

1. A combined cycle electric power plant comprising at least one gas turbine, means for generating steam in response to heat energy from the gas turbine, a steam turbine driven by steam supplied to it from the steam generating means, means for generating electric power under the driving power of the turbines, control valve means to control the admission of steam from the steam generating means to the steam turbine, bypass valve means to control the steam from the steam generating means to bypass the steam turbine, means for controlling the operation of the steam generating means and the turbines, said controlling means including a steam turbine control system having an automatic control, said automatic control including a means to generate a first representation of steam flow from the steam generating means, a means to generate a second representation of steam pressure, a means responsive to the first representation to generate a third representation of steam pressure as a function of steam flow according to a predetermined characterization, a means to generate a representation of speed/load demand for the steam turbine, a means governed by the second representation and the third representation to operate the bypass valve means to control the steam pressure according to the predetermined characterization, a first means responsive to the speed/load demand representation to modulate the control valve means to admit steam to the turbine, and a second means governed by the second and third representation to operate the control valves to control the steam pressure to be not less than a predetermined variation from said predetermined characterization whereby the bypass valves are operated to maintain a predetermined pressure flow relationship to the steam turbine, and the control valves respond to the predetermined pressure flow relationship only when the bypass valve is closed to minimize the probability of water carryover into the steam turbine.

2. A combined cycle electric power plant as set forth in claim 1 wherein said second valve operating means varies the generated speed/load demand representation to govern the control valve means.

3. A combined cycle electric power plant as set forth in claim 1 wherein said automatic control system is a programmed digital computer.

4. A combined cycle electric power plant as set forth in claim 1 wherein said third representation is a representation in excess of the natural pressure flow relationship of the steam to the steam turbine with the control valve means fully open.

5. A combined cycle electric power plant as set forth in claim 4 wherein said automatic control is a programmed digital computer.

6. A combined cycle electric power plant comprising, at least one gas turbine, means for generating steam in response to heat energy from the gas turbine, a steam turbine driven by steam supplied to it from the steam generating means, means for generating electric power under the driving power of the turbine, control valve means to control the admission of steam from the steam generating means to the steam turbine, bypass valve means to control the steam from the steam generating means to bypass the steam turbine, means for controlling the operation of the steam generating means and the turbines, said controlling means including a steam turbine control system having an automatic control, said automatic control including means to generate a first representation of steam flow from the generating means, a means to generate a second representation of steam pressure, a means responsive to the first representation to generate a third representation of steam pressure as a function of steam flow according to a predetermined characterization, a means to generate a speed/load demand representation for the steam turbine, a means to govern the control valve means in response to the speed/load demand representation independent of the first and second generated representations, a means to govern the bypass valve means in response to the second and third representations independent of the speed/load demand representation, and means governed by the position of the bypass valve means to render the control valve means responsive to the second and third representations at times when the bypass valve means is incapable of changing the pressure/flow relationship as required by the third representation.

7. A combined cycle electric power plant as set forth in claim 6 wherein said automatic control is a programmed digital computer.

8. A combined cycle electric power plant as set forth in claim 6 comprising at least a second gas turbine and a second means to generate steam in response to the heat from the second gas turbine, and the predetermined characterization of said third representation differs in response to steam flow from one or both of the steam generating means.

9. A combined cycle electric power plant according to claim 8 wherein said means to govern the bypass valve means includes the generation of a difference representation between the third representation and the second representation.

10. A combined cycle electric power plant as set forth in claim 8 wherein said automatic control is a programmed digital computer.

11. A combined cycle electric power plant as set forth in claim 9 wherein the means to govern the control valve means in response to the first and third representation includes a means to generate an error representation according to a predetermined characterization in response to the first representation and the difference representation, whereby any deviation sufficient to govern the control valves toward a closed position is different according to the actual steam pressure generated.

12. A steam turbine electric power plant, comprising, at least one steam generating means, a steam turbine driven by steam supplied to it from the steam generating means, means for generating electric power under the driving power of the turbine, control valve means to control the admission of steam to the steam turbine, bypass valve means to control steam from the steam turbine to bypass the steam turbine, means to control the operation of the turbine, said controlling means including a means to generate a first representation of steam flow from the steam generating means according to a predetermined characterization, a means to generate a second representation of steam pressure, a means to generate a representation of speed/load demand, a means to operate the control valves in response to the speed/load demand representation, a means responsive to the first and second representations to operate the bypass valve means to control the pressure/flow relationship of the steam to the turbine, and a means responsive to a change in the first or second representations in a direction to further close the bypass valve means at times when the bypass valve means is closed to operate the control valve means in response to the first and second representations, whereby the minimum pressure/flow relationship of the generated steam is controlled sequentially by the bypass valve means and control valve means.

13. An electric power plant as set forth in claim 12 further comprising a second steam generating means, and wherein the characterization of the first representation is varied in response to steam flow from one and both of the steam generating means.

14. An electric power plant according to claim 12 wherein the controlling means includes a programmed digital computer.

15. An electric power plant according to claim 12 wherein the last named means includes a means to generate a representation of error between the first representation and the second representation, a means to characterize said error representation to represent a lesser pressure/flow relationship, and a means to vary the position of the control valve means in response to the characterized error representation.

16. An electric power plant according to claim 15 wherein the controlling means includes a programmed digital computer.

* * * * *